United States Patent
Yatsuda et al.

(10) Patent No.: US 10,118,533 B2
(45) Date of Patent: Nov. 6, 2018

(54) VEHICLE LAMP WITH SCANNING LIGHT REFLECTOR AND WAVELENGTH CONVERSION MEANS

(71) Applicant: Stanley Electric Co., Ltd., Tokyo (JP)

(72) Inventors: Yasushi Yatsuda, Tokyo (JP); Hiroshi Hirasawa, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 97 days.

(21) Appl. No.: 15/119,579

(22) PCT Filed: Feb. 13, 2015

(86) PCT No.: PCT/JP2015/053915
§ 371 (c)(1),
(2) Date: Aug. 17, 2016

(87) PCT Pub. No.: WO2015/122481
PCT Pub. Date: Aug. 20, 2015

(65) Prior Publication Data
US 2017/0057399 A1    Mar. 2, 2017

(30) Foreign Application Priority Data
Feb. 17, 2014 (JP) ................... 2014-027380

(51) Int. Cl.
*B60Q 1/076* (2006.01)
*B60Q 1/00* (2006.01)
(Continued)

(52) U.S. Cl.
CPC ......... *B60Q 1/0023* (2013.01); *B60Q 1/0076* (2013.01); *F21K 9/64* (2016.08);
(Continued)

(58) Field of Classification Search
CPC .... F21S 48/114; F21S 48/1136; F21S 48/115; F21S 48/1159; F21S 48/1752;
(Continued)

(56) References Cited

U.S. PATENT DOCUMENTS 4,868,721 A * 9/1989 Soardo ................ F21S 48/1136
362/282
7,241,038 B2 * 7/2007 Naniwa .................... B60Q 1/08
362/249.04
(Continued)

FOREIGN PATENT DOCUMENTS

DE   102008022795 A1   11/2009
EP       2690352 A1    1/2014
(Continued)

OTHER PUBLICATIONS

International Preliminary on Patentability for PCT/JP2015/053915 dated Aug. 23, 2016.
(Continued)

*Primary Examiner* — Ismael Negron
(74) *Attorney, Agent, or Firm* — Kenealy Vaidya LLP

(57) ABSTRACT

A vehicle lamp includes a laser light source, a wavelength converter, a light reflector for two-dimensionally scanning light from the laser light source to form a light intensity distribution on the wavelength converter, a control unit for controlling first and second actuators driving the light reflector, and an optical system for projecting the light intensity distribution formed on the wavelength converter as an output light distribution pattern. The first actuator might be a resonant or non-resonant drive, while the second actuator is a non-resonant drive.

10 Claims, 42 Drawing Sheets

(51) Int. Cl.
*F21S 41/255* (2018.01)
*F21S 41/14* (2018.01)
*F21S 41/675* (2018.01)
*F21V 29/76* (2015.01)
*F21K 9/64* (2016.01)
*G02B 26/08* (2006.01)
*G02B 26/10* (2006.01)
*F21S 41/16* (2018.01)
*F21S 45/47* (2018.01)

(52) U.S. Cl.
CPC ............... *F21S 41/14* (2018.01); *F21S 41/16* (2018.01); *F21S 41/255* (2018.01); *F21S 41/675* (2018.01); *F21V 29/763* (2015.01); *G02B 26/0858* (2013.01); *G02B 26/105* (2013.01); *B60Q 2300/112* (2013.01); *B60Q 2300/42* (2013.01); *B60Q 2300/45* (2013.01); *F21S 45/47* (2018.01)

(58) Field of Classification Search
CPC ...... F21S 48/1757; F21V 14/04; B60Q 1/068; B60Q 1/076
See application file for complete search history.

(56) References Cited

U.S. PATENT DOCUMENTS

| | | | | |
|---|---|---|---|---|
| 7,575,352 B2* | 8/2009 | Sato | ............ | B60Q 1/076 362/507 |
| 7,862,216 B2* | 1/2011 | Friedrichs | ............ | F21S 48/1136 362/294 |
| 8,218,216 B2* | 7/2012 | Konno | ............ | G02B 17/0621 353/39 |
| 8,662,726 B2* | 3/2014 | Koike | ............ | B60Q 1/085 362/277 |
| 9,146,014 B2* | 9/2015 | Sugiyama | ............ | F21S 48/1388 |
| 9,534,756 B2* | 1/2017 | Takahira | ............ | F21S 48/17 |
| 9,606,351 B2* | 3/2017 | Yatsuda | ............ | G02B 26/105 |
| 2009/0046474 A1 | 2/2009 | Sato et al. | | |
| 2013/0058114 A1 | 3/2013 | Reiners | | |
| 2013/0258689 A1 | 10/2013 | Takahira et al. | | |
| 2014/0029282 A1 | 1/2014 | Ravier et al. | | |
| 2014/0254188 A1 | 9/2014 | Masuda et al. | | |
| 2016/0109074 A1* | 4/2016 | Hirasawa | ............ | F21K 9/64 362/511 |
| 2016/0215947 A1* | 7/2016 | Matsuno | ............ | F21S 48/1145 |
| 2016/0238209 A1* | 8/2016 | Kimura | ............ | F21S 48/1145 |
| 2016/0341389 A1* | 11/2016 | Hoshino | ............ | F21S 48/14 |

FOREIGN PATENT DOCUMENTS

| | | |
|---|---|---|
| JP | 2009169326 | 7/2009 |
| JP | 2013-125693 A | 6/2013 |
| JP | 2013-526759 A | 6/2013 |
| JP | 2013-134887 A | 7/2013 |

OTHER PUBLICATIONS

Wikipedia Article, "Microscanner"—Wikipedia, retrieved from URL: "https://en.wikipedia.org/wiki/Microscanner", on Sep. 21, 2017.
The extended European Search Report for the related European Patent Application No. 15749612.6 dated Oct. 18, 2017.
International Search Report for PCT/JP2015/053915 dated May 19, 2015.

* cited by examiner (RESONANCE AXIS)
HORIZONTAL DIRECTION
BIDIRECTIONAL LIGHTING (RESONANCE AXIS)
HORIZONTAL DIRECTION
ONE-WAY LIGHTING (RESONANCE AXIS)
HORIZONTAL DIRECTION
INTERLACED LIGHTING ■ MINIMUM HORIZONTAL SCAN FREQUENCY(fh): 60x2x50=6kHz(NON-RESONANCE)

■ VERTICAL SCAN FREQUENCY(fv): 60Hz(NON-RESONANCE)

ON/OFF COMPONENT OF LD ON HORIZONTAL SCAN SIDE IS INCLUDED

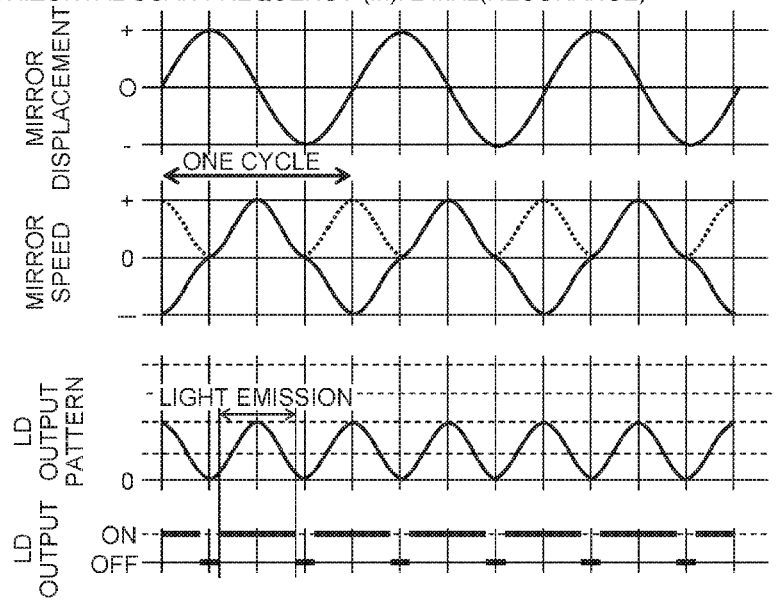
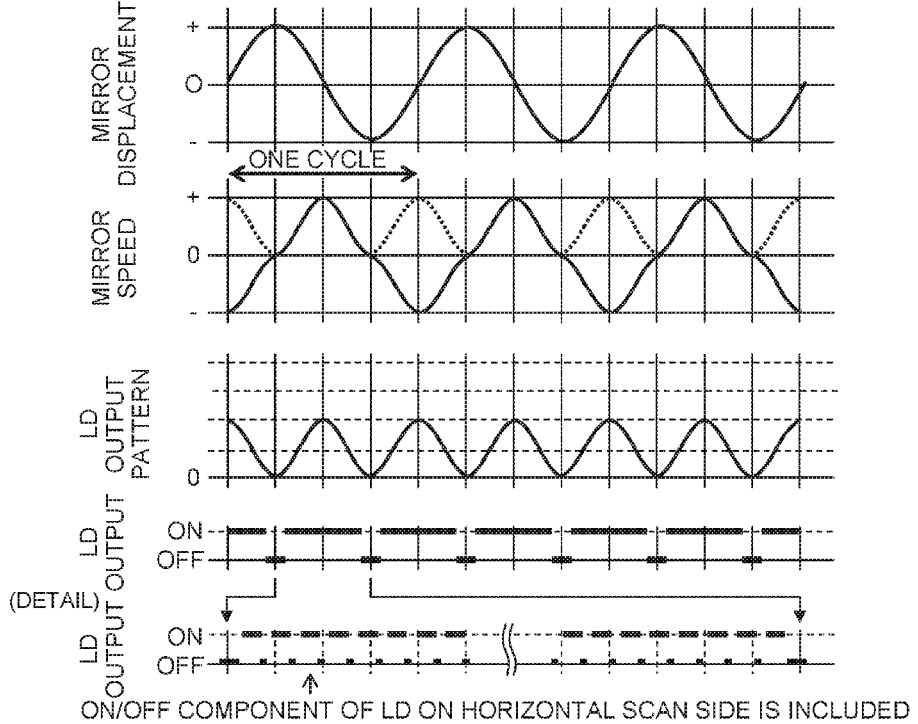

FIG.28A

| | PROJECTION ANGLE αh | SEARCH RANGE ON WAVELENGTH CONVERTER L | MIRROR DEFLECTION ANGLE βh_max | MIRROR MECHANICAL HALF ANGLE γh_max | LOAD VOLTAGE |
|---|---|---|---|---|---|
| WIDE | ±15deg | ±8.57mm | ±19.7deg | ±9.8deg | 5.41Vpp |
| MID | ±8.5deg | ±4.78mm | ±11.3deg | ±5.3deg | 2.31Vpp |
| HOT | ±3.5deg | ±1.96mm | ±4.7deg | ±2.3deg | 0.93Vpp |

FIG.28B

| | PROJECTION ANGLE αv | SEARCH RANGE ON WAVELENGTH CONVERTER S | MIRROR DEFLECTION ANGLE βv_max | MIRROR MECHANICAL HALF ANGLE γv_max | CONTROL VOLTAGE |
|---|---|---|---|---|---|
| WIDE | ±6.5deg | ±3.65mm | ±8.6deg | ±4.3deg | 41.2Vpp |
| MID | ±3.5deg | ±1.96mm | ±4.7deg | ±2.3deg | 24.4Vpp |
| HOT | ±1.5deg | ±0.84mm | ±2.0deg | ±1.0deg | 13.3Vpp |

FIG. 31A

| | PROJECTION ANGLE αh | SEARCH RANGE ON PHOSPHOR L | MIRROR DEFLECTION ANGLE βh_max | MIRROR MECHANICAL HALF ANGLE γh_max | DISTANCE BETWEEN MIRROR AND PHOSPHOR d |
|---|---|---|---|---|---|
| WIDE | ±15deg | ±8.57mm | ±19.7deg | ±9.8deg | 24.0mm |
| MID | ±8.5deg | ±4.78mm | ±19.7deg | ±9.8deg | 13.4mm |
| HOT | ±3.5deg | ±1.96mm | ±19.7deg | ±9.8deg | 5.5mm |

FIG. 31B

| | PROJECTION ANGLE αv | SEARCH RANGE ON PHOSPHOR S | MIRROR DEFLECTION ANGLE βv_max | MIRROR MECHANICAL HALF ANGLE γv_max | DISTANCE BETWEEN MIRROR AND PHOSPHOR d |
|---|---|---|---|---|---|
| WIDE | ±6.5deg | ±3.65mm | ±8.6deg | ±4.3deg | 24.0mm |
| MID | ±3.6deg | ±1.96mm | ±8.6deg | ±4.3deg | 13.4mm |
| HOT | ±1.5deg | ±0.84mm | ±8.6deg | ±4.3deg | 5.5mm |

RELATED ART

VEHICLE LAMP WITH SCANNING LIGHT REFLECTOR AND WAVELENGTH CONVERSION MEANS

TECHNICAL FIELD

The present invention relates to a vehicle lamp, and particularly to a vehicle lamp using a light reflector (or optical deflector, scanning module) that two-dimensionally scans excitation light.

BACKGROUND ART

FIG. 43 is a schematic view of a conventional vehicle lamp.

As illustrated in FIG. 43, there has been provided a vehicle lamp that includes: a plurality of light reflectors 514a, 514b, and 514c that two-dimensionally scans excitation light; a plurality of fluorescent substances 520a, 520b, and 520c (wavelength converters) on which two-dimensional images are respectively drawn with excitation light that is two-dimensionally scanned by the plurality of light reflectors 514a, 514b, and 514c to form a light intensity distribution; a plurality of projection lens 524a, 524b, and 524c that is provided corresponding to the plurality of fluorescent substances 520a, 520b, and 520c, respectively, and that projects the light intensity distribution formed in the corresponding one of the plurality of fluorescent substances 520a, 520b, and 520c to form a predetermined light distribution pattern 526 (refer to PTL 1, for example).

CITATION LIST

Patent Literature

{PTL 1} National Publication of International Patent Application No. 2013-526759

SUMMARY OF INVENTION

Technical Problem

Unfortunately, the vehicle lamp having the configuration above has a problem in which simple vertical and horizontal round-trip scanning by each of the light reflectors 514a, 514b, and 514c causes light intensity (luminance) at right and left edges, and upper and lower edges, in the light intensity distribution formed in the wavelength converter (fluorescent substance) to relatively increase, thereby failing to form a light intensity distribution having relatively high light intensity in a region (such as a region near the center), which is required for a vehicle lamp.

The present invention is made in light of the above-mentioned circumstances, and it is an object of the present invention to form a light intensity distribution having relatively high light intensity in a region (such as a region near the center), which is required for a vehicle lamp, in a vehicle lamp using a light reflector that two-dimensionally scans excitation light.

Solution to Problem

To achieve the object above, the invention in accordance with a first aspect is a vehicle lamp configured to form a predetermined light distribution pattern, the vehicle lamp includes: an excitation light source; a light reflector that two-dimensionally scans the excitation light, and that includes a mirror unit that reflects excitation light incident from the excitation light source, a first actuator that oscillates the mirror unit around a first axis by using resonant drive, and a second actuator that oscillates the mirror unit around a second axis orthogonal to the first axis by using nonresonant drive, the light reflector being arranged while the first axis is included in a vertical plane, as well as the second axis is included in a horizontal plane; a wavelength converter having a scan region in which a light intensity distribution is formed by drawing a two-dimensional image with the excitation light that is two-dimensionally scanned by the mirror unit; a control unit that controls the first actuator by using the resonance drive as well as the second actuator by using the nonresonant drive so that the two-dimensional image is formed in the scan region with the excitation light that is two-dimensionally scanned by the mirror unit; and an optical system that projects the light intensity distribution formed in the scan region to form the prescribed light distribution pattern. The control unit controls the second actuator to relatively reduce an oscillation rate around the second axis of the mirror unit, while the two-dimensional image is drawn in a partial region in the scan region with the excitation light that is two-dimensionally scanned by the mirror unit, to form the light intensity distribution having relatively higher light intensity in the partial region in the scan region.

The invention in accordance with the first aspect enables forming a light intensity distribution having relatively high light intensity in a partial region (such as a region near the center), being required for a vehicle lamp, in the vehicle lamp using the light reflector that two-dimensionally scans excitation light.

This is achieved by allowing the control unit to control the second actuator so that an oscillation rate around the second axis of the mirror unit relatively decreases while a two-dimensional image is drawn in a partial region (such as a region near the center) in the scan region of the wavelength converter with excitation light that is two-dimensionally scanned by the mirror unit.

The invention in accordance with the first aspect also enables forming a predetermined light distribution pattern (such as a high-beam light distribution pattern) having relatively high light intensity in a partial region (such as a region near the center) in the vehicle lamp using the light reflector that two-dimensionally scans excitation light.

This is achieved, as described above, by enabling the light intensity distribution having relatively high light intensity in a partial region (such as a region near the center) to be formed, as well as by projecting the light intensity distribution having relatively high light intensity in the partial region (such as a region near the center) to form the predetermined light distribution pattern.

In the invention in accordance with the first aspect, the invention in accordance with a second aspect allows the light reflector to be configured as a light reflector of a uniaxial nonresonant/uniaxial resonant type that includes: the mirror unit; a movable frame that is arranged so as to surround the mirror unit and that supports the mirror unit so that the mirror unit can oscillate around the first axis; a base that is arranged so as to surround the movable frame and that supports the movable frame so that the movable frame can oscillate around the second axis; a first piezoelectric actuator serving as the first actuator that oscillates the mirror unit around the first axis with respect to the movable frame by using resonant drive; and a second piezoelectric actuator serving as the second actuator that oscillates the movable frame and the mirror unit supported by the movable frame, around the second axis with respect to the base, by using nonresonant drive.

According to the invention in accordance with the second aspect, arranging the light reflector of a uniaxial nonresonant/uniaxial resonant type as described in the second aspect enables a predetermined light distribution pattern that is wide in the horizontal direction and narrow in the vertical direction, required for the vehicle headlamp, to be easily formed, or a two-dimensional image corresponding to the predetermined light distribution pattern to be easily drawn.

In the invention in accordance with the first or second aspect, the invention in accordance with a third aspect allows the control unit to control the second actuator by the nonresonant drive based on a driving signal. The driving signal includes a nonlinear region that is adjusted so that an oscillation rate around the second axis of the mirror unit relatively decreases while a two-dimensional image is being drawn in the partial region in the scan region with the excitation light that is two-dimensionally scanned by the mirror unit.

The invention in accordance with the third aspect allows the control unit to control the second actuator by using the nonresonant drive based on the driving signal including the nonlinear region to enable a light intensity distribution having relatively high light intensity in the partial region (such as a region near the center) to be formed.

The invention in accordance with a fourth aspect is a vehicle lamp configured to form a predetermined light distribution pattern, the vehicle lamp including: an excitation light source; a light reflector that two-dimensionally scans the excitation light, and that includes a mirror unit that reflects excitation light incident from the excitation light source, a first actuator that oscillates the mirror unit around a first axis by using nonresonant drive, and a second actuator that oscillates the mirror unit around a second axis orthogonal to the first axis by using the nonresonant drive, the light reflector being arranged while the first axis is included in a vertical plane, as well as the second axis is included in a horizontal plane; a wavelength converter having a scan region in which a light intensity distribution is formed by drawing a two-dimensional image with the excitation light that is two-dimensionally scanned by the mirror unit; a control unit that controls the first and second actuators by using the nonresonant drive so that the two-dimensional image is formed in the scan region with the excitation light that is two-dimensionally scanned by the mirror unit; and an optical system that projects the light intensity distribution formed in the scan region to form the prescribed light distribution pattern. The control unit controls the first and second actuators to relatively reduce oscillation rates around the first and second axes of the mirror unit, respectively, while the two-dimensional image is drawn in a partial region in the scan region with the excitation light that is two-dimensionally scanned by the mirror unit, to form the light intensity distribution having relatively high light intensity in the partial region in the scan region.

The invention in accordance with the fourth aspect enables forming a light intensity distribution having relatively high light intensity in the partial region (such as a region near the center), being required for a vehicle lamp, in the vehicle lamp using the light reflector that two-dimensionally scans excitation light.

This is achieved by allowing the control unit to control the first and second actuators to relatively reduce the oscillation rates around the first and second axes of the mirror unit, respectively, while a two-dimensional image is drawn in the partial region (such as a region near the center) in the scan region of the wavelength converter with excitation light that is two-dimensionally scanned by the mirror unit.

The invention in accordance with the fourth aspect also enables forming a predetermined light distribution pattern (such as a high-beam light distribution pattern) having relatively high light intensity in the partial region (such as a region near the center) in the vehicle lamp using the light reflector that two-dimensionally scans excitation light.

This is achieved, as described above, by enabling the light intensity distribution having relatively high light intensity in the partial region (such as a region near the center) to be formed, as well as by projecting the light intensity distribution having relatively high light intensity in the region (such as a region near the center) to form the predetermined light distribution pattern.

In the invention in accordance with the fourth aspect, the invention in accordance with a fifth aspect allows the light reflector to be configured as a light reflector of a biaxial nonresonant type that includes: the mirror unit; a movable frame that is arranged so as to surround the mirror unit and that supports the mirror unit so that the mirror unit can oscillate around the first axis; a base that is arranged so as to surround the movable frame and that supports the movable frame so that the movable frame can oscillate around the second axis; a first piezoelectric actuator serving as the first actuator that oscillates the mirror unit around the first axis with respect to the movable frame by using nonresonant drive; and a second piezoelectric actuator serving as the second actuator that oscillates the movable frame and the mirror unit supported by the movable frame, around the second axis with respect to the base, by using the nonresonant drive.

According to the invention in accordance with the fifth aspect, arranging the light reflector of a biaxial nonresonant type as described in the fifth aspect enables a predetermined light distribution pattern that is wide in the horizontal direction and narrow in the vertical direction, required for the vehicle headlamp, to be easily formed, or a two-dimensional image corresponding to the predetermined light distribution pattern to be easily drawn.

In the invention in accordance with the fourth or fifth aspect, the invention in accordance with a sixth aspect allows the control unit to control the first actuator by using nonresonant drive based on a first driving signal as well as the second actuator by using nonresonant drive based on a second driving signal. The first driving signal includes a first nonlinear region that is adjusted so that an oscillation rate around the first axis of the mirror unit relatively decreases while a two-dimensional image is drawn in the partial region in the scan region with the excitation light that is two-dimensionally scanned by the mirror unit. The second driving signal includes a second nonlinear region that is adjusted so that an oscillation rate around the second axis of the mirror unit relatively decreases while a two-dimensional image is drawn in the partial region in the scan region with the excitation light that is two-dimensionally scanned by the mirror unit.

The invention in accordance with the sixth aspect allows the control unit to control the first and second actuators by using nonresonant drive based on the first driving signal including the first nonlinear region and the second driving signal including the second nonlinear region, respectively, to enable a light intensity distribution having relatively high light intensity in the partial region (such as a region near the center) to be formed.

In the invention in accordance with any one of the first to sixth aspects, the invention in accordance with a seventh aspect includes the partial region that is near the center in the light intensity distribution.

The invention in accordance with the seventh aspect enables forming a light intensity distribution having relatively high light intensity in a region near the center, as well as a predetermined light distribution pattern (such as a high-beam light distribution pattern) having relatively high light intensity in a region near the center, being required for a vehicle lamp, in the vehicle lamp using the light reflector that two-dimensionally scans excitation light.

In the invention in accordance with any one of the first to sixth aspects, the invention in accordance with a eighth aspect includes the predetermined light distribution pattern that has an upper edge including a cutoff line, and has the partial region that is near a side corresponding to the cutoff line.

The invention in accordance with the eighth aspect enables forming a light intensity distribution having relatively high light intensity in the region near the side corresponding to the cutoff line, as well as a predetermined light distribution pattern (such as a low-beam light distribution pattern) having relatively high light intensity in a region near the cutoff line, in the vehicle lamp using the light reflector that two-dimensionally scans excitation light.

Advantageous Effects of Invention

The present invention enables forming a light intensity distribution having relatively high light intensity in a partial region (such as a region near the center), being required for a vehicle lamp, in a vehicle lamp using a light reflector that two-dimensionally scans excitation light.

BRIEF DESCRIPTION OF DRAWINGS

FIG. 12A illustrates a detail of the first and second alternating voltage (such as a sine wave of 25 MHz) applied to the first piezoelectric actuators 203 and 204, an output pattern of the excitation light source 12 (laser beam), and the like.

FIG. 12B illustrates a detail of the third alternating voltage (such as a sawtooth wave of 55 Hz) applied to the second piezoelectric actuators 205 and 206, an output pattern of the excitation light source 12 (laser beam), and the like.

FIG. 16A illustrates a detail of the first alternating voltage (such as a sawtooth wave of 6 kHz) applied to the first piezoelectric actuators 163 and 164, an output pattern of the excitation light source 12 (laser beam), and the like.

FIG. 16B illustrates a detail of the third alternating voltage (such as a sawtooth wave of 60 Hz) applied to the second piezoelectric actuators 165 and 166, an output pattern of the excitation light source 12 (laser beam), and the like.

FIG. 18A illustrates a detail of the first alternating voltage (such as a sine wave of 24 kHz) applied to first piezoelectric actuators 15a and 15b, an output pattern of the excitation light source 12 (laser beam), and the like.

FIG. 18B illustrates a detail of the third alternating voltage (such as a sine wave of 12 Hz) applied to second piezoelectric actuators 17a and 17b, an output pattern of the excitation light source 12 (laser beam), and the like.

FIG. 28A is a table that summarizes conditions, etc., to be satisfied to change scan regions $A_{Wide}$, $A_{Mid}$, and $A_{Hot}$ in size if a distance between each of light reflectors $201_{Wide}$, $201_{Mid}$, and $201_{Hot}$ (the center of the mirror unit 202), and the wavelength converter 18, is identical or substantially identical.

FIG. 28B is a table that summarizes other conditions, etc., to be satisfied to change scan regions $A_{Wide}$, $A_{Mid}$, and $A_{Hot}$ in size if a distance between each of light reflectors $201_{Wide}$, $201_{Mid}$, and $201_{Hot}$ (the center of the mirror unit 202), and the wavelength converter 18, is identical or substantially identical.

FIG. 31A is a table that summarizes conditions, etc., to be satisfied to change scan regions $A_{Wide}$, $A_{Mid}$, and $A_{Hot}$ in size if driving voltage applied to each of the light reflector $201_{Wide}$, $201_{Mid}$, and $201_{Hot}$ is identical or substantially identical.

FIG. 31B is a table that summarizes other conditions, etc., to be satisfied to change scan regions $A_{Wide}$, $A_{Mid}$, and $A_{Hot}$ in size if driving voltage applied to each of the light reflector $201_{Wide}$, $201_{Mid}$, and $201_{Hot}$ is identical or substantially identical.

DESCRIPTION OF EMBODIMENTS

A vehicle lamp of a first embodiment of the present invention will be described below with reference to accompanying drawings.

Figure 1:
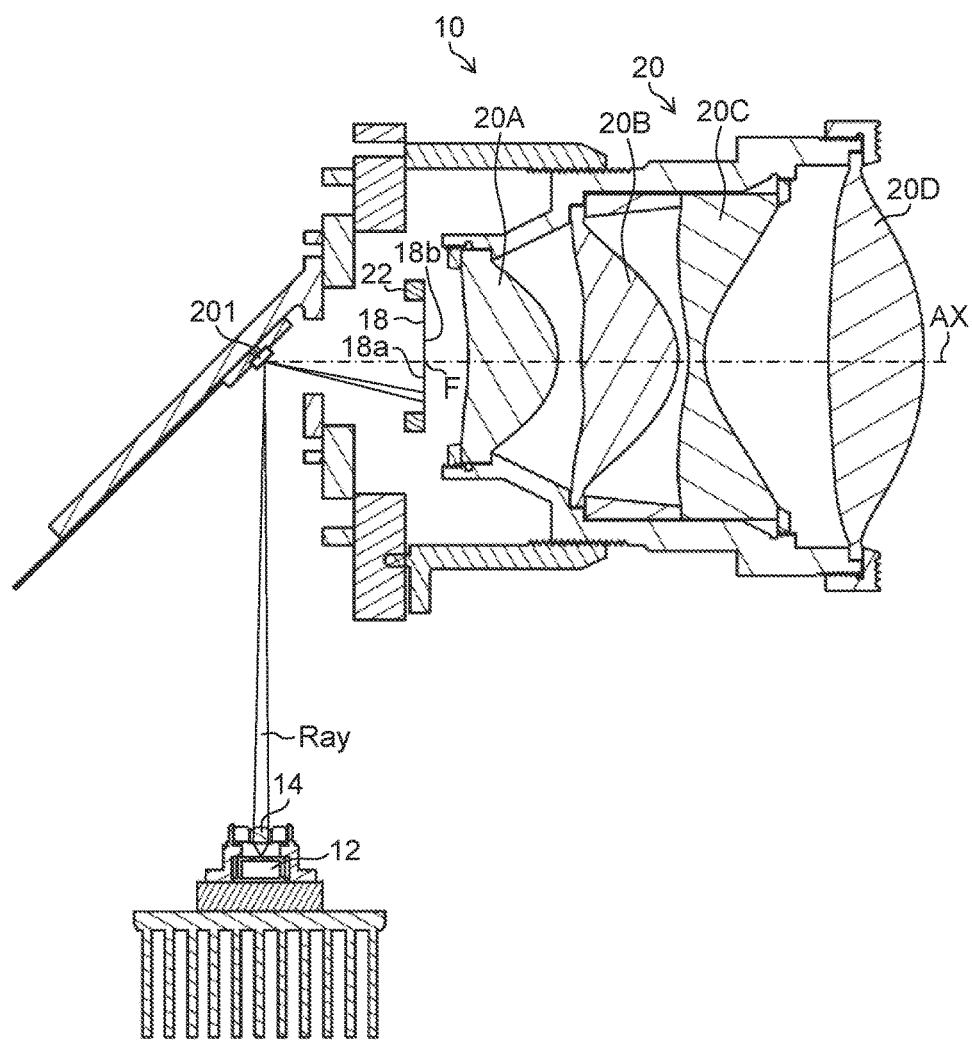
FIG. 1 is a longitudinal sectional view of a vehicle lamp 10 of a first embodiment of the present invention.

FIG. 1 is a longitudinal sectional view of a vehicle lamp 10 of the first embodiment of the present invention.

As illustrated in FIG. 1, the vehicle lamp 10 of the present embodiment is configured as a vehicle headlamp that includes an excitation light source 12, a light reflector 201 that two-dimensionally (in a horizontal direction and vertical direction) scans an excitation light Ray from an excitation light source 12, the excitation light ray being condensed through a condenser lens 14, a wavelength converter 18 in which a two-dimensional image corresponding to a predetermined light distribution pattern is drawn with the excitation light Ray that is two-dimensionally (in the horizontal direction and vertical direction) scanned by the light reflector 201, a projection lens 20 that projects the two-dimensional image drawn in the wavelength converter 18 forward, and the like.

The light reflector 201, wavelength converter 18, and projection lens 20, as illustrated in FIG. 1, are arranged so that the excitation light Ray from excitation light source 12 that is two-dimensionally (in the horizontal direction and vertical direction) scanned by the light reflector 201 is transmitted from a rear face 18a of the wavelength converter 18 to a front face 18b thereof. That is, the light reflector 201 is arranged at behind the wavelength converter 18, and the projection lens 20 is arranged in front of the wavelength converter 18. This kind of arrangement is called a transmission type. In this case, the excitation light source 12 may be arranged at either behind or in front of the wavelength converter 18. In FIG. 1, although the projection lens 20 is configured as a projection lens composed of a group of four lenses 20A to 20D, the projection lens 20 may be configured as a projection lens composed of one aspherical lens.

Figure 2:
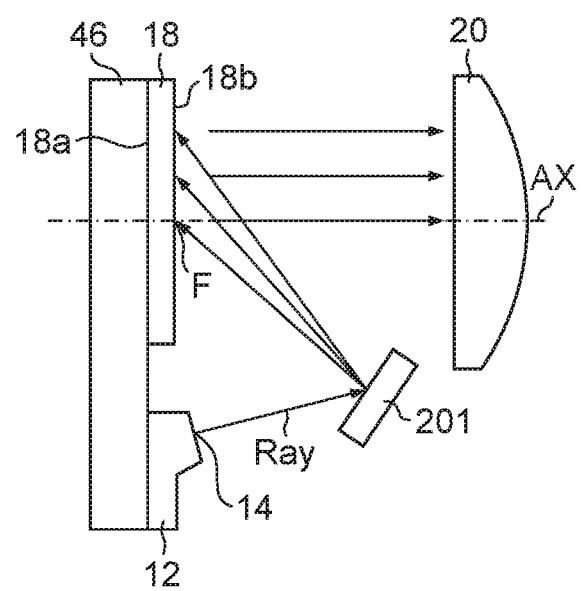
FIG. 2 is a schematic view of a variation of the vehicle lamp 10.

The light reflector 201, wavelength converter 18, and projection lens 20, as illustrated in FIG. 2, may be arranged so that the excitation light Ray from excitation light source 12 that is two-dimensionally (in the horizontal direction and vertical direction) scanned by the light reflector 201 enters the front face 18b of the wavelength converter 18. That is, both of the light reflector 201 and projection lens 20 may be arranged in front of the wavelength converter 18. This kind of arrangement is called a reflection type. In this case, the excitation light source 12 may be arranged at either behind or in front of the wavelength converter 18. The arrangement of the reflection type illustrated in FIG. 2 has an advantage in that the vehicle lamp 10 can be shortened in length in a direction of a reference axis AX thereof as compared with the arrangement of the transmission type illustrated in FIG. 1. In FIG. 2, although the projection lens 20 is configured as a projection lens composed of one aspherical lens, the projection lens 20 may be configured as a projection lens composed of a group of a plurality of lenses.

The excitation light source 12, for example, is a semiconductor light emission element such as a laser diode (LD) that emits a laser beam in a blue region (such as 450 nm of a light emission wavelength) as the excitation light. The excitation light source 12 may be a semiconductor light emission element such as a laser diode (LD) that emits a laser beam in a near-ultraviolet region (such as 405 nm of a light emission wavelength). The excitation light source 12 may be also a light emitting diode (LED). The excitation light from the excitation light source 12 is condensed (collimated, for example) through the condenser lens 14 to be incident on the light reflector 201 (mirror unit).

The wavelength converter 18 is a plate-shaped (or layered-shaped) wavelength converter with an outline in the shape of a rectangle. The wavelength converter 18 receives a laser beam that is two-dimensionally (in the horizontal direction and vertical direction) scanned by the light reflector 201, as the excitation light, and converts at least a part of the laser beam to light with a different wavelength. In FIG. 1, the wavelength converter 18 is fixed to a frame body 22 in its periphery along an outline of rear face 18a, and is arranged near a focus F of the projection lens 20. In FIG. 2, the wavelength converter 18 is fixed to a support 46 in its rear face 18a, and is arranged near the focus F of the projection lens 20.

For example, when the laser diode (LD) that emits a laser beam in the blue region is used as the excitation light source 12, the wavelength converter 18 employs a plate-shaped (or layered-shaped) phosphor with an outline in the shape of a rectangle that emits yellow light by being excited by the laser beam in the blue region. In the wavelength converter 18, a two-dimensional image corresponding to the predetermined light distribution pattern is drawn as a white image with the laser beam in the blue region, being two-dimensionally (in the horizontal direction and vertical direction) scanned by the light reflector 201. The two-dimensional image is drawn as the white image because when the wavelength converter 18 is irradiated with a laser beam in the blue region, the wavelength converter 18 emits white light (pseudo white light) composed of mixed color of the laser beam in the blue region, transmitting (passing through) the wavelength converter 18, and light (yellow light) emitted by using the laser beam in the blue region.

Meanwhile, when the laser diode (LD) that emits a laser beam in the near-ultraviolet region is used as the excitation light source 12, the wavelength converter 18 employs a plate-shaped (or layered-shaped) phosphor with an outline in the shape of a rectangle that emits light of three colors, red, green, and blue by being excited by the laser beam in the near-ultraviolet region. In the wavelength converter 18, a two-dimensional image corresponding to the predetermined light distribution pattern is drawn as a white image with the laser beam in the near-ultraviolet region, being two-dimensionally (in the horizontal direction and vertical direction) scanned by the light reflector 201. The two-dimensional image is drawn as the white image because when irradiated with a laser beam in the near-ultraviolet region, the wavelength converter 18 emits white light (pseudo white light) composed of mixed color of light (light of three colors, red, green, and blue) emitted by using the laser beam in the near-ultraviolet region.

As illustrated in FIG. 1, the projection lens 20 is configured as a projection lens composed of the group of the four lenses 20A to 20D in which aberration (image surface curvature) as well as chromatic aberration is corrected to allow an image surface to be flat. In this case, the wavelength converter 18 in the shape of a flat plate is used and arranged along the image surface (flat surface). The focus F of the projection lens 20 is positioned near the wavelength converter 18. The projection lens 20 can eliminate influence of the aberration on the predetermined light distribution pattern as compared with a case of using one convex lens. The wavelength converter 18 being the shape of a flat plate facilitates its manufacture as compared with the wavelength converter 18 being the shape of a curved surface. In addition, the wavelength converter 18 being the shape of a flat plate facilitates drawing of a two-dimensional image as compared with the wavelength converter 18 being the shape of a curved surface.

The projection lens 20 may be configured as a projection lens composed of one aspherical lens in which aberration (image surface curvature) is not corrected to allow an image surface to be flat. In this case, the wavelength converter 18 with a curved shape corresponding to the image surface curvature is used and arranged along the image surface curvature. The focus F of the projection lens 20 is positioned near the wavelength converter 18.

The projection lens 20 projects a two-dimensional image corresponding to the predetermined light distribution pattern drawn in the wavelength converter 18 forward to form the predetermined light distribution pattern (such as a low-beam light distribution pattern and a high-beam light distribution pattern) on a virtual vertical screen facing the vehicle lamp 10 (arranged about 25 m ahead of the vehicle lamp 10).

The light reflector 201 two-dimensionally (in the horizontal direction and vertical direction) scans the excitation light Ray from the excitation light source 12, being condensed (collimated, for example) through the condenser lens 14.

The light reflector 201, for example, is a micro electro mechanical systems (MEMS) scanner. Although a drive method of the light reflector broadly includes a piezoelectric method, an electrostatic method, and an electromagnetic method, any one of the methods is available. In the present embodiment, a light reflector of the piezoelectric method will be representatively described.

Although the piezoelectric method broadly includes a uniaxial nonresonant/uniaxial resonant type, a biaxial nonresonant type, and a biaxial resonant type, any one of the methods is available.

First, the light reflector 201 of a uniaxial nonresonant/uniaxial resonant type will be described.

(Uniaxial Nonresonant/Uniaxial Resonant Type)

Figure 3:
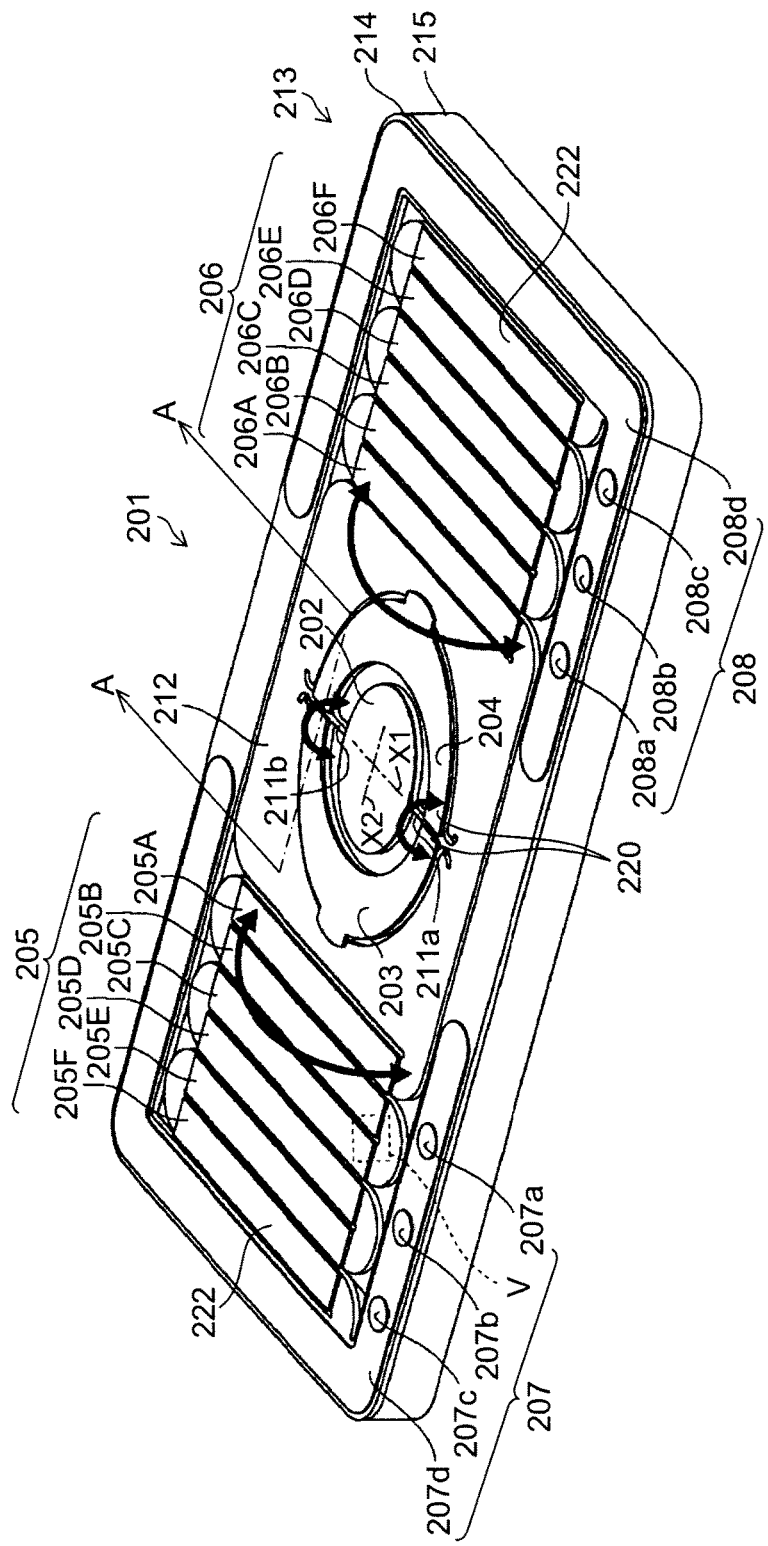
FIG. 3 is a perspective view of a light reflector 201 of a uniaxial nonresonant/uniaxial resonant type.

FIG. 3 is a perspective view of the light reflector 201 of a uniaxial nonresonant/uniaxial resonant type.

As illustrated in FIG. 3, the light reflector 201 of a uniaxial nonresonant/uniaxial resonant type includes a mirror unit 202 (also called an MEMS mirror), first piezoelectric actuators 203 and 204 that drive the mirror unit 202 through torsion bars 211a and 211b, a movable frame 212 that supports the first piezoelectric actuators 203 and 204, second piezoelectric actuators 205 and 206 that drive the movable frame 212, and a base 215 that supports the second piezoelectric actuators 205 and 206.

The mirror unit 202 has a circular shape and opposite ends to which the corresponding torsion bars 211a and 211b extending outward are coupled. The first piezoelectric actuators 203 and 204 in the shape of a semi-circle are arranged at an interval so as to surround the mirror unit 202. The first piezoelectric actuators 203 and 204 are coupled to each other at corresponding one of opposite ends of the actuators across one torsion bar 211a as well as at the corresponding other ends across the other torsion bar 211b, while facing each other. The outside of a center position of the semi-circle of each of the first piezoelectric actuators 203 and 204 is coupled to the movable frame 212 provided so as to surround the mirror unit 202 and the first piezoelectric actuators 203 and 204, and is supported.

The movable frame 212 has a rectangular shape, includes a pair of opposite ends in a direction orthogonal to the torsion bars 211a and 211b, the opposite ends being coupled to the corresponding leading ends of the second piezoelectric actuators 205 and 206, facing each other across the movable frame 212. The second piezoelectric actuators 205 and 206 each include a base end that is coupled to a support base end 214 of the base 215 provided so as to surround the movable frame 212 and the second piezoelectric actuators 205 and 206, and that is supported.

Figure 4A:
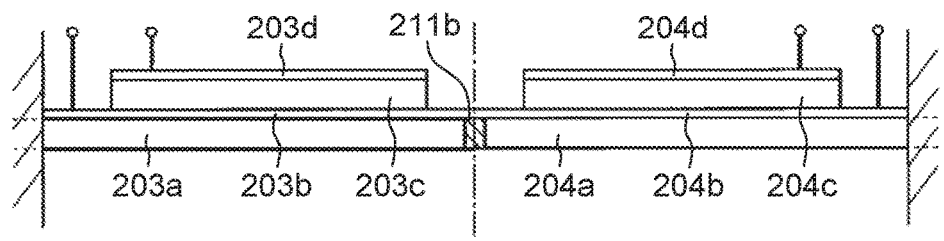
FIG. 4A illustrates a state where no voltage is applied to first piezoelectric actuators 203 and 204.

As illustrated FIG. 4A, the first piezoelectric actuators 203 and 204 includes corresponding one of piezoelectric cantilevers that have supports 203a and 204a, lower electrodes 203b and 204b, piezoelectric bodies 203c and 204c, and upper electrodes 203d and 204d, respectively.

As illustrated in FIG. 3, the second piezoelectric actuators 205 and 206 includes six piezoelectric cantilevers 205A to 205F and six piezoelectric cantilevers 206A to 206F, respectively. In each of the six piezoelectric cantilevers, the piezoelectric cantilevers are coupled to each other so as to be folded back at each of ends of the piezoelectric cantilevers, thereby constituting a piezoelectric actuator like bellows as a whole. Each of the piezoelectric cantilevers 205A to 205F, and each of the piezoelectric cantilevers 206A to 206F, have the same structure as that of each of the piezoelectric cantilevers provided in the respective first piezoelectric actuators 203 and 204.

Next, movement (oscillation around the first shaft X1) of the mirror unit 202 will be described.

Figure 4B:
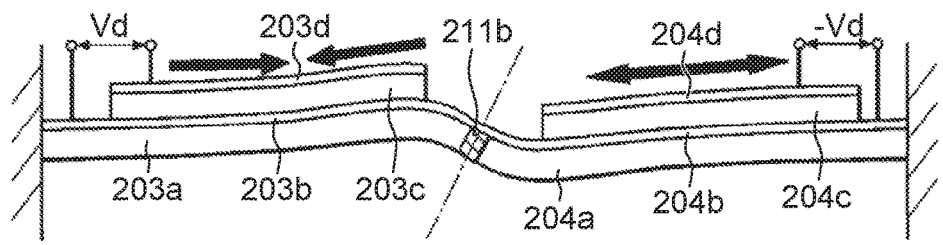
FIG. 4B illustrates a state where voltage is applied to the first piezoelectric actuators 203 and 204.

Each of FIGS. 4A and 4B is a sectional view taken along the line 4-4 illustrated in FIG. 3. FIG. 4A illustrates a state where no voltage is applied to the first piezoelectric actuators 203 and 204, and FIG. 4B illustrates a state where voltage is applied thereto.

As illustrated in FIG. 4B, when voltage ±Vd with a polarity opposite to each other applied between the upper electrode 203d and 204d, and the corresponding lower electrodes 203b and 204b, in the respective first piezoelectric actuators 203 and 204, to drive the first piezoelectric actuators, the first piezoelectric actuators are bent and deformed in a direction opposite to each other. This bend and deformation allow the torsion bar 211b to turn as illustrated in FIG. 4B. The same applies to the torsion bar 211a. The mirror unit 202 oscillates around the first shaft X1 with respect to the movable frame 212 in accordance with turning of the torsion bars 211a and 211b.

Subsequently, movement (oscillation around the second shaft X2) of the mirror unit 202 will be described.

Figure 5A:
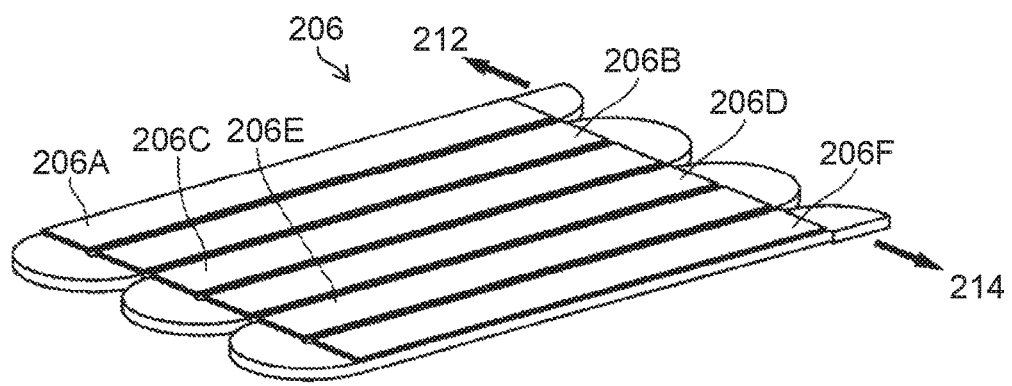
FIG. 5A illustrates a state where no voltage is applied to second piezoelectric actuators 205 and 206.
Figure 5B:
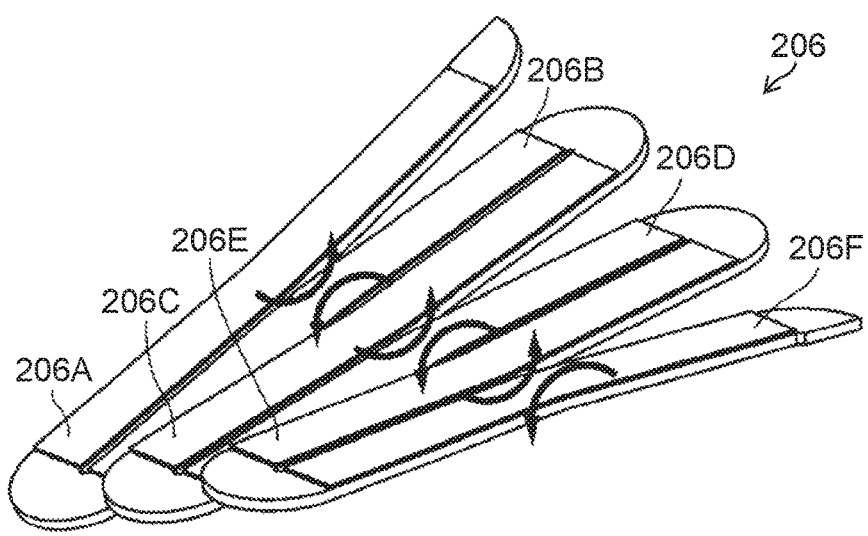
FIG. 5B illustrates a state where voltage is applied to the second piezoelectric actuators 205 and 206.

FIG. 5A illustrates a state where no voltage is applied to the second piezoelectric actuators 205 and 206, and FIG. 5B illustrates a state where voltage is applied thereto.

As illustrated in FIG. 5B, applying voltage to the second piezoelectric actuator 206 allows odd-numbered piezoelectric cantilevers 206A, 206C, and 206E from the movable frame 212 to be bent and deformed upward, as well as even-numbered piezoelectric cantilevers 206B, 206D, and 206F to be bent and deformed downward. Accordingly, angle displacement corresponding to an added amount of bent deformation of each of the piezoelectric cantilevers 206A to 206F occurs. The same applies to the second piezoelectric actuator 205. The angle displacement allows the movable frame 212 (and the mirror unit 202 supported thereby) to turn around the second shaft X2 orthogonal to the first shaft X1 with respect to the base 215. The first shaft X1 and the second shaft X2 are orthogonal to each other at the center of the mirror unit 202 (the center of gravity).

A mirror unit support of the mirror unit 202, a support of the torsion bars 211a and 211b as well as the first piezoelectric actuators 203 and 204, a support of the movable frame 212 as well as the second piezoelectric actuators 205 and 206, and the support base end 214 on the base 215 are integrally formed into one support by shaping a silicon plate. The base 215 is also formed of the silicon plate, and is formed integrally with the one support by shaping the silicon plate. A method of shaping a silicon plate in this way is described in Japanese Patent Application Laid-Open No. 2008-040240 in detail, for example. The mirror unit 202 and the movable frame 212 are provided at an interval, and thus the mirror unit 202 can oscillate around the first shaft X1 to a predetermined angle with respect to the movable frame 212. In addition, the movable frame 212 and the base 215 are provided at an interval, and thus the movable frame 212 (and the mirror unit 202 supported thereby) can oscillate around the second shaft X2 to a predetermined angle with respect to the base 215.

The light reflector 201 includes electrode sets 207 and 208 to apply driving voltage to the respective piezoelectric actuators 203 to 206.

The electrode set 207 includes: an upper electrode pad 207a for applying driving voltage to the first piezoelectric actuator 203; a first upper electrode pad 207b for applying driving voltage to the odd-numbered piezoelectric cantilever 205A, 205C, and 205E from a leading end of the second piezoelectric actuator 205; a second upper electrode pad 207c for applying driving voltage to the even-numbered piezoelectric cantilever 205B, 205D, and 205F from the leading end of the second piezoelectric actuator 205; and a common lower electrode 207d that is used as a common lower electrode of the upper electrode pads 207a to 207c.

Likewise, the electrode set 208 includes: an upper electrode pad 208a for applying driving voltage to the first piezoelectric actuator 204; a first upper electrode pad 208b for applying driving voltage to the odd-numbered piezoelectric cantilever 206A, 206C, and 206E from the leading end of the second piezoelectric actuator 206; a second upper electrode pad 208c for applying driving voltage to the even-numbered piezoelectric cantilever 206B, 206D, and 206F from the leading end of the second piezoelectric actuator 206; and a common lower electrode 208d that is used as a common lower electrode of the three upper electrode pads 208a to 208c.

In the present embodiment, first alternating voltage is applied to the first piezoelectric actuator 203 as driving voltage, and second alternating voltage is applied to the first piezoelectric actuator 204 as driving voltage. The first alternating voltage and the second alternating voltage have phases opposite to each other, or phases shifted from each other (a sine wave, for example). At the time, alternating voltage with a frequency near a mechanical resonant frequency (a first resonant point) of the mirror unit 202 including the torsion bars 211a and 211b is applied to the first piezoelectric actuators 203 and 204 to resonantly drive them. This allows the mirror unit 202 to oscillate around the first shaft X1 with respect to the movable frame 212 to scan a laser beam, as excitation light incident on the mirror unit 202 from the excitation light source 12, in a first direction (horizontal direction, for example).

Then, third alternating voltage is applied to each of the second piezoelectric actuators 205 and 206 as driving voltage. At the time, alternating voltage with a frequency a frequency equal to or less than a predetermined value less than a mechanical resonant frequency (a first resonant point) of the movable frame 212 including the mirror unit 202, the torsion bars 211a and 211b, and the first piezoelectric actuators 203 and 204, is applied to the second piezoelectric actuators 205 and 206 to non-resonantly drive them. This allows the mirror unit 202 to oscillate around the second shaft X2 with respect to the base 215 to scan a laser beam, as excitation light incident on the mirror unit 202 from the excitation light source 12, in a second direction (vertical direction, for example).

The light reflector 201 of a uniaxial nonresonant/uniaxial resonant type is arranged while the first shaft X1 is included in a vertical plane as well as the second shaft X2 is included in a horizontal plane. Arranging the light reflector 201 in this way enables a predetermined light distribution pattern (two-dimensional image corresponding to the predetermined light distribution pattern) that is wide in the horizontal direction and narrow in the vertical direction and is required for the vehicle headlamp, to be easily formed (drawn). A reason for that will be described below.

Figure 6A:
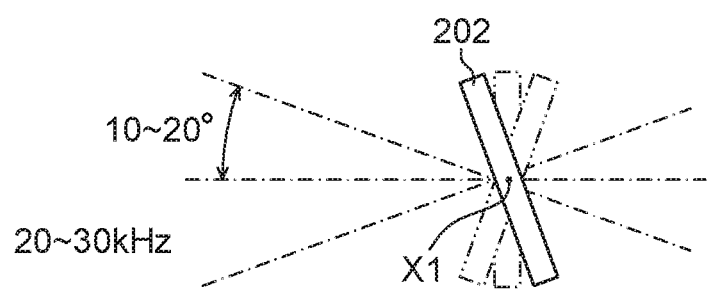
FIG. 6A illustrates a maximum angle of oscillation around a first shaft X1 of a mirror unit 202.
Figure 6B:
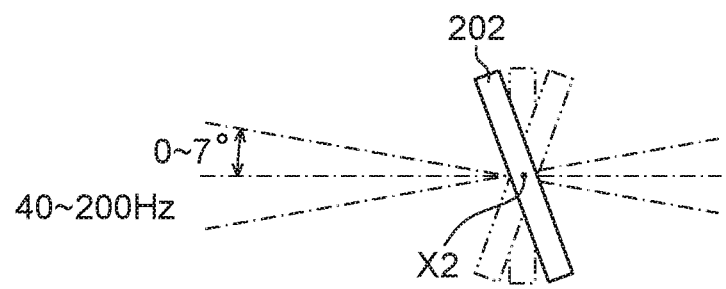
FIG. 6B illustrates a maximum angle of oscillation around a second shaft X2 of the mirror unit 202.

In the light reflector 201 of a uniaxial nonresonant/uniaxial resonant type, a maximum oscillation angle around the first shaft X1 of the mirror unit 202 is more than a maximum oscillation angle around the second shaft X2 of the mirror unit 202. For example, the oscillation around the first shaft X1 of the mirror unit 202 is caused by resonant drive, and thus the maximum oscillation angle around the first shaft X1 of the mirror unit 202 is from 10 to 20 degrees as illustrated in FIG. 6A. In contrast, the oscillation around the second shaft X2 of the mirror unit 202 is caused by nonresonant drive, and thus the maximum oscillation angle around the second shaft X2 of the mirror unit 202 is about 7 degrees as illustrated in FIG. 6B. As a result, arranging the light reflector 201 of a uniaxial nonresonant/uniaxial resonant type as described above enables the predetermined light distribution pattern (two-dimensional image corresponding to the predetermined light distribution pattern) that is wide in the horizontal direction and narrow in the vertical direction and is required for the vehicle headlamp, to be easily formed (drawn).

As above, driving each of the piezoelectric actuators 203 to 206 allows the laser beam as the excitation light from the excitation light source 12 to be two-dimensionally (in the horizontal direction and vertical direction) scanned.

As illustrated in FIG. 3, the light reflector 201 includes an H-sensor 220 arranged at a base of the torsion bar 211a, on a mirror unit 202 side, and a V-sensor 222 arranged on a base end side (such as the piezoelectric cantilevers 205F and 206F) of the second piezoelectric actuators 205 and 206.

The H-sensor 220 is a piezoelectric element (PZT: lead zirconate titanate), which is the same as the piezoelectric cantilevers provided in the first piezoelectric actuators 203 and 204, and generates voltage in accordance with bent deformation (displacement) of the first piezoelectric actuators 203 and 204. The V-sensor 222 is a piezoelectric element (PZT), which is the same as the piezoelectric cantilevers provided in the second piezoelectric actuators 205 and 206, and generates voltage in accordance with bent deformation (displacement) of the second piezoelectric actuators 205 and 206.

Figure 19:
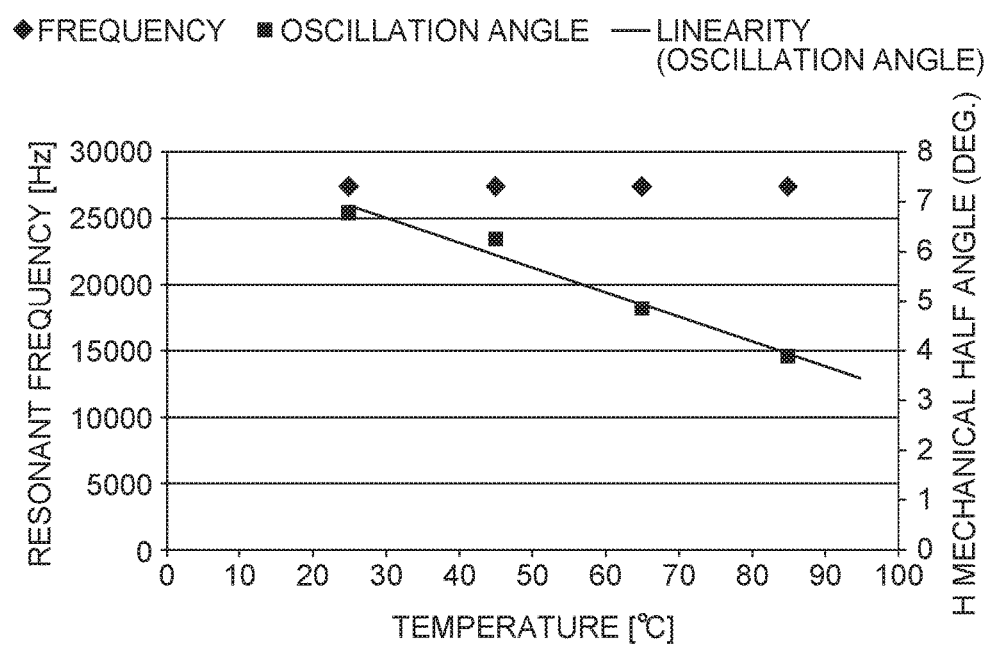
FIG. 19 is a graph illustrating a relationship among a temperature change, a resonant frequency, and a mechanical oscillation angle (half angle) around the first shaft X1 of the mirror unit 202.

In the light reflector 201, a mechanical oscillation angle (half angle) around the first shaft X1 of the mirror unit 202 changes in accordance with change in natural frequency of material constituting the light reflector 201 due to temperature change, as illustrated in FIG. 19. This change can be reduced as follows. For example, controlling frequency of the first alternating voltage and the second alternating voltage, to be applied to the first piezoelectric actuators 203 and 204 (or the first alternating voltage and the second alternating voltage themselves), by feedback control, on the basis of a driving signal (the first alternating voltage and the second alternating voltage, applied to the first piezoelectric actuators 203 and 204), and a sensor signal (output of the H-sensor 220), allows a mechanical oscillation angle (half angle) around the first shaft X1 of the mirror unit 202 to be a target value, and thus the change can be reduced.

Subsequently, there will be described desirable frequencies of the first alternating voltage and the second alternating voltage, to be applied to the first piezoelectric actuators 203 and 204, as well as a desirable frequency of the third alternating voltage to be applied to the second piezoelectric actuator 205 and 206, which has been studied by the inventors of the present application.

The inventors of the present application have performed experiments and studied results of the experiments to reach a conclusion that a frequency of about 4 to 30 kHz (sine wave) is desirable, and a frequency of 27±3 kHz (sine wave) is more desirable, as a frequency (hereinafter referred to as a horizontal scan frequency $f_H$) of each of the first alternating voltage and the second alternating voltage, to be applied to the first piezoelectric actuators 203 and 204 in the light reflector 201 of a uniaxial nonresonant/uniaxial resonant type configured as above.

The inventors of the present application also have reached a conclusion that a horizontal resolution (pixel number) of 300 lines (or more) is desirable to enable a vehicle lamp to be turned on or off (lighting or non-lighting) by 0.1 degree (or less) in the horizontal direction within a range from 15 degrees left from a vertical axis V and to 15 degrees right therefrom in consideration of a high-beam light distribution pattern.

In addition, the inventors of the present application have performed experiments and studied results of the experiments to reach a conclusion that a frequency of 55 Hz or more (sawtooth wave) is desirable, and a frequency of 55 Hz to 120 Hz (sawtooth wave) is more desirable, a frequency of 55 Hz to 100 Hz (sawtooth wave) is furthermore desirable, particularly a frequency of 70±10 Hz (sawtooth wave) is desirable, as a frequency (hereinafter referred to as a vertical scan frequency $f_V$) of the third alternating voltage to be applied to the second piezoelectric actuators 205 and 206 in the light reflector 201 of a uniaxial nonresonant/uniaxial resonant type configured as above.

In consideration of a predetermined normal traveling speed (such as 0 to 150 km per hour), there has been reached a conclusion that a frequency of 50 Hz or more (sawtooth wave) is desirable, a frequency of 50 Hz to 120 Hz (sawtooth wave) is more desirable, and a frequency of 50 Hz to 100 Hz (sawtooth wave) is furthermore desirable, particularly a frequency of 70±10 Hz (sawtooth wave) is desirable, as a frequency (vertical scan frequency $f_V$) of the third alternating voltage to be applied to the second piezoelectric actuators 205 and 206. A frame rate depends on the vertical scan frequency $f_V$, and thus the frame rate is 70 fps if the vertical scan frequency $f_V$ is 70 Hz.

A vertical scan frequency $f_V$ of 55 Hz or more allows the predetermined light distribution pattern to be formed on the virtual vertical screen as an image (may be also called a moving image or a video) with a frame rate of 55 fps or more. Likewise, a vertical scan frequency $f_V$ of 55 to 120 Hz allows the predetermined light distribution pattern to be formed on the virtual vertical screen as an image (may be also called a moving image or a video) with a frame rate of 55 fps or more and 120 fps or less, a vertical scan frequency $f_V$ of 55 to 100 Hz allows the predetermined light distribution pattern to be formed on the virtual vertical screen as an image (may be also called a moving image or a video) with a frame rate of 55 fps or more and 100 fps or less, and a vertical scan frequency $f_V$ of 70±10 Hz allows the predetermined light distribution pattern to be formed on the virtual vertical screen as an image (may be also called a moving image or a video) with a frame rate of 70±10 fps. The same applies to vertical scan frequencies $f_V$ of 50 Hz or more, 50 Hz to 120 Hz, 50 Hz to 100 Hz, and 70±10 Hz.

A vertical resolution (the number of vertical scanning lines) can be acquired by the following expression.

Vertical resolution (the number of vertical scanning lines)=$2 \times K_V$ (a coefficient of usage time of vertical scan)$\times f_H/f_V$.

The expression, where the horizontal scan frequency $f_H$ is 25 kHz, the vertical scan frequency $f_V$ is 70 Hz, and the time coefficient $K_V$ of usage time of vertical scan is 0.9 to 0.8, for example, gives the number of vertical scanning lines of about 600 ($2 \times 25$ kHz/70 Hz$\times 0.9$ to 0.85).

Each of the desirable vertical scan frequency $f_V$ described above has never been used in a vehicle lamp, such as a vehicle headlamp, and has been found in the results of the experiments performed by the inventors of the present application. That is, there has been common general technical knowledge that a frequency of 100 Hz or more is used to reduce a flicker in a general illumination field (other than vehicle lamps, such as a vehicle headlamp), as well as a frequency of 220 Hz or more is used to reduce a flicker in vehicle lamps, such as a vehicle headlamp, whereby each of the desirable vertical scan frequency $f_V$ described above has never been used in a vehicle lamp, such as a vehicle headlamp.

Subsequently, the common general technical knowledge that a frequency of 100 Hz or more is used to reduce a flicker in a general illumination field (other than vehicle lamps, such as a vehicle headlamp) will be described using a reference example.

For example, the ministerial ordinance defining technical standards of electrical equipment (Ordinance of the Ministry of International Trade and Industry No. 85 of 1962) describes, "light output should be without a flicker". This has been interpreted as "a lamp with a repeated frequency of 100 Hz or more as well as no lack of light output, or with a repeated frequency of 500 Hz or more" that does not have a flicker. This ministerial ordinance has not been applied to vehicle lamps, such as a vehicle headlamp.

Nikkei Newspaper (Aug. 26, 2010) describes, " . . . a frequency of alternating current is 50 Hz. Voltage through a rectifier is repeatedly turned on and off at a frequency of 100 times per second. Change in brightness in accordance with change in voltage occurs in fluorescent light. However, LED illumination has no afterglow time like fluorescent light, and thus brightness changes quickly. As a result, a flicker tends to be easily felt . . . .", to show that a flicker tends to be easily felt at a frequency of 100 Hz or more.

In general, a flicker is not felt at a blinking cycle of 100 to 120 Hz (a power source cycle of 50 to 60 Hz) in fluorescent light.

Subsequently, the common general technical knowledge that a frequency of 220 Hz or more (or a frame rate of 220 fps or more) is used to reduce a flicker in vehicle lamps, such as a vehicle headlamp, will be described using a reference example.

A metal halide lamp (HID) used in a vehicle headlamp typically has a lighting condition of a rectangular wave of 350 to 500 Hz. This is determined by reasons such as: a frequency of 800 Hz or more causes sound noise; a low frequency reduces light emission efficiency of the HID; and a frequency of 150 Hz or less shortens a life of the HID due to influence on wear of an electrode by heating. The lighting condition is preferably 250 Hz or more.

International Symposium on Automotive Lighting (ISAL) paper, 2013, with the title of "Glare-free High Beam with Beam-scanning" (in pages 340 to 347) recommends a frequency of 220 Hz or more as well as of 300 to 400 Hz or more for a vehicle lamp, such as a vehicle headlamp. Likewise, ISAL 2013 paper with the title of "Flickering effects of vehicle exterior light systems and consequences" (in pages 262 to 266) also describes a frequency of about 400 Hz in a vehicle lamp, such as a vehicle headlamp.

As above, it has never been known that a flicker in a vehicle lamp, such as a vehicle headlamp, can be reduced by using a frequency of 55 Hz or more (55 to 120 Hz is desirable) as a vertical scan frequency $f_V$.

Subsequently, there will be described the experiments that was performed by the inventors of the present application to study the desirable vertical scan frequency $f_V$ describe above.

(Experiments)

The inventors of the present application performed experiments by using a test system imitating a vehicle headlamp (head lamp) during traveling to evaluate a flicker level felt by a test subject.

Figure 7:
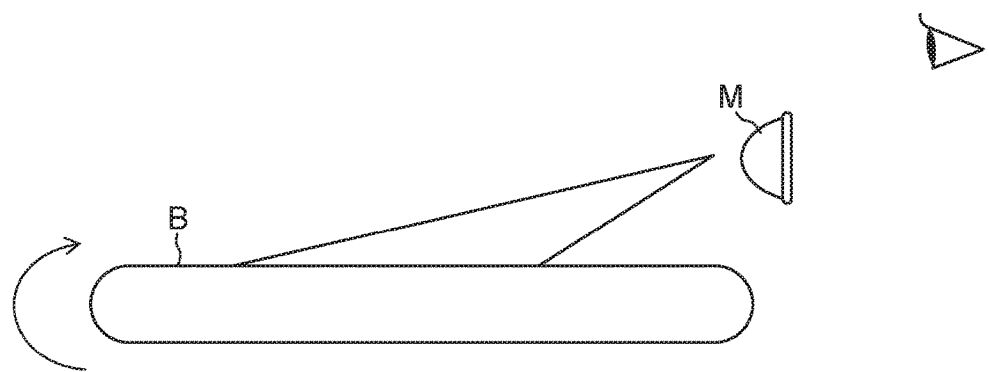
FIG. 7 is a schematic view of a test system.

FIG. 7 is a schematic view of the test system.

As illustrated in FIG. 7, the test system used a movable road model using a rotating belt B capable of changing its rotary speed (white lines and the like, imitating an actual road, were drawn on a surface of the rotating belt B at a scale of 1/5), and a lamp model M same as the vehicle lamp 10, capable of changing output (scan illuminance) of an excitation light source same as the excitation light source 12.

First, an experiment was performed to determine whether there was a difference in a flicker felt by a test subject between the case where the surface of the rotating belt B was irradiated with a lamp model M with an excitation light source of an LED and the case where the surface of the rotating belt B was irradiated with a lamp model M with an excitation light source of an LD. Results of the experiment shows that there was no deviation in a flicker felt by the test subject if the vertical scan frequency $f_V$ is identical to each other in both the case where the surface of the rotating belt B was irradiated with the lamp model M with an excitation light source of an LED and the case where the surface of the rotating belt B was irradiated with the lamp model M with an excitation light source of an LD.

Figure 8:
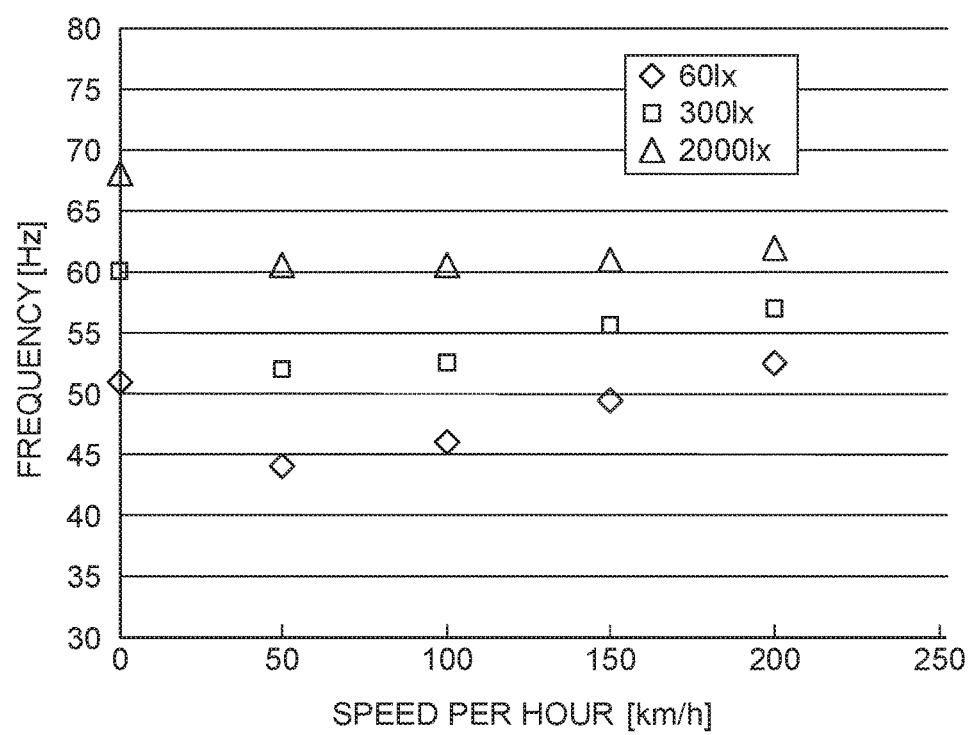
FIG. 8 is a graph in which experiment results (measurement results) are plotted.

Next, the rotating belt B was run so as to be each of traveling speeds (0 km/h, 50 km/h, 100 km/h, 150 km/h, and 200 km/h) to measure a vertical scan frequency $f_V$ at which the test subject felt no flicker. Specifically, the test subject operated a dial to change the vertical scan frequency $f_V$, and stopped operating the dial when no flicker is felt. Then, the vertical scan frequency $f_V$ at the time was measured. The vertical scan frequency $f_V$ was measured at illuminance of 60 lx equivalent to illuminance on a road surface about 30 to 40 m ahead of a vehicle (a region where a driver most frequently watches during driving), at illuminance of 300 lx equivalent to illuminance on a road surface about 10 m ahead of the vehicle (a region in front of the vehicle), and at illuminance of 2000 lx equivalent to illuminance of a reflected light from a near vehicle traveling ahead and a guard rail. FIG. 8 is a graph in which experiment results (measurement results) are plotted to show a relationship between a traveling speed and a flicker. In the graph, the vertical axis represents a vertical scan frequency $f_V$, and the horizontal axis represents a traveling speed per hour.

The following matters can be understood with reference to FIG. 8.

First, a vertical scan frequency $f_V$ at which no flicker is felt at illuminance of 60 lx on a road surface and a traveling speed of 0 to 200 km/h is 55 kHz or more. In consideration of this and illuminance of about 60 lx on a road surface in a region where a driver most frequently watches during driving, a vertical scan frequency $f_V$ of 55 kHz or more is desirable to reduce a flicker in a vehicle lamp, such as a vehicle headlamp.

Second, a vertical scan frequency $f_V$ at which no flicker is felt at illuminance of 60 lx on a road surface and a traveling speed of 0 to 150 km/h is 50 kHz or more. In consideration of this and illuminance of about 60 lx on a road surface in a region where a driver most frequently watches during driving, a vertical scan frequency $f_V$ of 50 kHz or more is desirable to reduce a flicker in the vehicle lamp, such as a vehicle headlamp.

Third, as a traveling speed increases, a vertical scan frequency $f_V$ at which no flicker is felt tends to increase. In consideration of this, it is desirable to allow the vertical scan frequency $f_V$ to be variable to reduce a flicker in the vehicle lamp, such as a vehicle headlamp. For example, it is desirable to increase the vertical scan frequency $f_V$ as the traveling speed increases.

Fourth, as illuminance increases, a vertical scan frequency $f_V$ at which no flicker is felt tends to increase. In consideration of this, it is desirable to allow the vertical scan frequency $f_V$ to be variable to reduce a flicker in the vehicle lamp, such as a vehicle headlamp. For example, it is desirable to increase the vertical scan frequency $f_V$ as the illuminance increases.

Fifth, a vertical scan frequency $f_V$ at which no flicker is felt during a stop at a speed of 0 km/h is higher than that during traveling at a speed of 50 to 150 km/h. In consideration of this, it is desirable to allow the vertical scan frequency $f_V$ to be variable to reduce a flicker in the vehicle lamp, such as a vehicle headlamp. For example, if a vertical scan frequency during a stop is indicated as $f_V1$, as well as a vertical scan frequency during traveling is indicated as $f_V2$, it is desirable to satisfy a relationship of $f_V1 > f_V2$.

Sixth, a vertical scan frequency $f_V$ at which no flicker is felt at illuminance of each of 60 lx, 300 lx, and 2000 lx and a traveling speed of 0 to 200 km/h does not exceed 70 kHz. In consideration of this, a vertical scan frequency $f_V$ of 70 kHz or more, or that of 70±10 Hz is desirable to reduce a flicker in the vehicle lamp, such as a vehicle headlamp.

The inventors of the present application have reached a conclusion that a frequency of 120 Hz or less (sawtooth wave) is desirable, particularly a frequency of 100 Hz or less (sawtooth wave) is more desirable, as a frequency (vertical scan frequency $f_V$) of the third alternating voltage to be applied to the second piezoelectric actuator 205 and 206 in consideration of a mechanical resonant point (hereinafter referred to as a resonant point on a V side) of the movable frame 212 including the mirror unit 202, the torsion bars 211a and 211b, and the first piezoelectric actuators 203 and 204. A reason for that will be described below.

Figure 9:
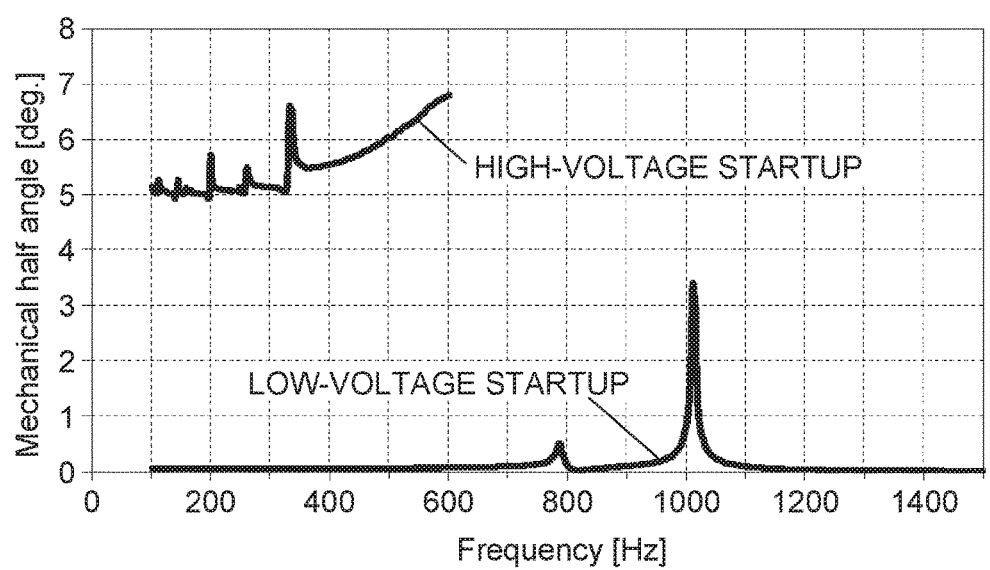
FIG. 9 is a graph illustrating a relationship between an oscillation angle of the mirror unit 202 and a frequency.

FIG. 9 is a graph illustrating a relationship between an oscillation angle of the mirror unit 202 and a frequency, and the vertical axis represents an oscillation angle as well as the horizontal axis represents a frequency of application voltage (a sine wave or a triangular wave, for example).

For example, when voltage of about 2 V is applied to the second piezoelectric actuator 205 and 206 (at low-voltage startup), as illustrated in FIG. 9, the resonant points on the V side exist around 1000 Hz and 800 Hz. Meanwhile, when voltage of about 45 V is applied to the second piezoelectric actuator 205 and 206 (at high-voltage startup), the resonant points on the V side exist around 350 Hz and 200 Hz at the maximum oscillation angle. To achieve periodical vibration (oscillation) for stable angle control, the vertical scan frequency $f_V$ needs to be set to avoid the resonant points on the V side. From this viewpoint, a frequency of 120 Hz or less (sawtooth wave) is desirable, and a frequency of 100 Hz or less (sawtooth wave) is more desirable, as a frequency (vertical scan frequency $f_V$) of the third alternating voltage to be applied to the second piezoelectric actuator 205 and 206. If the frequency (vertical scan frequency $f_V$) of the third alternating voltage to be applied to the second piezoelectric actuator 205 and 206 exceeds 120 Hz, the light reflector 201 is deteriorated in reliability, durability, lifetime, and the like. Thus, also from this viewpoint, a frequency of 120 Hz or less (sawtooth wave) is desirable, and a frequency of 100 Hz or less (sawtooth wave) is more desirable, as a frequency (vertical scan frequency $f_V$) of the third alternating voltage to be applied to the second piezoelectric actuator 205 and 206.

The desirable vertical scan frequency $f_V$ described above has been derived from knowledge that the inventors of the present application have newly found.

Subsequently, there will be described an example of a configuration of a control system that controls the excitation light source 12 and the light reflector 201.

Figure 10:
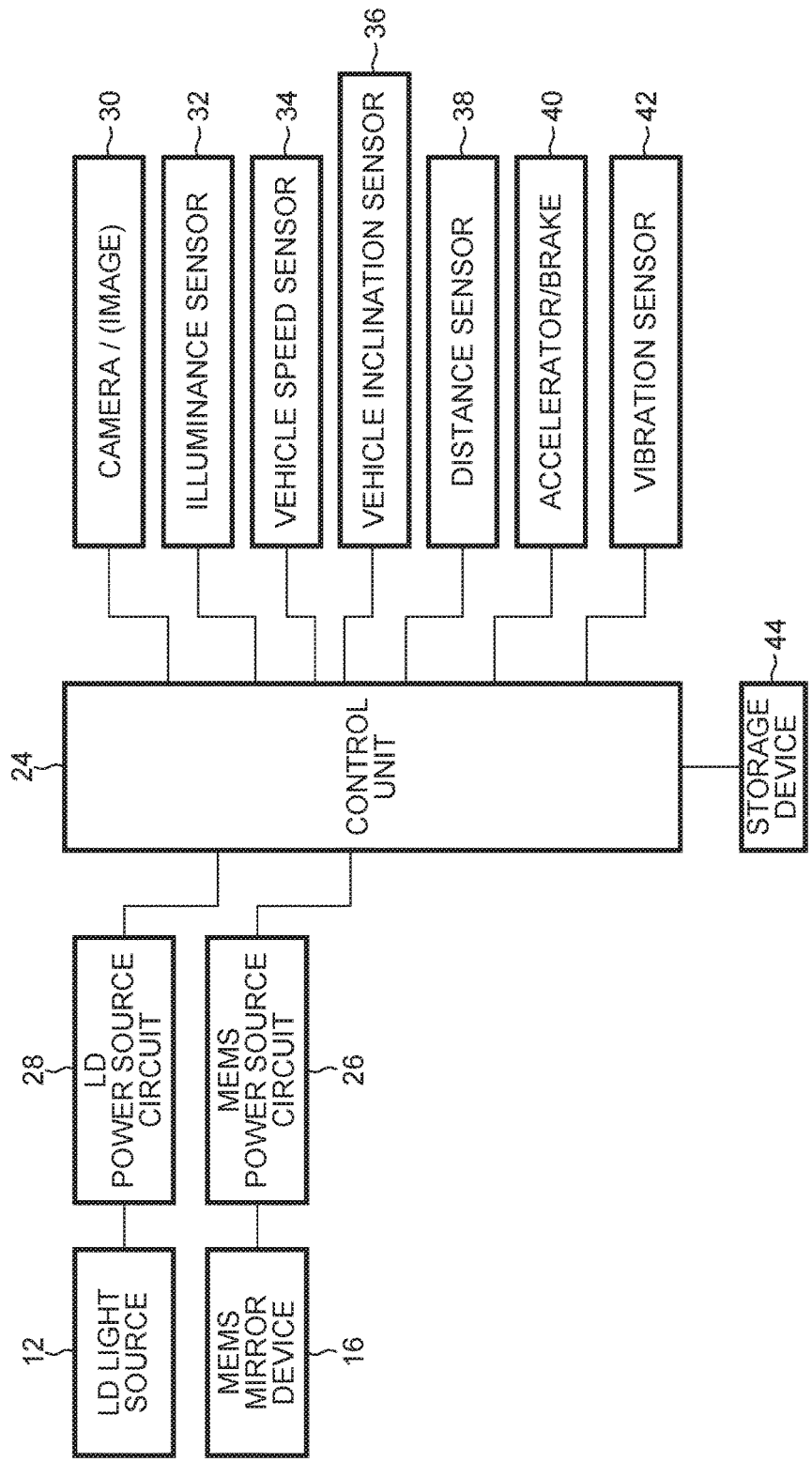
FIG. 10 illustrates an example of a configuration of a control system for controlling an excitation light source 12 and the light reflector 201.

FIG. 10 illustrates an example of the configuration of the control system for controlling an excitation light source 12 and the light reflector 201.

As illustrated in FIG. 10, the control system includes a control unit 24, and the components that are electrically connected to the control unit 24, such as an MEMS power source circuit 26, a LD power source circuit 28, an imaging apparatus (camera) 30, an illuminance sensor 32, a vehicle speed sensor 34, a vehicle inclination sensor 36, a distance sensor 38, an accelerator/brake sensor 40 for detecting operation of an accelerator and a brake, a vibration sensor 42, and a storage device 44.

The MEMS power source circuit 26 serves as piezoelectric actuator control means (or mirror unit control means) by applying the first and second alternating voltage (such a sine wave of 25 MHz) to the first piezoelectric actuators 203 and 204 in response to control by the control unit 24 to resonantly drive the first piezoelectric actuators 203 and 204, thereby allowing the mirror unit 202 to oscillate around the first shaft X1, as well as by applying the third alternating voltage (such as a sawtooth wave of 55 Hz) to the second piezoelectric actuators 205 and 206 to non-resonantly drive the second piezoelectric actuators 205 and 206, thereby allowing the mirror unit 202 to oscillate around the second shaft X2.

Figure 11:
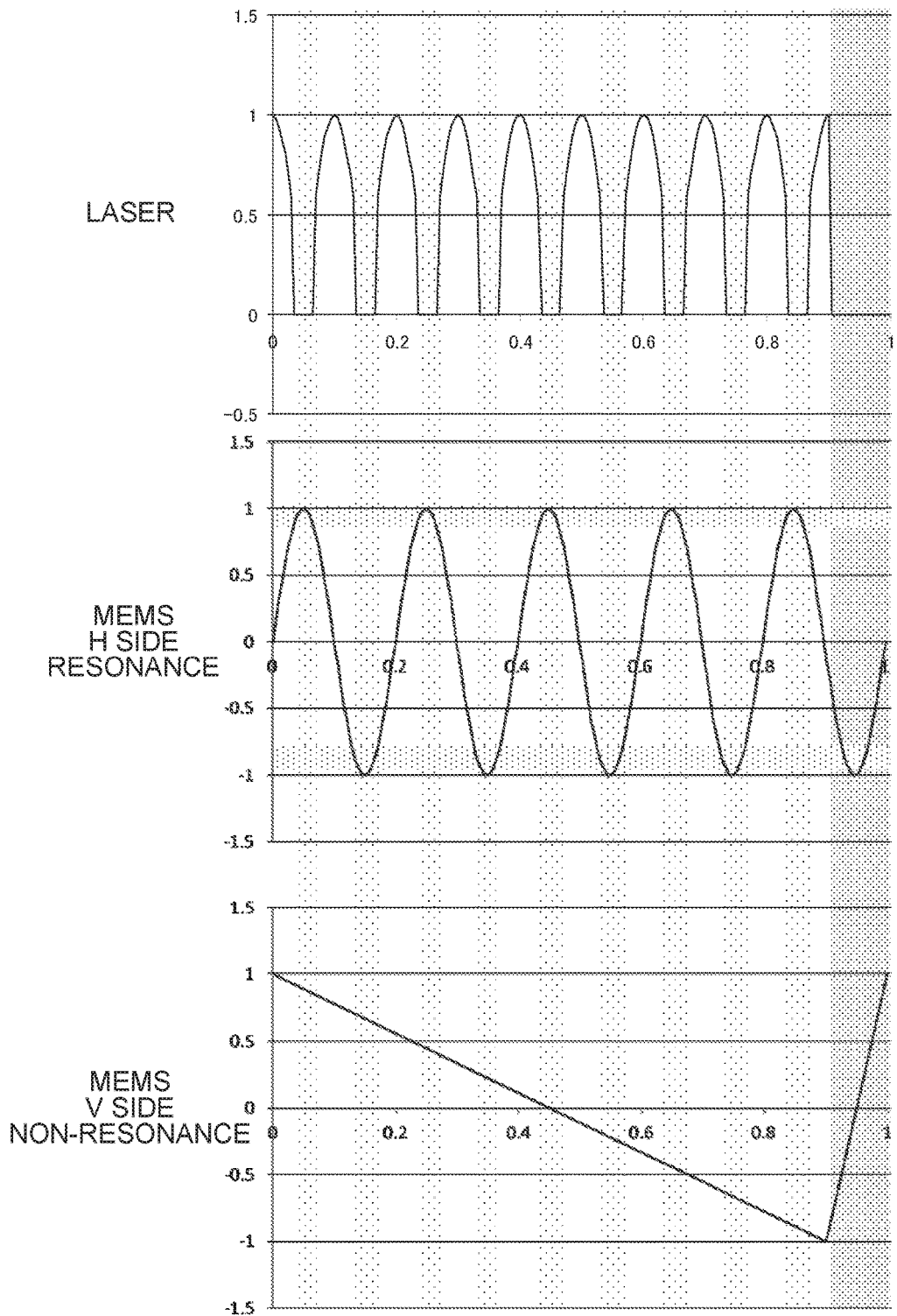
FIG. 11 includes an upper section that shows a state where the excitation light source 12 (laser beam) is modulated at a modulation frequency $f_L$ of 25 MHz in synchronization with oscillation of the mirror unit 202, a middle section that shows a state where first and second alternating voltage (such as a sine wave of 25 MHz) is applied to the first piezoelectric actuators 203 and 204, and a lower section that shows a state where third alternating voltage (such as a sawtooth wave of 55 Hz) is applied to the second piezoelectric actuators 205 and 206.

FIG. 11 includes a middle section that shows a state where the first and second alternating voltage (such as a sine wave of 25 MHz) is applied to the first piezoelectric actuators 203 and 204, and a lower section that shows a state where the third alternating voltage (such as a sawtooth wave of 55 Hz) is applied to the second piezoelectric actuators 205 and 206. FIG. 11 also includes an upper section that shows a state where the excitation light source 12 (laser beam) is modulated at a modulation frequency $f_L$ of 25 MHz in synchronization with oscillation of the mirror unit 202. FIG. 11 includes shaded portions showing that the excitation light source 12 emits no light in the shaded portions.

Figure 12A:
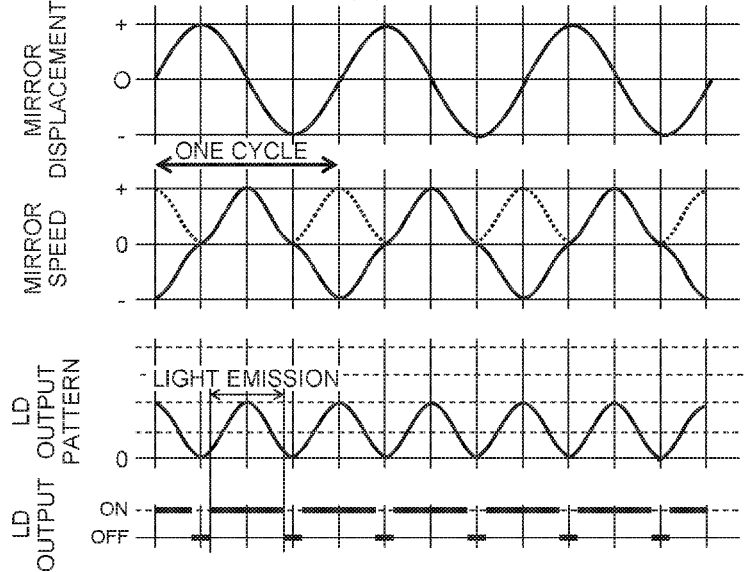
Figure 12B:
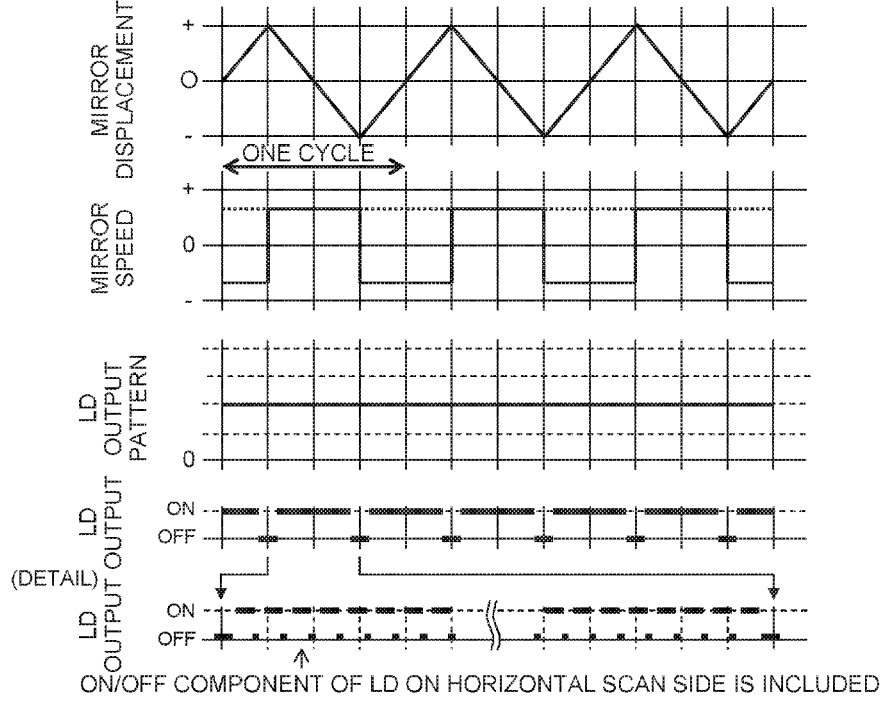

FIG. 12A illustrates a detail of the first and second alternating voltage (such as a sine wave of 25 MHz) applied to the first piezoelectric actuators 203 and 204, an output pattern of the excitation light source 12 (laser beam), and the like. FIG. 12B illustrates a detail of the third alternating voltage (such as a sawtooth wave of 55 Hz) applied to the second piezoelectric actuators 205 and 206, an output pattern of the excitation light source 12 (laser beam), and the like.

The LD power source circuit 28 serves as modulation means that modulates the excitation light source 12 (laser beam) in synchronization with oscillation of mirror unit 202 in response to control by the control unit 24.

A modulation frequency (modulation speed) of the excitation light source 12 (laser) can be acquired by the following expression.

Modulation frequency $f_L$=(pixel number)×(frame rate $f_V$)/(blanking time ratio $B_r$)

The expression, where the pixel number is 300×600, $f_V$ is 70, and $B_r$ is 0.5, for example, gives the modulation frequency $f_L$ that is 300×600×70/0.5=about 25 MHz. If the modulation frequency $f_L$ is 25 MHz, output of the excitation light source 12 can be turned on and off per 1/25 MHz second, or emission intensity can be controlled by multiple stages (multiple stages including 0 as a minimum, for example).

The LD power source circuit 28 modulates the excitation light source 12 (laser beam) on the basis of the predetermined light distribution pattern (digital data) stored in the storage device 44 so that a two-dimensional image corresponding to the predetermined light distribution pattern is drawn in the wavelength converter 18 with a laser beam as the excitation light that is two-dimensionally (in the horizontal direction and vertical direction) scanned by the light reflector 201.

The predetermined light distribution pattern (digital data) includes, for example, a high-beam light distribution pattern (digital data), a low-beam light distribution pattern (digital data), an expressway light distribution pattern (digital data), an urban light distribution pattern (digital data), and other various light distribution patterns. The predetermined light distribution pattern (digital data) includes data showing an outline and light intensity distribution (illuminance distribution) of each of the light distribution patterns. Accordingly, the two-dimensional image drawn in the wavelength converter 18 with a laser beam as the excitation light that is two-dimensionally (in the horizontal direction and vertical direction) scanned by the light reflector 201 has an outline and light intensity distribution (such as a light intensity distribution with a maximum at its central portion, required for the high-beam light distribution pattern) of each of the light distribution patterns (such as the high-beam light distribution pattern). Each of the predetermined light distribution patterns (digital data) can be selected by operating a shift switch provided in a vehicle interior, for example.

Figure 13A:
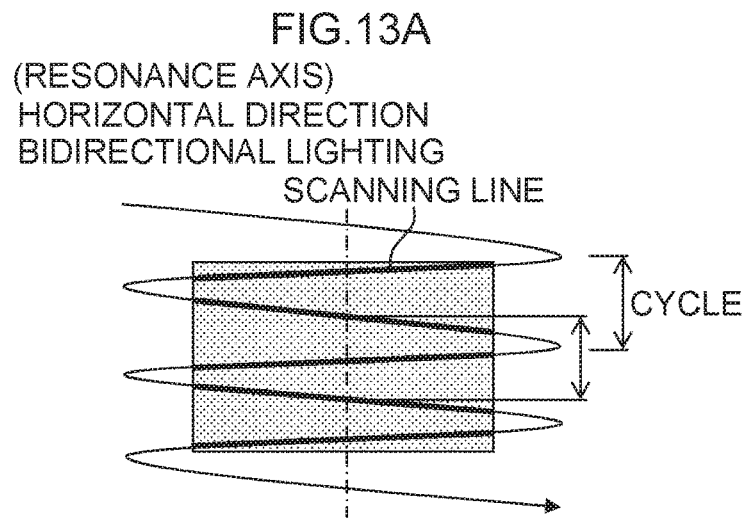
FIG. 13A illustrates an example of a scan pattern of a laser beam (spot) that is two-dimensionally (in the horizontal direction and the vertical direction) scanned by the light reflector 201.
Figure 13B:
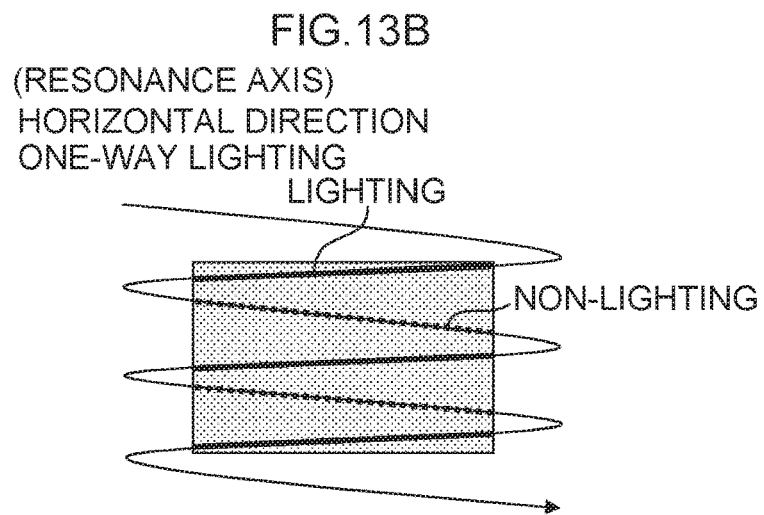
FIG. 13B illustrates another example of the scan pattern of the laser beam (spot) that is two-dimensionally (in the horizontal direction and the vertical direction) scanned by the light reflector 201.
Figure 13C:
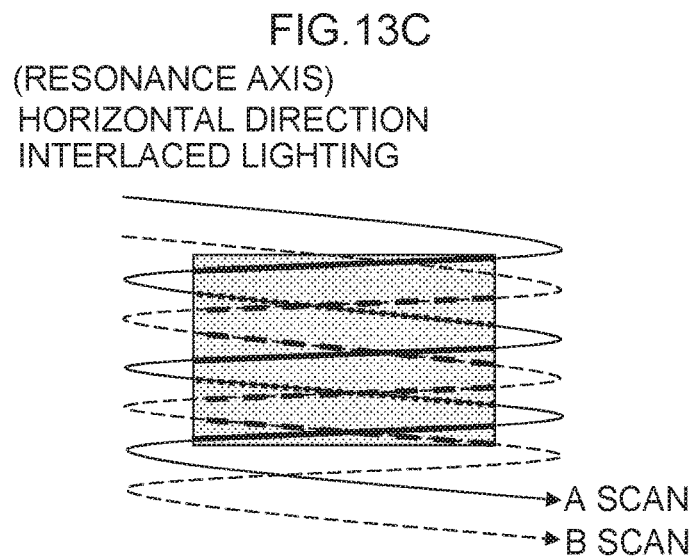
FIG. 13C illustrates yet another example of the scan pattern of the laser beam (spot) that is two-dimensionally (in the horizontal direction and the vertical direction) scanned by the light reflector 201.

FIGS. 13A to 13C each illustrate a scan pattern of a laser beam (spot) that is two-dimensionally (in the horizontal direction and the vertical direction) scanned by the light reflector 201.

A horizontal scan pattern of a laser beam (spot) that is two-dimensionally (in the horizontal direction and the vertical direction) scanned by the light reflector 201 includes a pattern of bidirectional scan (round-trip scan) as illustrated in FIG. 13A, and a pattern of one-way scan (only forward scan or backward scan) as illustrated in FIG. 13B.

A vertical scan pattern of a laser beam (spot) that is two-dimensionally (in the horizontal direction and the vertical direction) scanned by the light reflector 201 includes a pattern of closely scanning by one line, and a pattern of scanning every other line as with interlaced scan as illustrated in FIG. 13C.

Figure 14A:
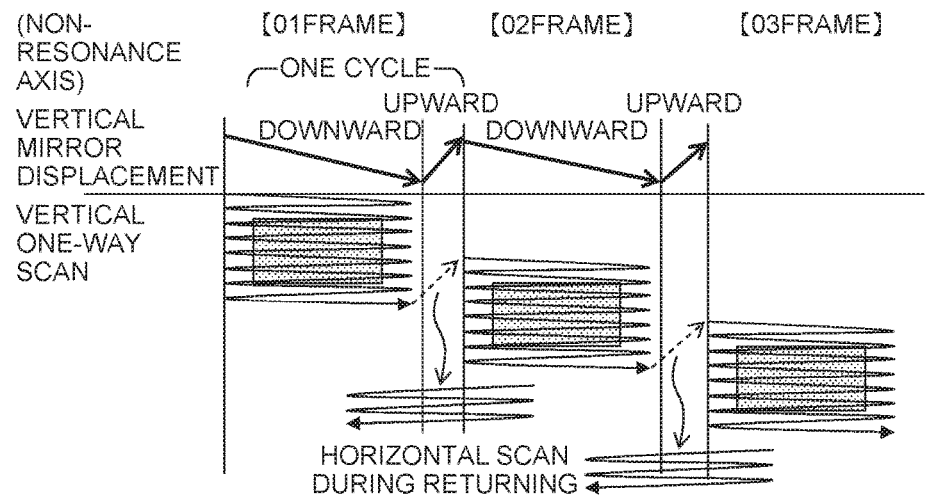
FIG. 14A illustrates an example of a vertical scan pattern of the laser beam (spot) that is two-dimensionally (in the horizontal direction and the vertical direction) scanned by the light reflector 201.
Figure 14B:
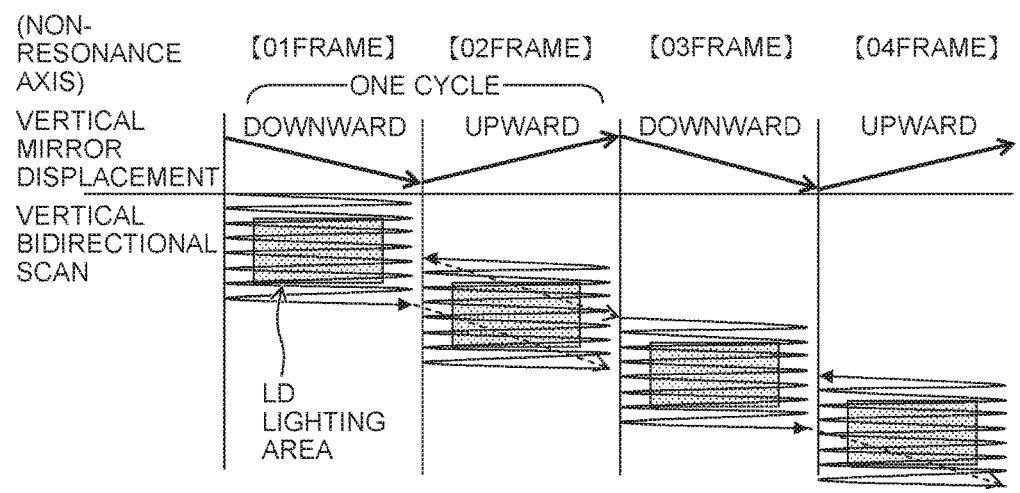
FIG. 14B illustrates another example of the vertical scan pattern of the laser beam (spot) that is two-dimensionally (in the horizontal direction and the vertical direction) scanned by the light reflector 201.

A vertical scan pattern of a laser beam (spot) that is two-dimensionally (in the horizontal direction and the vertical direction) scanned by the light reflector 201 includes a pattern of repeating the following step of scanning from an upper end to a lower end and returning to the upper end to start scanning after reaching the lower end as illustrated in FIG. 14A, and a pattern of repeating the following step of scanning from the upper end to the lower end and scanning from the lower end to the upper end after reaching the lower end as illustrated in FIG. 14B.

During scanning, a time during which the excitation light source 12 emits no light, called blanking, occurs at right and left ends of the wavelength converter 18 (screen), and occurs while scanning returns from the lower end to the upper end.

Subsequently, another example of control by the control system illustrated in FIG. 10 will be described.

The control system illustrated in FIG. 10 can perform various kinds of control other than the example of control above. For example, a vehicle headlamp of a light distribution variable type with an adaptive driving beam (ADB) can be achieved. This can be achieved, for example, as follows: the control unit 24 determines whether an irradiation-prohibited object (such as a pedestrian and an oncoming vehicle) exists in the predetermined light distribution pattern formed on the virtual vertical screen on the basis of detection results of the imaging apparatus 30 serving as irradiation-prohibited object detecting means for detecting an object ahead of an own vehicle; and if it is determined that there is an irradiation-prohibited object, the control unit 24 controls the excitation light source 12 to turn off or reduce output at timing when a region on the wavelength converter 18, corresponding to an irradiation area where the irradiation-prohibited object exists, is scanned with a laser beam as the excitation light.

Based on the knowledge revealed by the inventors of the present application, or "as traveling speed increases, a vertical scan frequency $f_V$ at which no flicker is felt tends to increase", it is possible to change a drive frequency (vertical scan frequency $f_V$) for non-resonantly driving the second piezoelectric actuator 205 and 206, on the basis of traveling speed that is a detection result of the vehicle speed sensor 34 attached to the vehicle. For example, the vertical scan frequency $f_V$ can be increased with increase in the traveling speed. This can be achieved, for example, as follows: the storage device 44 previously stores a correspondence relation between a plurality of traveling speed values (or traveling speed ranges) and a plurality of vertical scan frequencies $f_V$ corresponding to the plurality of respective traveling speed values (or traveling speed ranges), in which as the traveling speed or the traveling speed range increases, a larger vertical scan frequency is associated with it; a vertical scan frequency corresponding to vehicle speed detected by the vehicle speed sensor 34 is read out from the storage device 44; and the MEMS power source circuit 26 applies the third alternating voltage (the read-out vertical scan frequency) to the second piezoelectric actuators 205 and 206 to non-resonantly drive the second piezoelectric actuators 205 and 206.

Based on the knowledge revealed by the inventors of the present application, or "a vertical scan frequency $f_V$ at which no flicker is felt during a stop at a speed of 0 km/h is higher than that during traveling at a speed of 50 to 150 km/h", it is possible to make the vertical scan frequency $f_V$ during a stop at a speed of 0 km/h, higher than that during traveling at a speed of 50 to 150 km/h. This can be achieved, for example, as follows: the storage device 44 previously stores a vertical scan frequency $f_V2$ during traveling and a vertical scan frequency $f_V1$ during a stop, in which $f_V1$ is more than $f_V2$; it is determined whether the vehicle is during traveling or during a stop on the basis of detection results of the vehicle speed sensor 34; if it is determined that the vehicle is during traveling, the vertical scan frequency for during traveling is read out from the storage device 44; the MEMS power source circuit 26 applies the third alternating voltage (the read-out vertical scan frequency for during traveling) to the second piezoelectric actuators 205 and 206 to non-resonantly drive the second piezoelectric actuators 205 and 206; if it is determined that the vehicle is during a stop, the vertical scan frequency for during a stop is read out from the storage device 44; and the MEMS power source circuit 26 applies the third alternating voltage (the read-out vertical scan frequency for during a stop) to the second piezoelectric actuators 205 and 206 to non-resonantly drive the second piezoelectric actuators 205 and 206.

Based on the knowledge revealed by the inventors of the present application, or "as illuminance increases, a vertical scan frequency $f_V$ at which no flicker is felt tends to increase", it is possible to change the drive frequency (vertical scan frequency $f_V$) for non-resonantly driving the second piezoelectric actuators 205 and 206 on the basis of illuminance of light returning to a driver (such as illuminance before driver's eyes) that is a detection result of the illuminance sensor 32 attached to the vehicle. For example, the vertical scan frequency $f_V$ can be increased with increase in the illuminance. This can be achieved, for example, as follows: the storage device 44 previously stores a correspondence relation between a plurality of illuminance values (or illuminance ranges) and a plurality of vertical scan frequencies $f_V$ corresponding to the plurality of respective illuminance values (or illuminance ranges), in which as the illuminance value or the illuminance range increases, a larger vertical scan frequency is associated with it; a vertical scan frequency corresponding to an illuminance value detected by the illuminance sensor 32 is read out from the storage device 44; and the MEMS power source circuit 26 applies the third alternating voltage (the read-out vertical scan frequency) to the second piezoelectric actuators 205 and 206 to non-resonantly drive the second piezoelectric actuators 205 and 206.

Likewise, it is possible to change the drive frequency (vertical scan frequency $f_V$) for non-resonantly driving the second piezoelectric actuators 205 and 206 on the basis of a distance to an irradiated object that is a detection result of the distance sensor 38 attached to the vehicle.

Likewise, it is possible to change the drive frequency (vertical scan frequency $f_V$) for non-resonantly driving the second piezoelectric actuators 205 and 206 on the basis of a detection result of the vibration sensor 42 attached to the vehicle.

Likewise, it is possible to change the drive frequency (vertical scan frequency $f_V$) for non-resonantly driving the second piezoelectric actuators 205 and 206 in accordance with the predetermined light distribution pattern. For example, it is possible to change the drive frequency (vertical scan frequency $f_V$) for non-resonantly driving the second piezoelectric actuators 205 and 206 in the expressway light distribution pattern as well as in the urban light distribution pattern.

As above, allowing the vertical scan frequency $f_V$ to be variable enables the light reflector 201 to be improved in reliability, durability, lifetime, and the like, as compared with a case where the drive frequency for non-resonantly driving the second piezoelectric actuators 205 and 206 is fixed.

A light reflector 161 of a biaxial nonresonant type may be used instead of the light reflector 201 of a uniaxial nonresonant/uniaxial resonant type with the configuration above.

(Biaxial Nonresonant Type)

Figure 15:
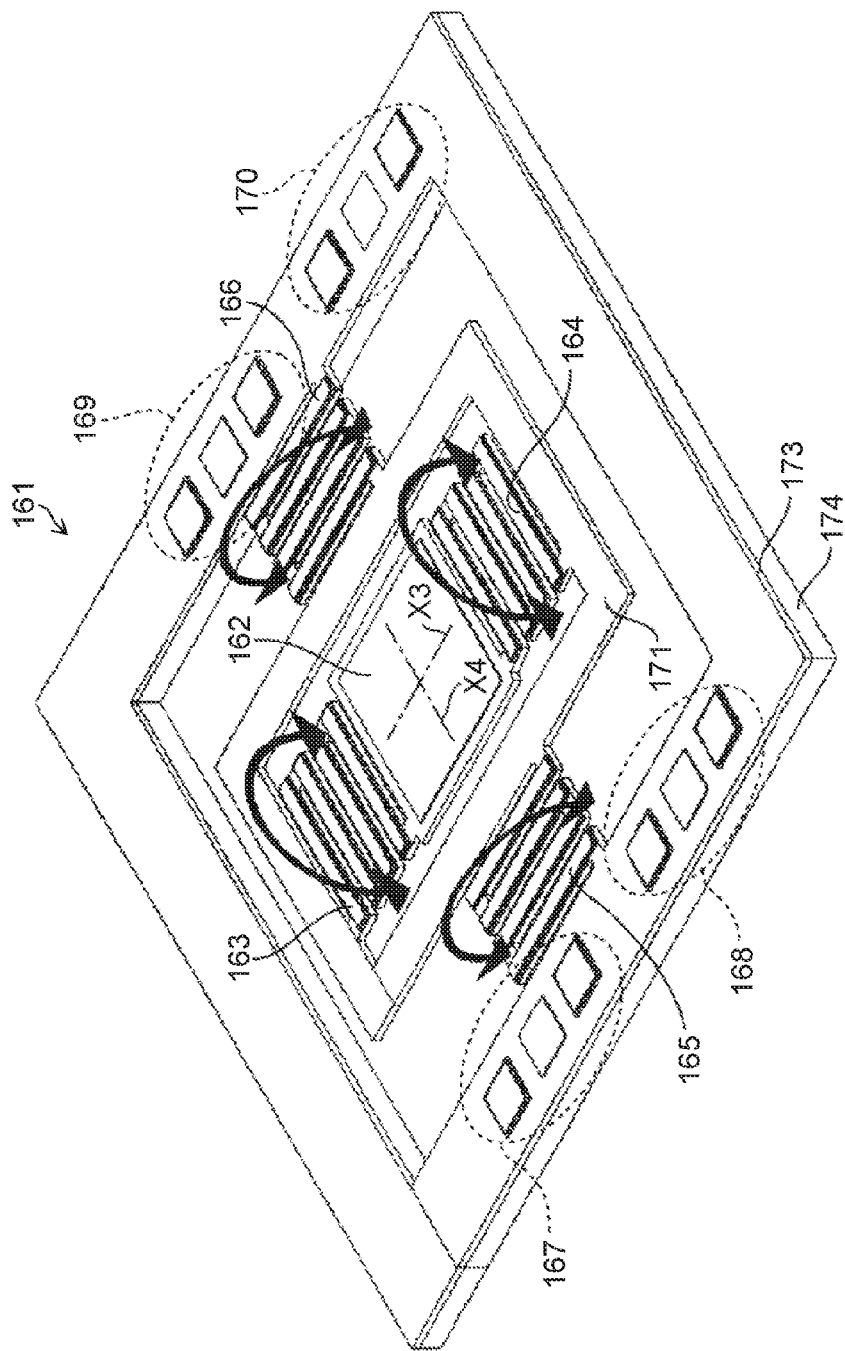
FIG. 15 is a perspective view of a light reflector 161 of a biaxial nonresonant type.

FIG. 15 is a perspective view of the light reflector 161 of a biaxial nonresonant type.

As illustrated in FIG. 15, the light reflector 161 of a biaxial nonresonant type includes a mirror unit 162 (also called an MEMS mirror), piezoelectric actuators 163 to 166 that drive the mirror unit 162, a movable frame 171 that supports the piezoelectric actuators 163 to 166, and a base 174.

The piezoelectric actuators 163 to 166 are configured and operated as with the second piezoelectric actuator 205 and 206 of the light reflector 201 of a uniaxial nonresonant/uniaxial resonant type.

In the present embodiment, first alternating voltage is applied to each of the first piezoelectric actuators 163 and 164 as driving voltage. At the time, alternating voltage with a frequency equal to or less than a predetermined value less than a mechanical resonant frequency (first resonant point) of the mirror unit 162 is applied to the first piezoelectric actuators 163 and 164 to non-resonantly drive them. This allows the mirror unit 162 to oscillate around the a third shaft X3 with respect to the movable frame 171 to scan an excitation light incident on the mirror unit 162 from the excitation light source 12, in a first direction (horizontal direction, for example).

Then, second alternating voltage is applied to each of the second piezoelectric actuators 165 and 166 as driving voltage. At the time, alternating voltage with a frequency equal to or less than a predetermined value less than a mechanical resonant frequency (a first resonant point) of the movable frame 171 including the mirror unit 162, and the second piezoelectric actuators 165 and 166, is applied to the second piezoelectric actuators 165 and 166 to non-resonantly drive them. This allows the mirror unit 162 to oscillate around a second shaft X4 with respect to the base 174 to scan an excitation light incident on the mirror unit 162 from the excitation light source 12, in a second direction (vertical direction, for example).

Figure 16A:
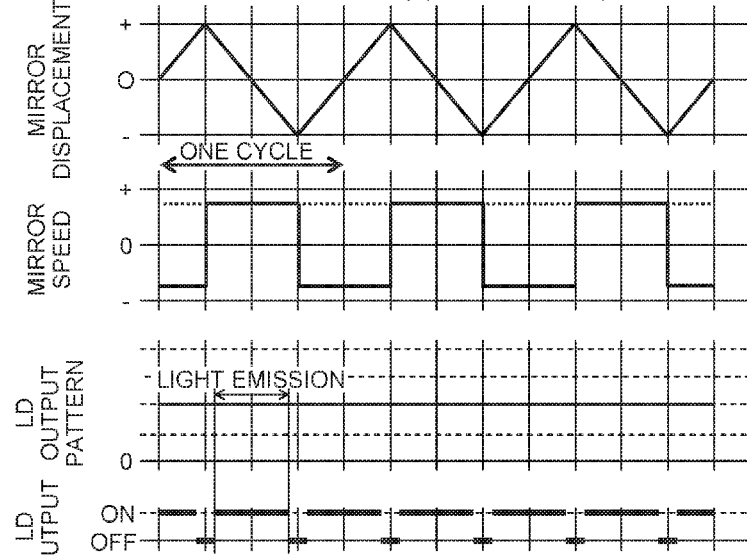
Figure 16B:
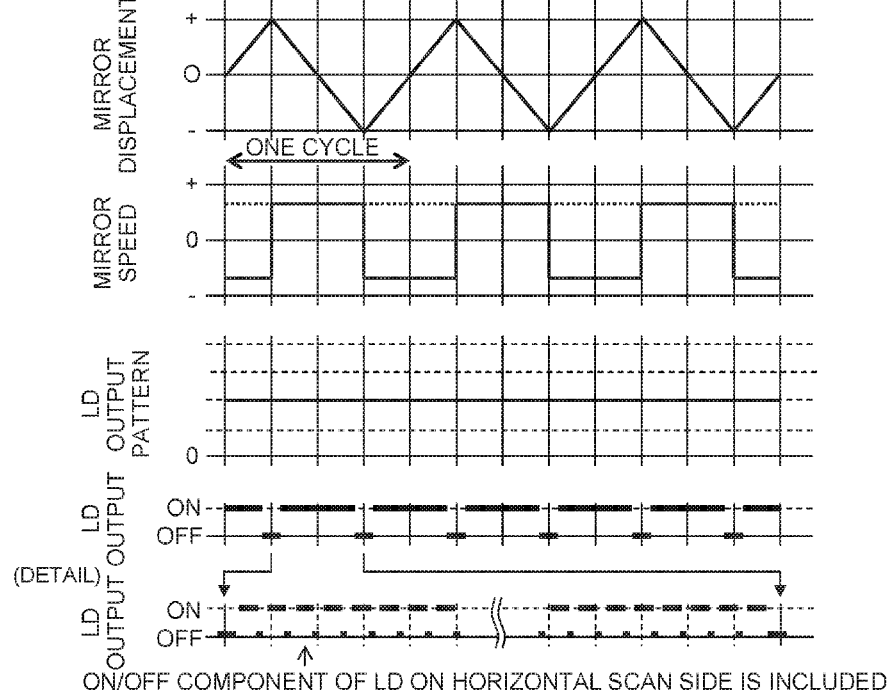

FIG. 16A illustrates a detail of the first alternating voltage (such as a sawtooth wave of 6 kHz) applied to the first piezoelectric actuators 163 and 164, an output pattern of the excitation light source 12 (laser beam), and the like. FIG. 16B illustrates a detail of third alternating voltage (such as a sawtooth wave of 60 Hz) applied to the second piezoelectric actuators 165 and 166, an output pattern of the excitation light source 12 (laser beam), and the like.

As above, driving each of the piezoelectric actuators 163 to 166 allows the laser beam as the excitation light from the excitation light source 12 to be two-dimensionally (in the horizontal direction and vertical direction) scanned.

A light reflector 201A of a biaxial resonant type may be used instead of the light reflector 201 of a uniaxial nonresonant/uniaxial resonant type with the configuration above.

(Biaxial Resonant Type)

Figure 17:
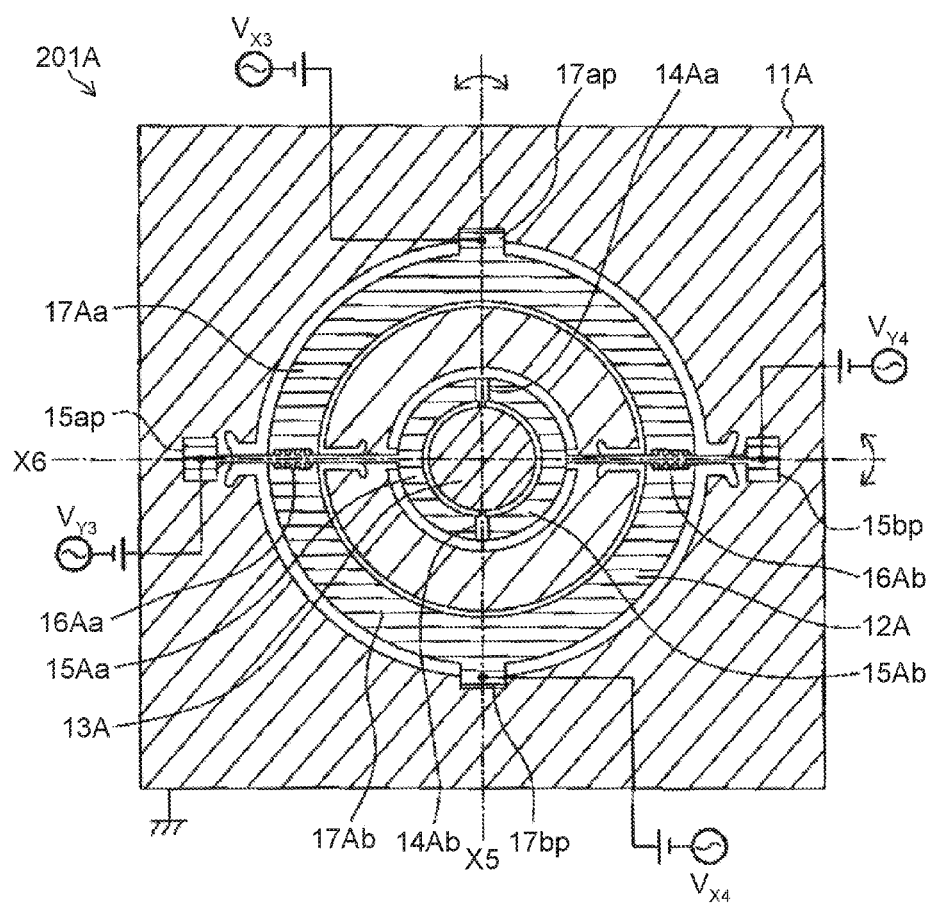
FIG. 17 is a plan view of a light reflector 201A of a biaxial resonant type.

FIG. 17 is a plan view of the light reflector 201A of a biaxial resonant type.

As illustrated in FIG. 17, the light reflector 201A of a biaxial resonant type includes a mirror unit 13A (also called an MEMS mirror), first piezoelectric actuators 15Aa and 15Ab that drive the mirror unit 13A through torsion bars 14Aa and 14Ab, a movable frame 12A that supports the first piezoelectric actuators 15Aa and 15Ab, second piezoelectric actuators 17Aa and 17Ab that drive the movable frame 12A, and a base 11A that supports the second piezoelectric actuators 17Aa and 17Ab.

The piezoelectric actuators 15Aa, 15Ab, 17Aa, and 17Ab are configured and operated as with the first piezoelectric actuators 203 and 204 of the light reflector 201 of a uniaxial nonresonant/uniaxial resonant type.

In the present embodiment, first alternating voltage is applied to the first piezoelectric actuator 15Aa as the driving voltage, and second alternating voltage is applied to the first piezoelectric actuator 15Ab as driving voltage. The first alternating voltage and the second alternating voltage have phases opposite to each other, or phases shifted from each other (a sine wave, for example). At the time, alternating voltage with a frequency near a mechanical resonant frequency (a first resonant point) of the mirror unit 13A including the torsion bars 14Aa and 14Ab is applied to the first piezoelectric actuators 15Aa and 15Ab to resonantly drive them. This allows the mirror unit 13A to oscillate around a fifth shaft X5 with respect to the movable frame 12A to scan excitation light incident on the mirror unit 13A from the excitation light source 12, in a first direction (horizontal direction, for example).

Third alternating voltage is applied to the second piezoelectric actuator 17Aa as driving voltage, and fourth alternating voltage is applied to the second piezoelectric actuator 17Ab as driving voltage. The third alternating voltage and the fourth alternating voltage have phases opposite to each other, or phases shifted from each other (a sine wave, for example). At the time, alternating voltage with a frequency near a mechanical resonant frequency (first resonant point) of the movable frame 12A including the mirror unit 13A and the first piezoelectric actuators 15Aa and 15Ab is applied to the second piezoelectric actuators 17Aa and 17Ab to resonantly drive them. This allows the mirror unit 13A to oscillate around a sixth shaft X6 with respect to the base 11A to scan excitation light incident on the mirror unit 13A from the excitation light source 12, in a second direction (vertical direction, for example).

FIG. 18A illustrates a detail of the first alternating voltage (such as a sine wave of 24 kHz) applied to the first piezoelectric actuators 15Aa and 15Ab, an output pattern of the excitation light source 12 (laser beam), and the like. FIG. 18B illustrates a detail of the third alternating voltage (such as a sine wave of 12 Hz) applied to the second piezoelectric actuators 17Aa and 17Ab, an output pattern of the excitation light source 12 (laser beam), and the like.

As above, driving each of the piezoelectric actuators 15Aa, 15Ab, 17Aa, and 17Ab allows a laser beam as the excitation light from the excitation light source 12 to be two-dimensionally (in the horizontal direction and vertical direction) scanned.

As described above, the present embodiment enables providing a vehicle lamp capable of reducing a flicker, even if the vehicle lamp uses a frequency of any one of "55 fps or more", "55 fps or more and 120 fps or less", "55 fps or more and 100 fps or less", and "70±10 fps", which are greatly lower than 220 Hz (or a frame rate greatly lower than 220 fps) at which a flicker has been thought to occur in the vehicle lamp, such as a vehicle headlamp.

The present embodiment can use a frequency greatly lower than 220 Hz (or a frame rate greatly lower than 220 fps), or a frequency of any one of "55 fps or more", "55 fps or more and 120 fps or less", "55 fps or more and 100 fps or less", and "70±10 fps", and thus the light reflector 201 and the like can be improved in reliability, durability, lifetime, and the like as compared with a case of using a frequency of 220 Hz or more (or a frame rate of 220 fps or more).

The present embodiment also allows a drive frequency for non-resonantly driving the second piezoelectric actuators 205 and 206, and the like, to be variable, and thus can improve the light reflector 201 and the like in reliability, durability, lifetime, and the like, as compared with a case where the drive frequency for non-resonantly driving the second piezoelectric actuators 205 and 206 is fixed.

Next, a vehicle lamp using three light reflectors 201 of a uniaxial nonresonant/uniaxial resonant type will be described with reference to accompanying drawings, as a second embodiment. Instead of the light reflector 201 of a uniaxial nonresonant/uniaxial resonant type, the various light reflectors shown in the first embodiment are obviously available.

Figure 20:
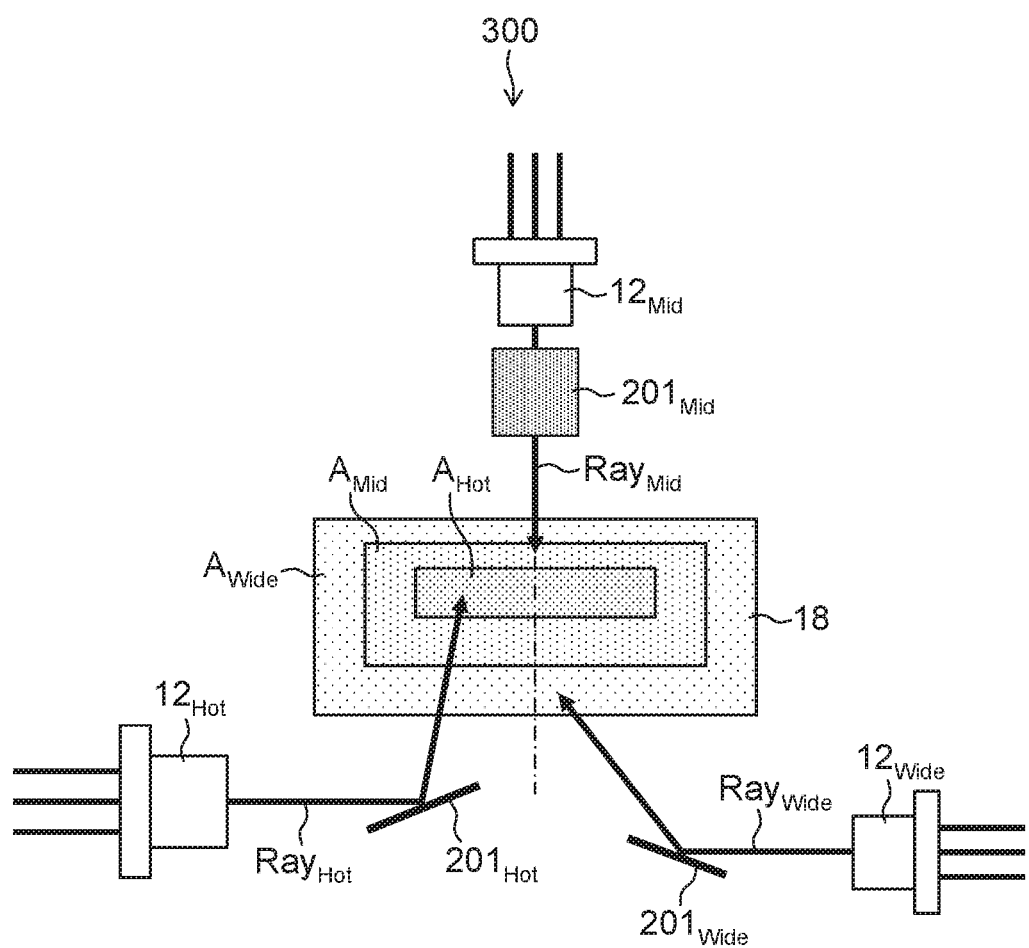
FIG. 20 is a schematic view of a vehicle lamp 300 of a second embodiment of the present invention.
Figure 21:
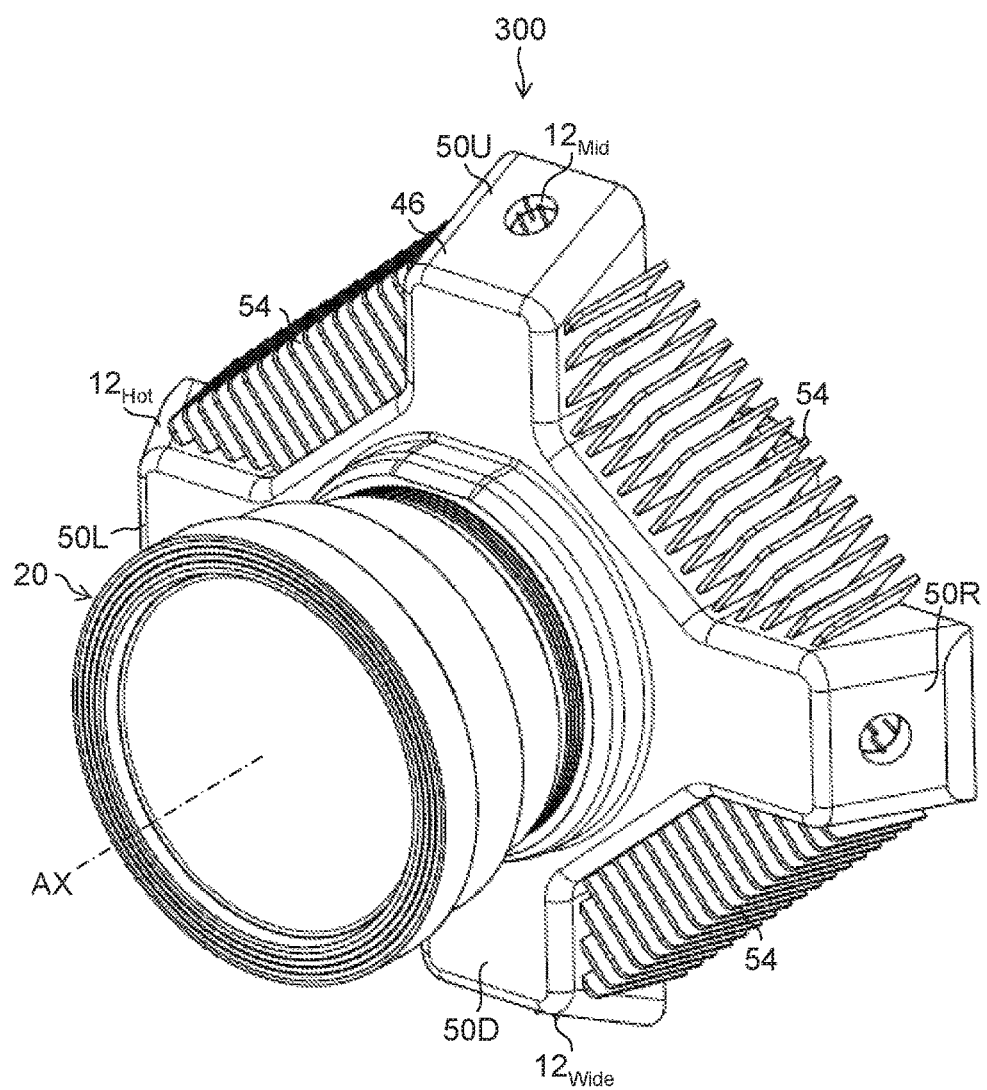
FIG. 21 is a perspective view of the vehicle lamp 300.
Figure 22:
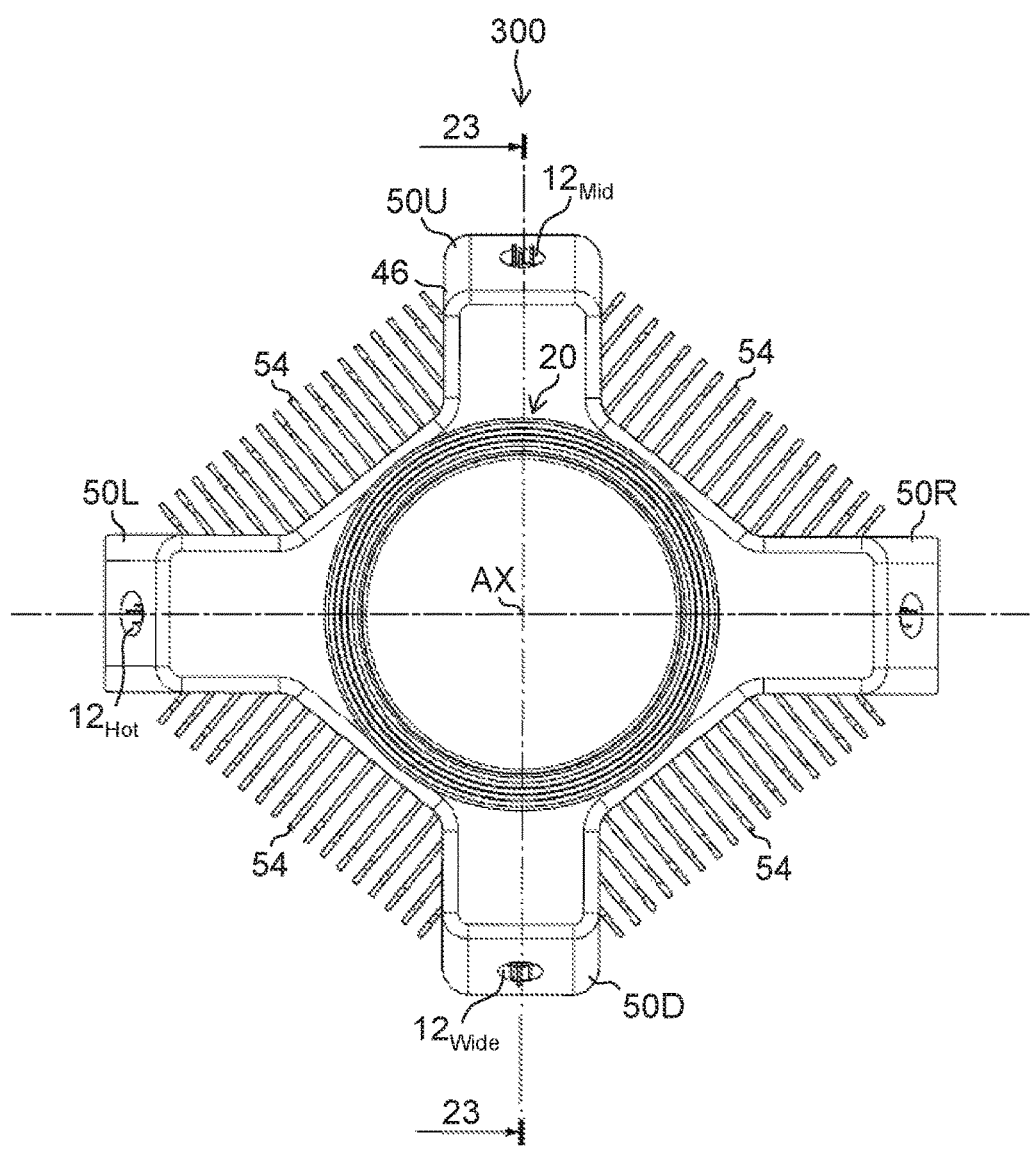
FIG. 22 is a front view of the vehicle lamp 300.
Figure 23:
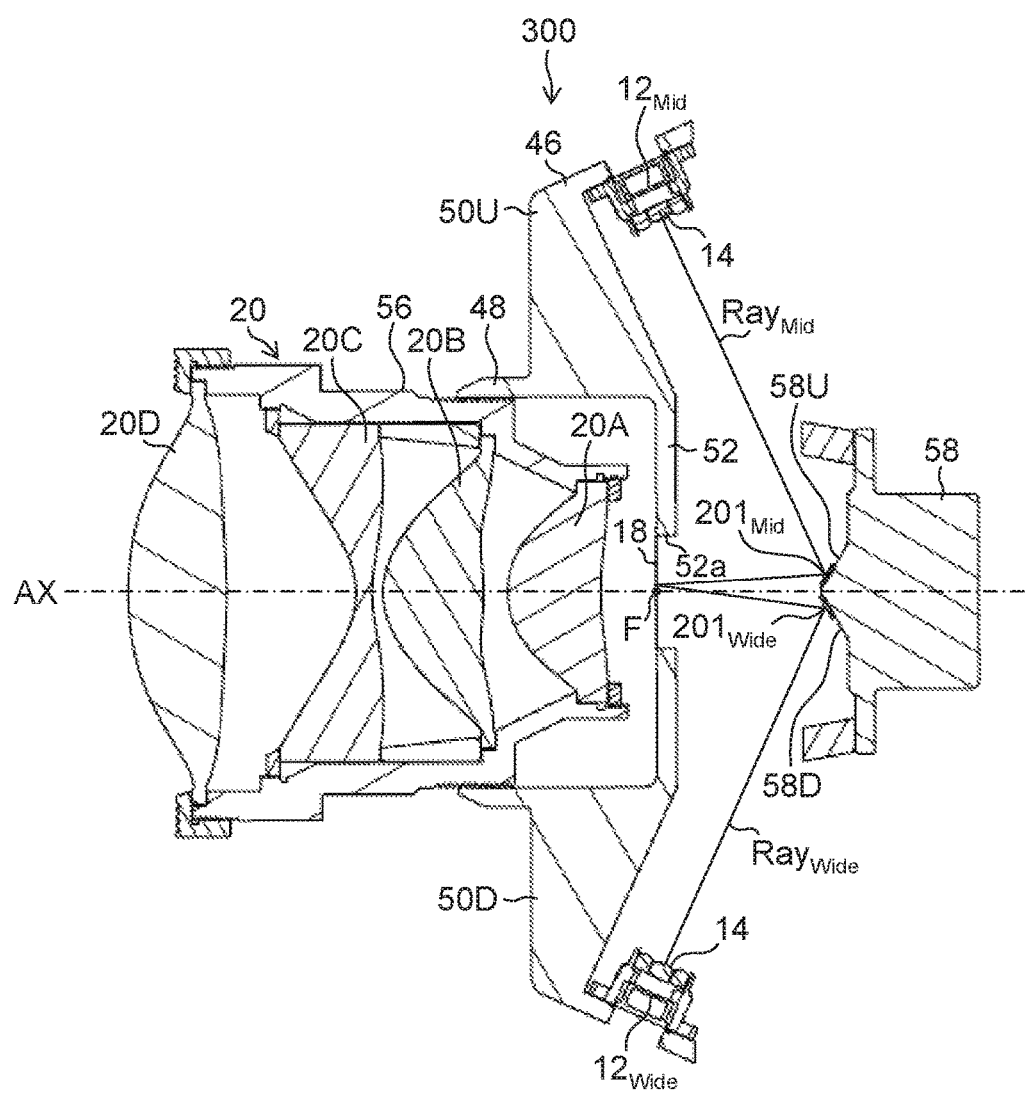
FIG. 23 is a sectional view of the vehicle lamp 300 illustrated in FIG. 22 taken along the line 23-23.
Figure 24:
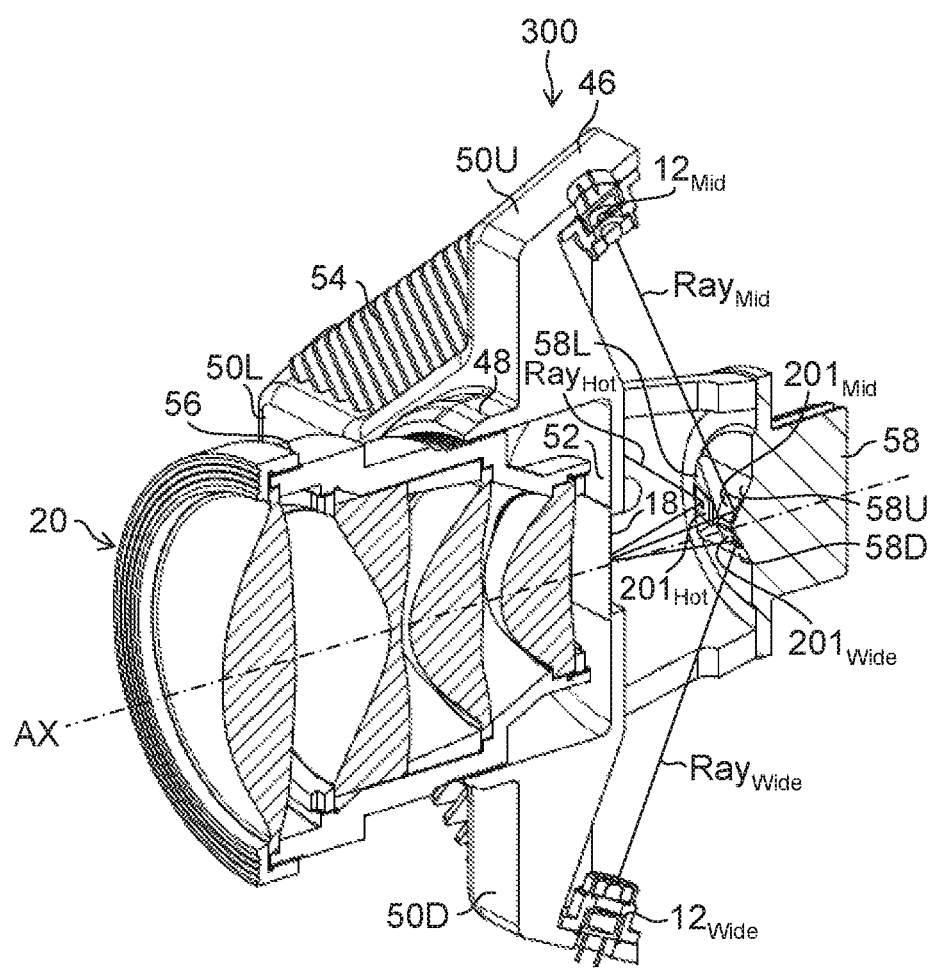
FIG. 24 is a sectional perspective view of the vehicle lamp 300 illustrated in FIG. 23 taken along the line 23-23.
Figure 25:
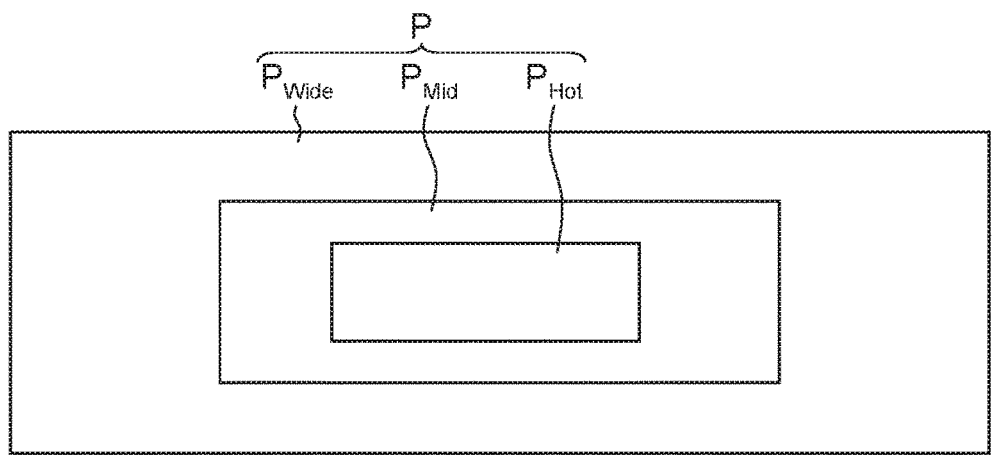
FIG. 25 illustrates an example of a predetermined light distribution pattern P that is to be formed on a virtual vertical screen facing a vehicle front face (arranged about 25 m ahead of the vehicle front face) by the vehicle lamp 300 of the present embodiment.

FIG. 20 is a schematic view of a vehicle lamp 300 of a second embodiment of the present invention. FIG. 21 is a perspective view thereof. FIG. 22 is a front view thereof. FIG. 23 is a sectional view of the vehicle lamp 300 illustrated in FIG. 22 taken along the line 23-23. FIG. 24 is a sectional perspective view of the vehicle lamp 300 illustrated in FIG. 23 taken along the line 23-23. FIG. 25 illustrates an example of a predetermined light distribution pattern P that is to be formed on a virtual vertical screen facing a vehicle front face (arranged about 25 m ahead of the vehicle front face) by the vehicle lamp 300 of the present embodiment.

The vehicle lamp 300 of the present embodiment, as illustrated in FIG. 25, is configured to form a predetermined light distribution pattern P (such as a high-beam light distribution pattern) that is excellent in distant visibility and light distribution feeling, and that has light intensity decreasing from center light intensity ($P_{Hot}$), which is relatively high, toward the periphery ($P_{Hot} \rightarrow P_{Mid} \rightarrow P_{Wide}$) like gradation.

Comparing the vehicle lamp 300 of the present embodiment with the vehicle lamp 10 of the first embodiment finds a difference in that the first embodiment, as illustrated in FIG. 1, mainly uses one excitation light source 12 and one light reflector 201, but the present embodiment, as illustrated in FIG. 20, uses three excitation light sources (a wide excitation light source $12_{Wide}$, a middle excitation light source $12_{Mid}$, and a hot excitation light source $12_{Hot}$) and three light reflectors (a wide light reflector $201_{Wide}$, a middle light reflector $201_{Mid}$, and a hot light reflector $201_{Hot}$).

Other than the difference, the vehicle lamp 300 has the same configuration as that of the vehicle lamp 10 of the first embodiment. Hereinafter, the difference from the vehicle lamp 10 of the first embodiment will be mainly described, and the same component as that of the vehicle lamp 10 of the first embodiment will be designated by the same reference numeral as that of the vehicle lamp 10 to omit a description the component.

The vehicle lamp 300, as illustrated in FIGS. 20 to 24, is configured as a vehicle headlamp including such as: three excitation light sources $12_{Wide}$, $12_{Mid}$, and $12_{Hot}$; three light reflectors $201_{Wide}$, $201_{Mid}$, and $201_{Hot}$ provided to correspond to the three excitation light sources $12_{Wide}$, $12_{Mid}$, and $12_{Hot}$, respectively; a wavelength converter 18 having three scan regions $A_{Wide}$, $A_{Mid}$, and $A_{Hot}$ (refer to FIG. 20) provided to correspond to the three light reflectors $201_{Wide}$, $201_{Mid}$, and $201_{Hot}$, respectively; and a projection lens 20 serving as an optical system that projects light intensity distribution formed in each of the three scan regions $A_{Wide}$, $A_{Mid}$, and $A_{Hot}$ to form the predetermined light distribution pattern P. The number of the excitation light sources 12, the light reflectors 201, and the scan regions A, is not limited to three, and thus two, or four or more, is obviously available.

As illustrated in FIG. 23, the projection lens 20, the wavelength converter 18, and the light reflectors $201_{Wide}$, $201_{Mid}$, and $201_{Hot}$ are arranged in the order described, along a reference axis AX (also called an optical axis) extending in a vehicle longitudinal direction.

The excitation light sources $12_{Wide}$, $12_{Mid}$, and $12_{Hot}$ are fixed to a laser holding part 46 in inclined posture to respectively allow excitation lights $Ray_{Wide}$, $Ray_{Mid}$, and $Ray_{Hot}$ to travel backward and toward the reference axis AX, and are arranged so as to surround the reference axis AX.

Specifically, the excitation light source $12_{Wide}$, $12_{Mid}$, and $12_{Hot}$ are fixed to the laser holding part 46, and are arranged, as follows.

The laser holding part 46 includes extension portions 50U, 50D, 50L, and 50R that radiate in a direction substantially orthogonal to the reference axis AX, respectively, from a top portion, a bottom portion, a left portion, and a right portion of an outer peripheral surface of a cylindrical portion 48 extending in a direction of the reference axis AX (refer to FIG. 22). Each of the extension portions 50U, 50D, 50L, and 50R has a leading end inclining backward (refer to FIG. 23), and a heat radiation part 54 (radiating fins) is arranged between each of the extension portions 50U, 50D, 50L, and 50R (refer to FIG. 22).

The wide excitation light source $12_{Wide}$, as illustrated in FIG. 23, is fixed to the leading end of the extension portion 50D in inclined posture to allow its excitation light $Ray_{Wide}$ to travel in an obliquely backward and upward direction. Likewise, the middle excitation light source $12_{Mid}$ is fixed to the leading end of the extension portion 50U in inclined posture to allow its excitation light $Ray_{Mid}$ to travel in an obliquely backward and downward direction. Likewise, the hot excitation light source $12_{Hot}$ is fixed to the leading end of the extension portion 50L in inclined posture to allow its excitation light $Ray_{Hot}$ to travel in an obliquely backward and rightward direction.

A lens holder 56, to which the projection lens 20 (lenses 20A to 20D) is fixed, is fixed to the cylindrical portion 48 by screwing its rear end into an opening at a leading end of the cylindrical portion 48.

The excitation lights $Ray_{Wide}$, $Ray_{Mid}$, and $Ray_{Hot}$, respectively, emitted from the excitation light sources $12_{Wide}$, $12_{Mid}$, and $12_{Hot}$ are condensed (collimated, for example) through the condenser lens 14 to be incident on the corresponding mirror units 202 of the light reflectors $201_{Wide}$, $201_{Mid}$, and $201_{Hot}$.

Each of the light reflectors $201_{Wide}$, $201_{Mid}$, and $201_{Hot}$, as illustrated in FIG. 24, is arranged closer to the reference axis AX than the excitation light source $12_{Wide}$, $12_{Mid}$, and $12_{Hot}$ so as to surround the reference axis AX to receive excitation light from the corresponding one of the excitation light sources $12_{Wide}$, $12_{Mid}$, and $12_{Hot}$ on its mirror unit 202, as well as to allow the excitation light as a reflected light from each of the mirror units 202 to travel to the corresponding one of the scan regions $A_{Wide}$, $A_{Mid}$, and $A_{Hot}$.

Specifically, the excitation light source $12_{Wide}$, $12_{Mid}$, and $12_{Hot}$ are fixed to a light reflector holding part 58, and are arranged, as follows.

The light reflector holding part 58 includes a front face in the shape of a quadrangular pyramid projecting forward, and the front face in the shape of a quadrangular pyramid, as illustrated in FIG. 24, includes a top face 58U, a lower face 58D, a left face 58L, and a right face 58R (not illustrated).

The wide light reflector $201_{Wide}$ (corresponding to the first light reflector of the present invention) is fixed to the lower face 58D of the front face in the shape of a quadrangular pyramid in inclined posture while its mirror unit 202 is positioned in an optical path of the excitation light $Ray_{Wide}$ from the wide excitation light source $12_{Wide}$. Likewise, the middle light reflector $201_{Mid}$ (corresponding to the second light reflector of the present invention) is fixed to the top face 58U of the front face in the shape of a quadrangular pyramid in inclined posture while its mirror unit 202 is positioned in an optical path of the excitation light $Ray_{Mid}$ from the middle excitation light source $12_{Mid}$. Likewise, the hot light reflector $201_{Hot}$ (corresponding to the third light reflector of the present invention) is fixed to the left face 58L, which is arranged on a left side as viewed from the front, of the front face in the shape of a quadrangular pyramid in inclined posture while its mirror unit 202 is positioned in an optical path of the excitation light $Ray_{Hot}$ from the hot excitation light source $12_{Hot}$.

Each of the light reflectors $201_{Wide}$, $201_{Mid}$, and $201_{Hot}$ is arranged while the first shaft X1 is included in a vertical plane as well as the second shaft X2 is included in a horizontal plane. Arranging each of the light reflectors $201_{Wide}$, $201_{Mid}$, and $201_{Hot}$ in this way enables a predetermined light distribution pattern (two-dimensional image corresponding to the predetermined light distribution pattern) that is wide in the horizontal direction and narrow in the vertical direction and is required for a vehicle headlamp, to be easily formed (drawn).

The wide light reflector $201_{Wide}$ forms a first light intensity distribution in the wide scan region $A_{Wide}$ (corresponding to the first scan region of the present invention) by drawing a first two-dimensional image in the wide scan region $A_{Wide}$ with the excitation light $Ray_{Wide}$ that is two-dimensionally scanned in the horizontal direction and vertical direction by its mirror unit 202.

The middle light reflector $201_{Mid}$ forms a second light intensity distribution, higher than the first light intensity distribution in light intensity, in the middle scan region $A_{Mid}$ (corresponding to the second scan region of the present invention) by drawing a second two-dimensional image in the middle scan region $A_{Mid}$, while the second two-dimensional image overlaps with the first two-dimensional image, with the excitation light $Ray_{Mid}$ that is two-dimensionally scanned in the horizontal direction and vertical direction by its mirror unit 202.

As illustrated in FIG. 20, the middle scan region $A_{Mid}$ is smaller than the wide scan region $A_{Wide}$ in size, as well as overlaps with the wide scan region $A_{Wide}$. As a result, a light intensity distribution formed in the overlapped middle scan region $A_{Mid}$ is relatively higher than the wide scan region $A_{Wide}$ in light intensity.

The hot light reflector $201_{Hot}$ forms a third light intensity distribution, higher than the second light intensity distribution in light intensity, in the hot scan region $A_{Hot}$ (corresponding to the third scan region of the present invention) by drawing a third two-dimensional image in the hot scan region $A_{Hot}$, while the third two-dimensional image overlaps with the first and second two-dimensional images, with the excitation light $Ray_{Hot}$ that is two-dimensionally scanned in the horizontal direction and vertical direction by its mirror unit 202.

As illustrated in FIG. 20, the hot scan region $A_{Hot}$ is smaller than the middle scan region $A_{Mid}$ in size, as well as overlaps with the middle scan region $A_{Mid}$. As a result, a light intensity distribution formed in the overlapped hot scan region $A_{Hot}$ is relatively higher than the middle scan region $A_{Mid}$ in light intensity.

Each of the scan regions $A_{Wide}$, $A_{Mid}$, and $A_{Hot}$, is not limited to the region with a rectangular outline illustrated in FIG. 20, and may be, for example, a region with an outline in a circular shape, an elliptical shape, or one of other various shapes.

Figure 26:
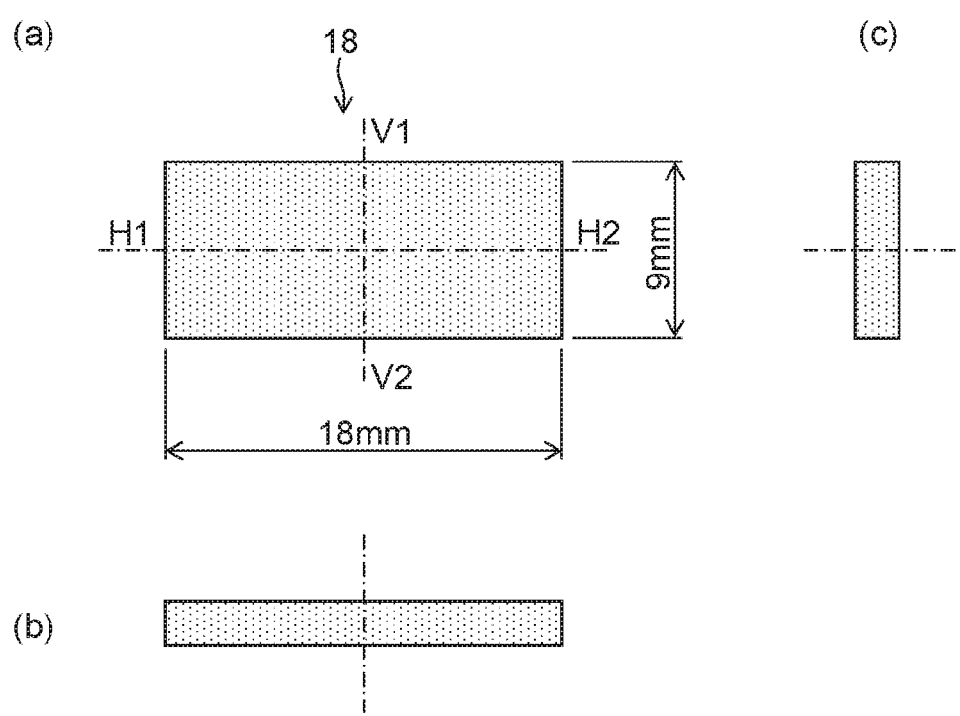
FIG. 26 includes a portion (a) that is a front view of a wavelength converter 18, a portion (b) that is a top view thereof, and a portion (c) that is a side view thereof.

FIG. 26 includes a portion (a) that is a front view of a wavelength converter 18, a portion (b) that is a top view thereof, and a portion (c) that is a side view thereof.

As illustrated in the portions (a) to (c) of FIG. 26, the wavelength converter 18 is formed as a plate-shaped wavelength converter (also called a phosphor panel) with a rectangular outline (with a horizontal length of 18 mm, and a vertical length of 9 mm, for example).

The wavelength converter 18, as illustrated in FIGS. 23 and 24, is fixed to a phosphor holding part 52 blocking an opening at a trailing end of the cylindrical portion 48. Specifically, the wavelength converter 18 includes the rear face 18a whose periphery along an outline thereof is fixed around an opening 52a formed in the phosphor holding part 52 to cover the opening 52a.

Figure 29A:
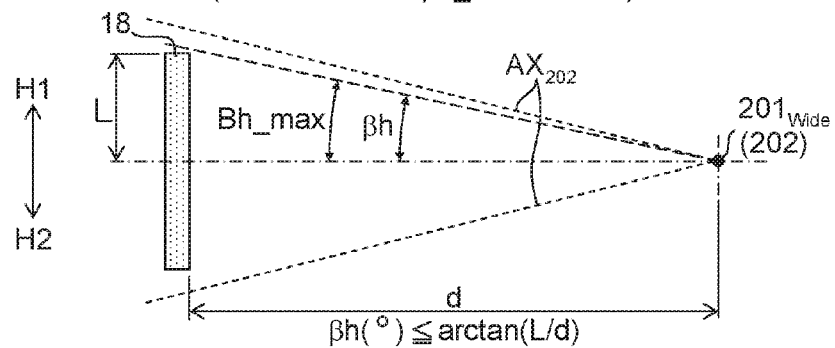
FIG. 29A is an illustration for describing "L" and "βh_max" described in FIG. 28A.
Figure 29B:
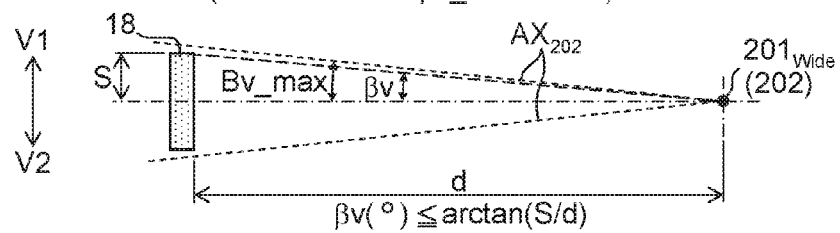
FIG. 29B is an illustration for describing "S", "βv_max", and "L", described in FIG. 28B.

The wavelength converter 18 is arranged so as to be fitted within a center line $AX_{202}$ of the mirror unit 202 of the wide light reflector $201_{Wide}$ at a maximum deflection angle βh_max (refer to FIG. 29A) as well as within a center line $AX_{202}$ of the mirror unit 202 of the wide light reflector $201_{Wide}$ at a maximum deflection angle βv_max (refer to FIG. 29B). That is, the wavelength converter 18 is arranged so as to satisfy the following two Expressions 1 and 2.

$$\tan(\beta h\_max) \geq L/d \quad \text{(Expression 1)}$$

$$\tan(\beta v\_max) \geq S/d \quad \text{(Expression 2)},$$

where L is ½ of a horizontal length of the wavelength converter 18, and S is ½ of a vertical length of the wavelength converter 18.

Subsequently, a method of adjusting a size (horizontal length and vertical length) of each of the scan regions $A_{Wide}$, $A_{Mid}$, and $A_{Hot}$ will be described.

In the case where a distance between the center of the mirror unit 202 of each of the light reflectors $201_{Wide}$, $201_{Mid}$, and $201_{Hot}$ and the wavelength converter 18 is identical or substantially identical (refer to Figured 22 and 23), a size (horizontal length and vertical length) of each of the scan regions $A_{Wide}$, $A_{Mid}$, and $A_{Hot}$ can be adjusted by varying the first alternating voltage and the second alternating voltage to be applied to the first piezoelectric actuators 203 and 204, respectively, as well as the third alternating voltage to be applied to the second piezoelectric actuators 205 and 206, to change an oscillation range around the first shaft X1 of the mirror unit 202 of each of the light reflectors $201_{Wide}$, $201_{Mid}$, and $201_{Hot}$, as well as an oscillation range around the second shaft X2 thereof. A reason for that will be described below.

Figure 27A:
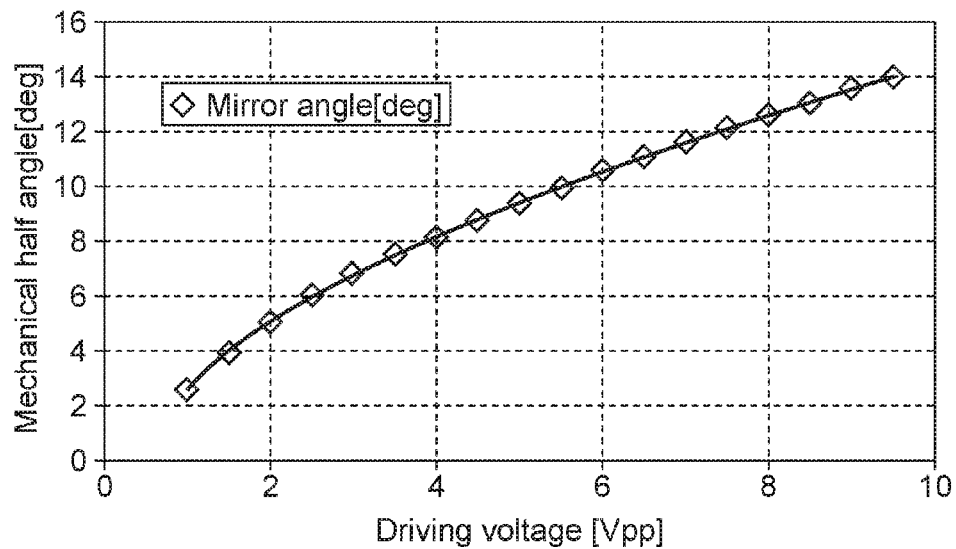
FIG. 27A is a graph illustrating a relationship between a mechanical oscillation angle (half angle) of the mirror unit 202 around the first shaft X1 and driving voltage applied to the first piezoelectric actuators 203 and 204.
Figure 27B:
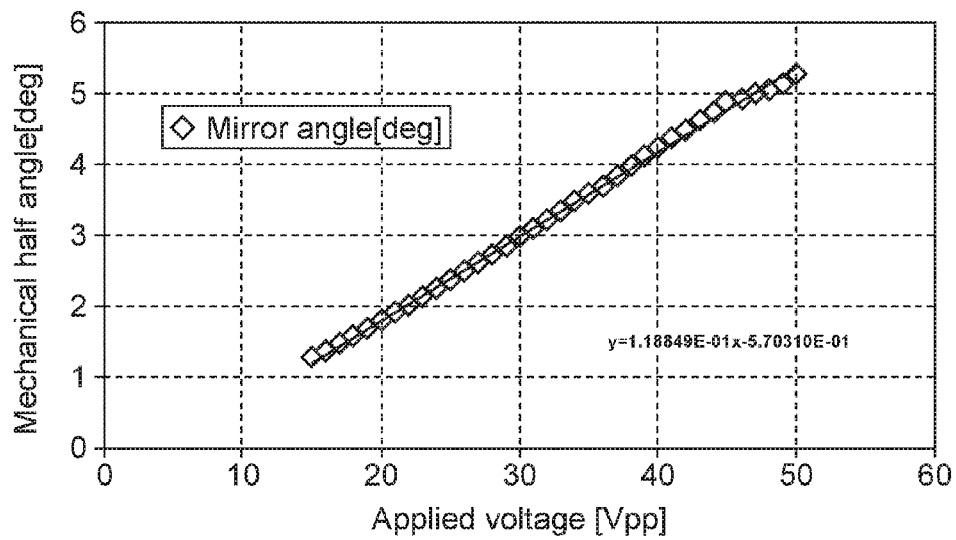
FIG. 27B is a graph illustrating a relationship between a mechanical oscillation angle (half angle) of the mirror unit 202 around the second shaft X2 and driving voltage applied to the second piezoelectric actuators 205 and 206.

In each of the light reflector $201_{Wide}$, $201_{Mid}$, and $201_{Hot}$, as illustrated in FIG. 27A, a mechanical oscillation angle (half angle, and refer to the vertical axis) around the first shaft X1 of the mirror unit 202 increases as driving voltage applied to the first piezoelectric actuators 203 and 204 increases (refer to the horizontal axis). In addition, as illustrated in FIG. 27B, a mechanical oscillation angle around the second shaft X2 of the mirror unit 202 (half angle, and refer to the vertical axis) also increases as driving voltage applied to the second piezoelectric actuators 205 and 206 increases (refer to the horizontal axis).

Thus, in the case where the distance between the center of the mirror unit 202 of each of the light reflectors $201_{Wide}$, $201_{Mid}$, and $201_{Hot}$ and the wavelength converter 18 is identical or substantially identical (refer to Figured 23 and 24), a size (horizontal length and vertical length) of each of the scan regions $A_{Wide}$, $A_{Mid}$, and $A_{Hot}$ can be adjusted by varying the first alternating voltage and the second alternating voltage to be applied to the first piezoelectric actuators 203 and 204, respectively, as well as the third alternating voltage to be applied to the second piezoelectric actuators 205 and 206, to change an oscillation range around the first shaft X1 of the mirror unit 202 of each of the light reflectors $201_{Wide}$, $201_{Mid}$, and $201_{Hot}$, as well as an oscillation range around the second shaft X2 thereof.

Next, an example of a specific adjustment will be described. In the description below, the distance between the center of the mirror unit 202 of each of the light reflectors $201_{Wide}$, $201_{Mid}$, and $201_{Hot}$ and the wavelength converter 18 is identical ("d" in each of FIGS. 29A and 29B is 24.0 mm, for example), and focal length of the projection lens 20 is 32 mm.

As shown in a line of "WIDE" in FIG. 28A, for example, when driving voltage of 5.41 $V_{pp}$ is applied to the first piezoelectric actuators 203 and 204 of the wide light reflector $201_{Wide}$, a mechanical oscillation angle around the first shaft X1 (a half angle of γh_max) and a maximum deflection angle (a half angle of βh_max) become ±9.8 degrees and ±19.7 degrees, respectively. In this case, a size (horizontal length) of the wide scan region $A_{Wide}$ is adjusted to ±8.57 mm.

FIG. 28A describes "L" and "βh_max" that represent the distance and the angle described in FIG. 29A, respectively. FIG. 28A and the like describe a "mirror mechanical half angle" (also called a mechanical half angle) that is an angle through which the mirror unit 202 actually moves, and is represented by a plus or minus angle from a normal direction of the mirror unit 202. Meanwhile, FIG. 28A and the like describe a "mirror deflection angle" (also called an optical half angle) that is an angle formed by excitation light (light beam) reflected on the mirror unit 202 and the normal direction of the mirror unit 202, and is also represented by a plus or minus angle from the normal direction of the mirror unit 202. The optical half angle is twice the mechanical half angle by Fresnel's law.

As shown in a line of "WIDE" in FIG. 28B, when a driving voltage of 41.2 $V_{pp}$ is applied to the second piezoelectric actuators 205 and 206 of the wide light reflector $201_{Wide}$, a mechanical oscillation angle around the first shaft X1 (a half angle of γv_max) and a maximum deflection angle (a half angle of βv_max) become ±4.3 degrees and ±8.6 degrees, respectively. In this case, a size (vertical length) of the wide scan region $A_{Wide}$ is adjusted to ±3.65 mm.

FIG. 28B describes "S" and "βv_max" that represent the distance and the angle described in FIG. 29B, respectively.

As above, a size (horizontal length and vertical length) of the wide scan region $A_{Wide}$ can be adjusted to a size of a rectangle with a horizontal length of ±8.57 mm and a vertical length of ±3.65 mm by applying a driving voltage (first alternating voltage and second alternating voltage) of 5.41 $V_{pp}$ to the first piezoelectric actuators 203 and 204 of the wide light reflector $201_{Wide}$ as well as applying a driving voltage (third alternating voltage) of 41.2 $V_{pp}$ to the second piezoelectric actuators 205 and 206 thereof, to change an oscillation range around the first shaft X1 of the mirror unit 202 of the wide light reflector $201_{Wide}$ and an oscillation range around the second shaft X2 thereof.

Light intensity distribution formed in the wide scan region $A_{Wide}$ is projected forward through the projection lens 20 to form a rectangular wide light distribution pattern $P_{Wide}$ (refer to FIG. 25) on a virtual vertical screen at a horizontal projection angle of ±15 degrees and a vertical projection angle of ±6.5 degrees.

Meanwhile, as shown in a line of "MID" in FIG. 28A, when a driving voltage of 2.31 $V_{pp}$ is applied to the first piezoelectric actuators 203 and 204 of the middle light reflector $201_{Mid}$, a mechanical oscillation angle around the first shaft X1 (a half angle of γh_max) and a maximum deflection angle (a half angle of βh_max) become ±5.3 degrees and ±11.3 degrees, respectively. In this case, a size (horizontal length) of the middle scan region $A_{Mid}$ is adjusted to ±4.78 mm.

In addition, as shown in a line of "MID" in FIG. 28B, when a driving voltage of 24.4 $V_{pp}$ is applied to the second piezoelectric actuators 205 and 206 of the middle light reflector $201_{Mid}$, a mechanical oscillation angle around the first shaft X1 (a half angle of γv_max) and a maximum deflection angle (a half angle of βv_max) become ±2.3 degrees and ±4.7 degrees, respectively. In this case, a size (vertical length) of the middle scan region $A_{Mid}$ is adjusted to ±1.96 mm.

As above, a size (horizontal length and vertical length) of the middle scan region $A_{Mid}$ can be adjusted to a size of a rectangle with a horizontal length of ±4.78 mm and a vertical length of ±1.96 mm by applying a driving voltage (first alternating voltage and second alternating voltage) of 2.31 $V_{pp}$ to the first piezoelectric actuators 203 and 204 of the middle light reflector $201_{Mid}$ as well as applying a driving voltage (third alternating voltage) of 24.4 $V_{pp}$ to the second piezoelectric actuators 205 and 206 thereof, to change an oscillation range around the first shaft X1 of the mirror unit 202 of the middle light reflector $201_{Mid}$ and an oscillation range around the second shaft X2 thereof.

Light intensity distribution formed in the middle scan region $A_{Mid}$ is projected forward through the projection lens 20 to form a rectangular middle light distribution pattern $P_{Mid}$ (refer to FIG. 25) on a virtual vertical screen at a horizontal projection angle of ±8.5 degrees and a vertical projection angle of ±3.5 degrees.

Meanwhile, as shown in a line of "HOT" in FIG. 28A, when a driving voltage of 0.93 $V_{pp}$ is applied to the first piezoelectric actuators 203 and 204 of the hot light reflector $201_{Hot}$, a mechanical oscillation angle around the first shaft X1 (a half angle of γh_max) and a maximum deflection angle (a half angle of βh_max) become ±2.3 degrees and ±4.7 degrees, respectively. In this case, a size (horizontal length) of the hot scan region $A_{Hot}$ is adjusted to ±1.96 mm.

In addition, as shown in a line of "HOT" in FIG. 28B, when a driving voltage of 13.3 $V_{pp}$ is applied to the second piezoelectric actuators 205 and 206 of the hot light reflector $201_{Hot}$, a mechanical oscillation angle around the first shaft X1 (a half angle of γv_max) and a maximum deflection angle (a half angle of βv_max) become ±1.0 degrees and ±2.0 degrees, respectively. In this case, a size (vertical length) of the hot scan region $A_{Hot}$ is adjusted to ±0.84 mm.

As above, a size (horizontal length and vertical length) of the hot scan region $A_{Hot}$ can be adjusted to a size of a rectangle with a horizontal length of ±1.96 mm and a vertical length of ±0.84 mm by applying a driving voltage (first alternating voltage and second alternating voltage) of 0.93 $V_{pp}$ to the first piezoelectric actuators 203 and 204 of the hot light reflector $201_{Hot}$ as well as applying a driving voltage (third alternating voltage) of 13.3 $V_{pp}$ to the second piezoelectric actuators 205 and 206 thereof, to change an oscillation range around the first shaft X1 of the mirror unit 202 of the hot light reflector $201_{Hot}$ and an oscillation range around the second shaft X2 thereof.

Light intensity distribution formed in the hot scan region $A_{Hot}$ is projected forward through the projection lens 20 to form a rectangular hot light distribution pattern $P_{Hot}$ (refer to FIG. 25) on a virtual vertical screen at a horizontal projection angle of ±3.5 degrees and a vertical projection angle of ±1.5 degrees.

As above, in the case where the distance between the center of the mirror unit 202 of each of the light reflectors $201_{Wide}$, $201_{Mid}$, and $201_{Hot}$ and the wavelength converter 18 is identical or substantially identical (refer to FIGS. 23 and 24), a size (horizontal length and vertical length) of each of the scan regions $A_{Wide}$, $A_{Mid}$, and $A_{Hot}$ can be adjusted by varying driving voltage (first alternating voltage and second alternating voltage) to be applied to the first piezoelectric actuators 203 and 204, respectively, as well as driving voltage (third alternating voltage) to be applied to the second piezoelectric actuators 205 and 206, to change an oscillation range around the first shaft X1 of the mirror unit 202 of each of the light reflector $201_{Wide}$, $201_{Mid}$, and $201_{Hot}$, as well as an oscillation range around the second shaft X2 thereof.

Subsequently, another method of adjusting a size (horizontal length and vertical length) of each of the scan regions $A_{Wide}$, $A_{Mid}$, and $A_{Hot}$ will be described.

Figure 30:
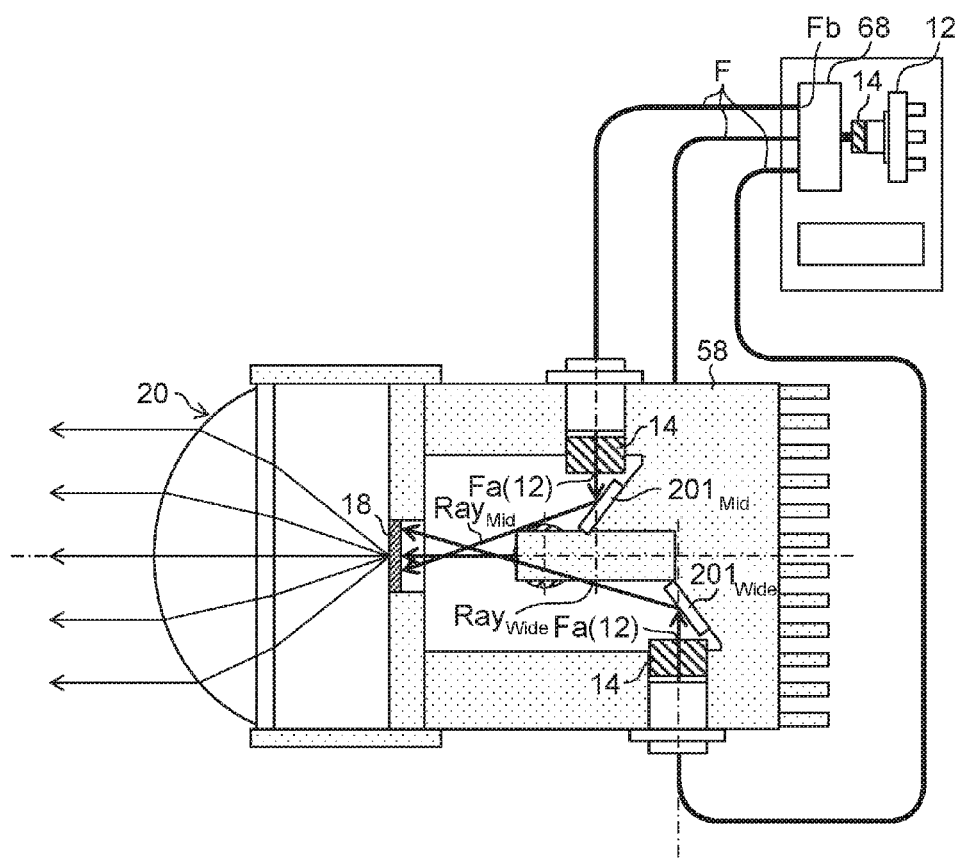
FIG. 30 illustrates an example of changing a distance between each of the light reflectors $201_{Wide}$, $201_{Mid}$, and $201_{Hot}$ (the center of the mirror unit 202) and the wavelength converter 18.

In the case where driving voltage applied to each of the light reflectors $201_{Wide}$, $201_{Mid}$, and $201_{Hot}$ is identical or substantially identical, a size (horizontal length and vertical length) of the scan regions $A_{Wide}$, $A_{Mid}$, and $A_{Hot}$ can be adjusted by varying a distance between the center of the mirror unit 202 of each of the light reflector $201_{Wide}$, $201_{Mid}$, and $201_{Hot}$, and the wavelength converter 18 (refer to FIG. 30, for example).

Next, an example of a specific adjustment will be described. In the description below, driving voltage applied to each of the light reflectors $201_{Wide}$, $201_{Mid}$, and $201_{Hot}$ is identical, and the projection lens 20 has a focal length of 32 mm.

As shown in a line of "WIDE" in FIG. 31A, for example, when a distance of the center of the mirror unit 202 of the wide light reflector $201_{Wide}$ and the wavelength converter 18 is set at 24.0 mm and a driving voltage of 5.41 $V_{pp}$ is applied to the first piezoelectric actuators 203 and 204 of the wide light reflector $201_{Wide}$, a mechanical oscillation angle around the first shaft X1 (a half angle of γh_max) and a maximum deflection angle (a half angle of βh_max) become ±9.8 degrees and ±19.7 degrees, respectively. In this case, a size (horizontal length) of the wide scan region $A_{Wide}$ is adjusted to ±8.57 mm.

FIG. 31A describes "L", "βh_max", and "d" that represent the distance and the angle described in FIG. 29A.

In addition, as shown in a line of "WIDE" in FIG. 31B, when a distance of the center of the mirror unit 202 of the wide light reflector $201_{Wide}$ and the wavelength converter 18 is set at 24.0 mm and a driving voltage of 41.2 $V_{pp}$ is applied to the second piezoelectric actuators 205 and 206 of the wide light reflector $201_{Wide}$, a mechanical oscillation angle around the first shaft X1 (a half angle of γh_max) and a maximum deflection angle (a half angle of βh_max) become ±4.3 degrees and ±8.6 degrees, respectively. In this case, a size (vertical length) of the wide scan region $A_{Wide}$ is adjusted to ±3.65 mm.

FIG. 31B describes "S", "βv_max", and "d" that represent the distance and the angle described in FIG. 29B.

As above, setting a distance between the center of the mirror unit 202 of the wide light reflector $201_{Wide}$ and the wavelength converter 18 at 24.0 mm enables a size (horizontal length and vertical length) of the wide scan region $A_{Wide}$ to be adjusted to a size of a rectangle with a horizontal length of ±8.57 mm and a vertical length of ±3.65 mm.

Light intensity distribution formed in the wide scan region $A_{Wide}$ is projected forward through the projection lens 20 to form a rectangular wide light distribution pattern $P_{Wide}$ (refer to FIG. 25) on a virtual vertical screen at a horizontal projection angle of ±15 degrees and a vertical projection angle of ±6.5 degrees.

Meanwhile, as shown in a line of "MID" in FIG. 31A, when a distance of the center of the mirror unit 202 of the middle light reflector $201_{Mid}$ and the wavelength converter 18 is set at 13.4 mm and a driving voltage of 5.41 $V_{pp}$ is applied to the first piezoelectric actuators 203 and 204 of the middle light reflector $201_{Mid}$, as with the wide light reflector $201_{Wide}$, a mechanical oscillation angle around the first shaft X1 (a half angle of γh_max) and a maximum deflection angle (a half angle of βh_max) become ±9.8 degrees and ±19.7 degrees, respectively, as with the wide light reflector $201_{Wide}$. However, the distance (13.4 mm) between the center of the mirror unit 202 of the middle light reflector $201_{Mid}$ and the wavelength converter 18 is shorter than the distance (24.0 mm) between the center of the mirror unit 202 of the wide light reflector $201_{Wide}$ and the wavelength converter 18, and thus a size (horizontal length) of the middle scan region $A_{Mid}$ is adjusted to ±4.78 mm.

In addition, as shown in a line of "MID" in FIG. 31B, when a distance of the center of the mirror unit 202 of the middle light reflector $201_{Mid}$ and the wavelength converter 18 is set at 13.4 mm and a driving voltage of 41.2 $V_{pp}$ is applied to the second piezoelectric actuators 205 and 206 of the middle light reflector $201_{Mid}$, as with the wide light reflector $201_{Wide}$, a mechanical oscillation angle around the first shaft X1 (a half angle of γv_max) and a maximum deflection angle (a half angle of βv_max) become ±4.3 degrees and ±8.6 degrees, respectively, as with the wide light reflector $201_{Wide}$. However, the distance (13.4 mm) between the center of the mirror unit 202 of the middle light reflector $201_{Mid}$ and the wavelength converter 18 is shorter than the distance (24.0 mm) between the center of the mirror unit 202 of the wide light reflector $201_{Wide}$ and the wavelength converter 18, and thus a size (vertical length) of the middle scan region $A_{Mid}$ is adjusted to ±1.96 mm.

As above, setting a distance between the center of the mirror unit 202 of the middle light reflector $201_{Mid}$ and the wavelength converter 18 at 13.4 mm enables a size (horizontal length and vertical length) of the middle scan region $A_{Mid}$ to be adjusted to a size of a rectangle with a horizontal length of ±4.78 mm and a vertical length of ±1.96 mm.

Light intensity distribution formed in the middle scan region $A_{Mid}$ is projected forward through the projection lens 20 to form a rectangular middle light distribution pattern $P_{Mid}$ (refer to FIG. 25) on a virtual vertical screen at a horizontal projection angle of ±8.5 degrees and a vertical projection angle of ±3.6 degrees.

Meanwhile, as shown in a line of "HOT" in FIG. 31A, when a distance of the center of the mirror unit 202 of the hot light reflector $201_{Hot}$ and the wavelength converter 18 is set at 5.5 mm and a driving voltage of 5.41 $V_{pp}$ is applied to the first piezoelectric actuators 203 and 204 of the hot light reflector $201_{Hot}$, as with the wide light reflector $201_{Wide}$, a mechanical oscillation angle around the first shaft X1 (a half angle of γh_max) and a maximum deflection angle (a half angle of βh_max) become ±9.8 degrees and ±19.7 degrees, respectively, as with the wide light reflector $201_{Wide}$. However, the distance (5.5 mm) between the center of the mirror unit 202 of the hot light reflector $201_{Hot}$ and the wavelength converter 18 is shorter than the distance (13.4 mm) between the center of the mirror unit 202 of the middle light reflector $201_{Mid}$ and the wavelength converter 18, and thus a size (horizontal length) of the hot scan region $A_{Hot}$ is adjusted to ±1.96 mm.

In addition, as shown in a line of "HOT" in FIG. 31B, when a distance of the center of the mirror unit 202 of the hot light reflector $201_{Hot}$ and the wavelength converter 18 is set at 5.5 mm and a driving voltage of 41.2 $V_{pp}$ is applied to the second piezoelectric actuators 205 and 206 of the hot light reflector $201_{Hot}$, as with the wide light reflector $201_{Wide}$, a mechanical oscillation angle around the first shaft X1 (a half angle of γv_max) and a maximum deflection angle (a half angle of βv_max) become ±4.3 degrees and ±8.6 degrees, respectively, as with the wide light reflector $201_{Wide}$. However, the distance (5.5 mm) between the center of the mirror unit 202 of the hot light reflector $201_{Hot}$ and the wavelength converter 18 is shorter than the distance (13.4 mm) between the center of the mirror unit 202 of the middle light reflector $201_{Mid}$ and the wavelength converter 18, and thus a size (vertical length) of the hot scan region $A_{Hot}$ is adjusted to ±0.84 mm.

As above, setting a distance between the center of the mirror unit 202 of the hot light reflector $201_{Hot}$ and the wavelength converter 18 at 5.5 mm enables a size (horizontal length and vertical length) of the hot scan region $A_{Hot}$ to be adjusted to a size of a rectangle with a horizontal length of ±1.96 mm and a vertical length of ±0.84 mm.

Light intensity distribution formed in the hot scan region $A_{Hot}$ is projected forward through the projection lens 20 to form a rectangular hot light distribution pattern $P_{Hot}$ (refer to FIG. 25) on a virtual vertical screen at a horizontal projection angle of ±3.5 degrees and a vertical projection angle of ±1.5 degrees.

As above, in the case where driving voltage applied to each of the light reflectors $201_{Wide}$, $201_{Mid}$, and $201_{Hot}$ is identical or substantially identical, a size (horizontal length and vertical length) of the scan regions $A_{Wide}$, $A_{Mid}$, and $A_{Hot}$ can be adjusted by varying a distance between the center of the mirror unit 202 of each of the light reflectors $201_{Wide}$, $201_{Mid}$, and $201_{Hot}$, and the wavelength converter 18.

In the case where the first alternating voltage and the second alternating voltage to be applied to the first piezoelectric actuators 203 and 204 of each of the light reflectors $201_{Wide}$, $201_{Mid}$, and $201_{Hot}$ is controlled by feedback control, driving voltage applied to each of the light reflectors $201_{Wide}$, $201_{Mid}$, and $201_{Hot}$ fails to be completely identical. Even in this case, a size (horizontal length and vertical length) of each of the scan region $A_{Wide}$, $A_{Mid}$, and $A_{Hot}$ can be adjusted by varying a distance between the center of the mirror unit 202 of each of the light reflectors $201_{Wide}$, $201_{Mid}$, and $201_{Hot}$, and the wavelength converter 18.

Subsequently, still another method of adjusting a size (horizontal length and vertical length) of each of the scan regions $A_{Wide}$, $A_{Mid}$, and $A_{Hot}$ will be described.

Figure 32:
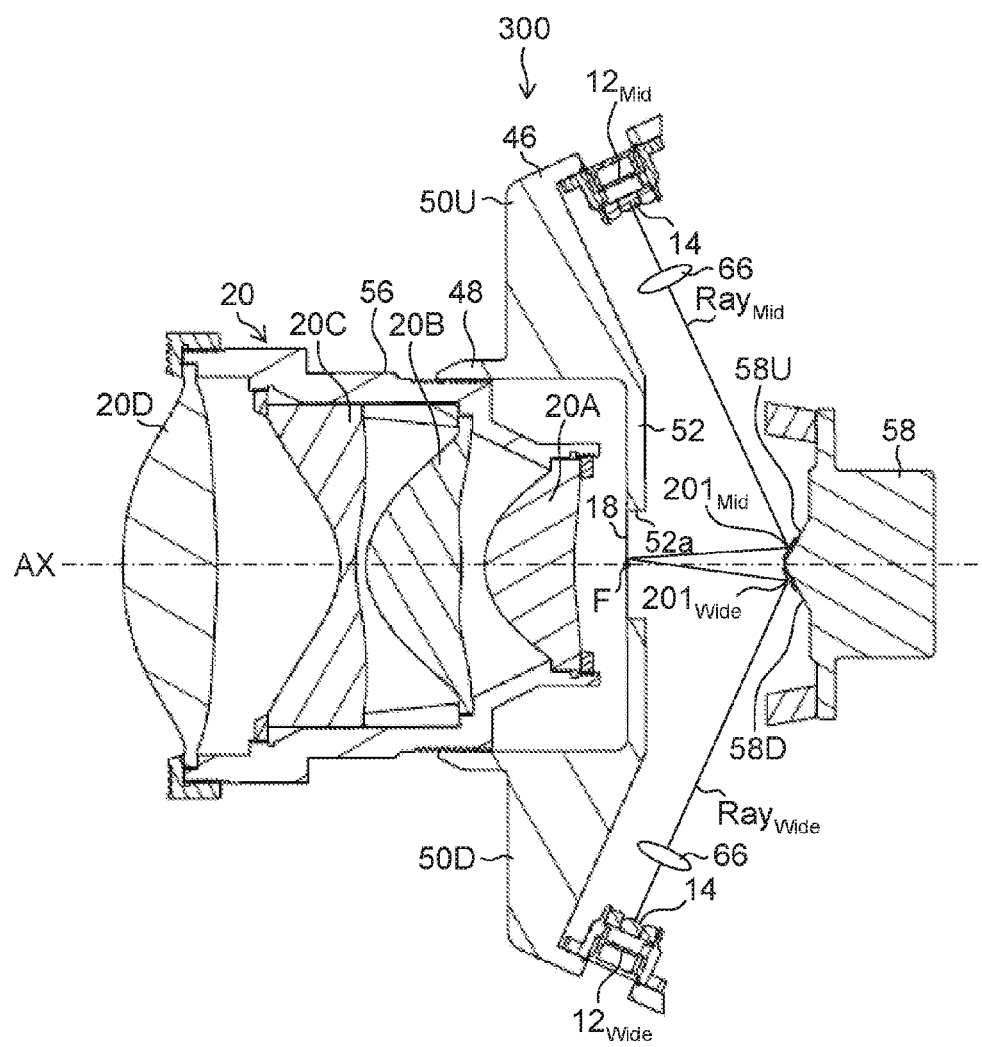
FIG. 32 is a longitudinal sectional view of a variation of the vehicle lamp 300.

It is also thought that a size (horizontal length and vertical length) of each of the scan regions $A_{Wide}$, $A_{Mid}$, and $A_{Hot}$, as illustrated in FIG. 32, is adjusted by arranging one of corresponding lenses 66 (such as lenses each having a different focal length) between each of the excitation light sources $12_{Wide}$, $12_{Mid}$, and $12_{Hot}$ and the corresponding one of light reflectors $201_{Wide}$, $201_{Mid}$, and $201_{Hot}$ (or between each of the light reflectors $201_{Wide}$, $201_{Mid}$, and $201_{Hot}$, and the wavelength converter 18).

According to the present embodiment, it is possible to reduce a size of a vehicle lamp using a plurality of light reflectors each of which two-dimensionally scans excitation light, as well as the number of components to be a cause of an increase in cost.

This is achieved by using one wavelength converter and one optical system for the plurality of light reflectors $201_{Wide}$, $201_{Mid}$, and $201_{Hot}$ instead of using a plurality of wavelength converters (fluorescent substances) and a plurality of optical systems (projection lenses), such as a conventional vehicle lamp.

According to the present embodiment, in a vehicle lamp using a plurality of light reflectors each of which two-dimensionally scans excitation light, it is possible to form a predetermined light distribution pattern in which light intensity in a part of the pattern is relatively high, and decreases toward a periphery like gradation, such as the predetermined light distribution pattern P (such as a high-beam light distribution pattern) illustrated in FIG. 25 that has light intensity decreasing from center light intensity ($P_{Hot}$), which is relatively high, toward the periphery ($P_{Hot} \rightarrow P_{Mid} \rightarrow P_{Wide}$) like gradation, and that is excellent in distant visibility and light distribution feeling.

This is achieved by the following: as illustrated in FIG. 20, the middle scan region $A_{Mid}$ is smaller than the wide scan region $A_{Wide}$ in size and is superimposed on the wide scan region $A_{Wide}$, as well as the hot scan region $A_{Hot}$ is smaller than the middle scan region $A_{Mid}$ in size and is superimposed on the middle scan region $A_{Mid}$ to allow the first light intensity distribution formed in the wide scan region $A_{Wide}$, the second light intensity distribution formed in the middle scan region $A_{Mid}$, and the third light intensity distribution formed in the hot scan region $A_{Hot}$, to increase in light intensity as well as decrease in size, in the order described; and the predetermined light distribution pattern P (refer to FIG. 25) is formed by projecting the first light intensity distribution, the second light intensity distribution, and the third light intensity distribution in the wide scan region $A_{Wide}$, the middle scan region $A_{Mid}$, and the hot scan region $A_{Hot}$, respectively.

The present embodiment enables the vehicle lamp 300 (lamp unit) to be reduced in thickness in a direction of the reference axis AX even if the vehicle lamp 300 is larger than a vehicle lamp 400 (lamp unit) described later in size in vertical and horizontal directions.

Next, another vehicle lamp using three light reflectors 201 of a uniaxial nonresonant/uniaxial resonant type will be described with reference to accompanying drawings, as a third embodiment. Instead of the light reflector 201 of a uniaxial nonresonant/uniaxial resonant type, the various light reflectors shown in the first embodiment are obviously available.

Figure 33:
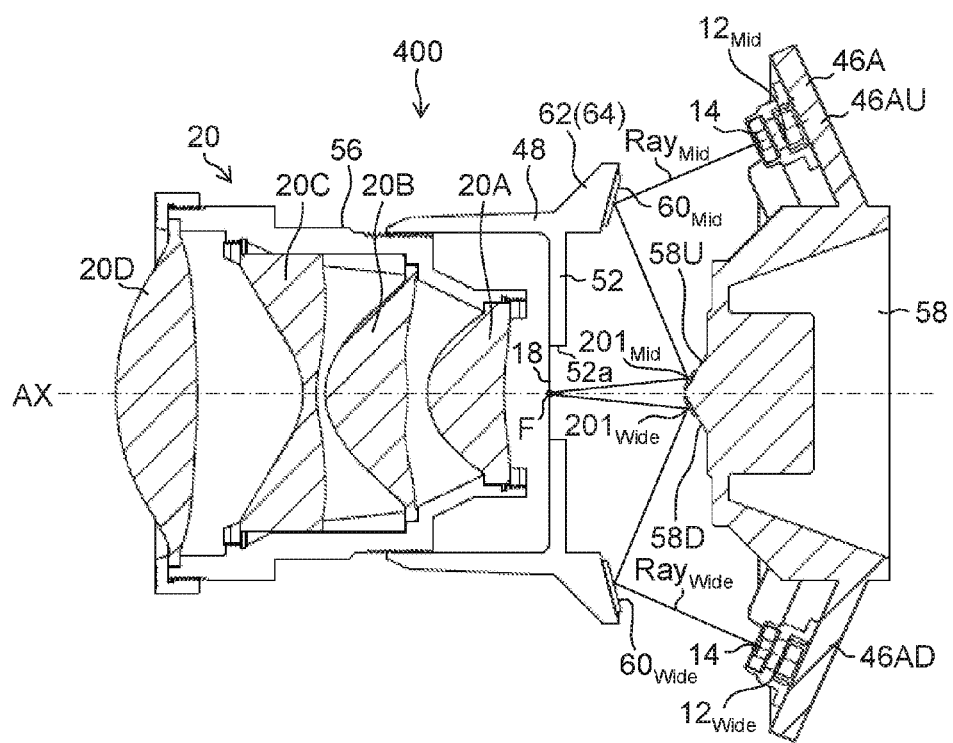
FIG. 33 is a longitudinal sectional view of a vehicle lamp 400 of a third embodiment of the present invention.
Figure 34:
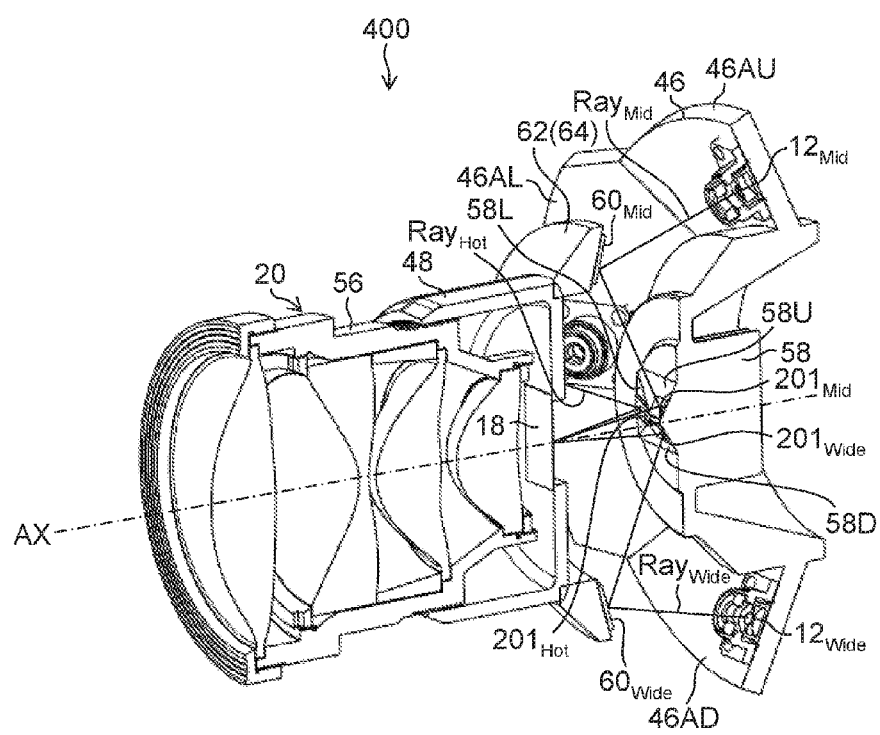
FIG. 34 is a sectional perspective view of the vehicle lamp 400 illustrated in FIG. 33.

FIG. 33 is a longitudinal sectional view of the vehicle lamp 400 of the third embodiment of the present invention, and FIG. 34 is a sectional perspective view of the vehicle lamp 400 illustrated in FIG. 33.

The vehicle lamp 400 of the present embodiment, as illustrated in FIG. 25, is configured to form a predetermined light distribution pattern P (such as a high-beam light distribution pattern) that is excellent in distant visibility and light distribution feeling, and that has light intensity decreasing from center light intensity ($P_{Hot}$), which is relatively high, toward the periphery ($P_{Hot} \rightarrow P_{Mid} \rightarrow P_{Wide}$) like gradation.

Comparing the vehicle lamp 400 of the present embodiment with the vehicle lamp 300 of the second embodiment finds a difference in that the second embodiment, as illustrated in FIGS. 23 and 24, is mainly configured to allow a laser beam as the excitation light from each of the excitation light sources $12_{Wide}$, $12_{Mid}$, and $12_{Hot}$ to be directly incident on the corresponding one of light reflectors $201_{Wide}$, $201_{Mid}$, and $201_{Hot}$, but the present embodiment, as illustrated in FIGS. 33 and 34, allows a laser beam as the excitation light from each of the excitation light sources $12_{Wide}$, $12_{Mid}$, and $12_{Hot}$ to be incident on the corresponding one of the light reflectors $201_{Wide}$, $201_{Mid}$, and $201_{Hot}$ after reflected on the corresponding one of reflection surfaces $60_{Wide}$, $60_{Mid}$, and $60_{Hot}$.

Other than the difference, the vehicle lamp 400 has the same configuration as that of the vehicle lamp 300 of the second embodiment. Hereinafter, the difference from the vehicle lamp 300 of the second embodiment will be mainly described, and the same component as that of the vehicle lamp 300 of the second embodiment will be designated by the same reference numeral as that of the vehicle lamp 300 to omit a description of the component.

The vehicle lamp 400, as illustrated in FIGS. 33 to 34, is configured as a vehicle headlamp including such as: the three excitation light sources $12_{Wide}$, $12_{Mid}$, and $12_{Hot}$; the three reflection surface $60_{Wide}$, $60_{Mid}$, and $60_{Hot}$ provided to correspond to the three excitation light sources $12_{Wide}$, $12_{Mid}$, and $12_{Hot}$, respectively; the three light reflectors $201_{Wide}$, $201_{Mid}$, and $201_{Hot}$ provided to correspond to the three reflection surface $60_{Wide}$, $60_{Mid}$, and $60_{Hot}$, respectively; the wavelength converter 18 having the three scan regions $A_{Wide}$, $A_{Mid}$, and $A_{Hot}$ (refer to FIG. 20) provided to correspond to the three light reflectors $201_{Wide}$, $201_{Mid}$, and $201_{Hot}$, respectively; and the projection lens 20 serving as an optical system that projects light intensity distribution formed in each of the three scan regions $A_{Wide}$, $A_{Mid}$, and $A_{Hot}$ to form the predetermined light distribution pattern P. The number of the excitation light sources 12, the reflection surfaces 60, the light reflectors 201, and the scan regions A, is not limited to three, and thus two, or four or more, is obviously available.

As illustrated in FIG. 33, the projection lens 20, the wavelength converter 18, and the light reflectors $201_{Wide}$, $201_{Mid}$, and $201_{Hot}$ are arranged in the order described, along the reference axis AX (also called an optical axis) extending in the vehicle longitudinal direction.

The excitation light sources $12_{Wide}$, $12_{Mid}$, and $12_{Hot}$ are fixed to a laser holding part 46A in inclined posture to respectively allow excitation lights $Ray_{Wide}$, $Ray_{Mid}$, and $Ray_{Hot}$ to travel forward and toward the reference axis AX, and are arranged so as to surround the reference axis AX.

Specifically, the excitation light source $12_{Wide}$, $12_{Mid}$, and $12_{Hot}$ are fixed to the laser holding part 46A, and are arranged, as follows.

The laser holding part 46A includes: an extension portion 46AU extending obliquely upward and forward from a top portion of an outer peripheral surface of the light reflector holding part 58; an extension portion 46AD extending obliquely downward and forward from a bottom portion of the outer peripheral surface of the light reflector holding part 58; an extension portion 46AL extending obliquely left and forward from a left portion, as viewed from the front, of the outer peripheral surface of the light reflector holding part 58; and an extension portion 46AR (not illustrated) extending obliquely right and forward from a right portion, as viewed from the front, of the outer peripheral surface of the light reflector holding part 58.

The wide excitation light source $12_{Wide}$, as illustrated in FIG. 33, is fixed to a front surface of the extension portion 46AD in inclined posture to allow its excitation light $Ray_{Wide}$ to travel in an obliquely forward and upward direction. Likewise, the middle excitation light source $12_{Mid}$ is fixed to a front surface of the extension portion 46AU in inclined posture to allow its excitation light $Ray_{Mid}$ to travel in an obliquely forward and downward direction. Likewise, the hot excitation light source $12_{Hot}$ is fixed to a front surface of the extension portion 46AL in inclined posture to allow its excitation light $Ray_{Hot}$ to travel in an obliquely forward and left direction as viewed from the front.

The lens holder 56, to which the projection lens 20 (lenses 20A to 20D) is fixed, is fixed to the cylindrical portion 48 by screwing its rear end into an opening at a leading end of the cylindrical portion 48.

The excitation lights $Ray_{Wide}$, $Ray_{Mid}$, and $Ray_{Hot}$, respectively, emitted from the excitation light sources $12_{Wide}$, $12_{Mid}$, and $12_{Hot}$ are condensed (collimated, for example) through the condenser lens 14 to be incident on the corresponding mirror units 202 of the light reflectors $201_{Wide}$, $201_{Mid}$, and $201_{Hot}$ after reflected on the corresponding reflection surfaces $60_{Wide}$, $60_{Mid}$, and $60_{Hot}$.

Each of the reflection surfaces $60_{Wide}$, $60_{Mid}$, and $60_{Hot}$ is fixed to a reflection surface holding part 62 in inclined posture to receive excitation light from the corresponding one of the excitation light sources $12_{Wide}$, $12_{Mid}$, and $12_{Hot}$ as well as to allow each of the excitation lights $Ray_{Wide}$, $Ray_{Mid}$, and $Ray_{Hot}$ as a reflected light from the corresponding one of the reflection surfaces $60_{Wide}$, $60_{Mid}$, and $60_{Hot}$ to travel backward and toward the reference axis AX. The reflection surfaces $60_{Wide}$, $60_{Mid}$, and $60_{Hot}$ are arranged closer to the reference axis AX than the excitation light source $12_{Wide}$, $12_{Mid}$, and $12_{Hot}$ so as to surround the reference axis AX.

Specifically, the reflection surface $60_{Wide}$, $60_{Mid}$, and $60_{Hot}$ are fixed to the reflection surface holding part 62, and are arranged, as follows.

The reflection surface holding part 62 includes a ring-shaped extension portion 64 extending backward and outward from the trailing end of the cylindrical portion 48 extending in the direction of the reference axis AX. The ring-shaped extension portion 64 has a rear face that inclines to allow its outer portion to be positioned behind its inner portion close to the reference axis AX (refer to FIG. 33).

The wide reflection surface $60_{Wide}$ is fixed to a lower portion of the rear face of the ring-shaped extension portion 64 in inclined posture to allow its reflected light as the excitation light $Ray_{Wide}$ to travel in an obliquely backward and upward direction. Likewise, the middle reflection surface $60_{Mid}$ is fixed to an upper portion of the rear face of the ring-shaped extension portion 64 in inclined posture to allow its reflected light as the excitation light $Ray_{Mid}$ to travel in an obliquely backward and downward direction. Likewise, the hot reflection surface $60_{Hot}$ (not illustrated) is fixed to a left portion, as viewed from the front, of the rear face of the ring-shaped extension portion 64 in inclined posture to allow its reflected light as the excitation light $Ray_{Hot}$ to travel in an obliquely backward and right direction as viewed from the front.

Each of the light reflectors $201_{Wide}$, $201_{Mid}$, and $201_{Hot}$, as illustrated in FIG. 34, is arranged closer to the reference axis AX than the reflection surfaces $60_{Wide}$, $60_{Mid}$, and $60_{Hot}$ so as to surround the reference axis AX to receive the excitation light as a reflected light from the corresponding one of the reflection surfaces $60_{Wide}$, $60_{Mid}$, and $60_{Hot}$, on its mirror unit 202, as well as to allow the excitation light as a reflected light from each of the mirror units 202 to travel to the corresponding one of the scan regions $A_{Wide}$, $A_{Mid}$, and $A_{Hot}$.

Specifically, the light reflectors $201_{Wide}$, $201_{Mid}$, and $201_{Hot}$ are arranged by being fixed to the light reflector holding part 58, as with the second embodiment.

The wide light reflector $201_{Wide}$ (corresponding to the first light reflector of the present invention) is fixed to the lower face 58D of the front face in the shape of a quadrangular pyramid in inclined posture while its mirror unit 202 is positioned in an optical path of the excitation light $Ray_{Wide}$ as a reflected light from the wide reflection surface $60_{Wide}$. Likewise, the middle light reflector $201_{Mid}$ (corresponding to the second light reflector of the present invention) is fixed to the top face 58U of the front face in the shape of a quadrangular pyramid in inclined posture while its mirror unit 202 is positioned in an optical path of the excitation light $Ray_{Mid}$ as a reflected light from the middle reflection surface $60_{Mid}$. Likewise, the hot light reflector $201_{Hot}$ (corresponding to the third light reflector of the present invention) is fixed to the left face 58L, which is arranged on a left side as viewed from the front, of the front face in the shape of a quadrangular pyramid in inclined posture while its mirror unit 202 is positioned in an optical path of the excitation light $Ray_{Hot}$ as a reflected light from the hot reflection surface $60_{Hot}$.

Each of the light reflectors $201_{Wide}$, $201_{Mid}$, and $201_{Hot}$ is arranged while the first shaft X1 is included in a vertical plane as well as the second shaft X2 is included in a horizontal plane. Arranging each of the light reflectors $201_{Wide}$, $201_{Mid}$, and $201_{Hot}$ in this way enables a predetermined light distribution pattern (two-dimensional image corresponding to the predetermined light distribution pattern) that is wide in the horizontal direction and narrow in the vertical direction and is required for a vehicle headlamp, to be easily formed (drawn).

The wide light reflector $201_{Wide}$ forms a first light intensity distribution in the wide scan region $A_{Wide}$ by drawing a first two-dimensional image in the wide scan region $A_{Wide}$ (corresponding to the first scan region of the present invention) with the excitation light $Ray_{Wide}$ that is two-dimensionally scanned in the horizontal direction and vertical direction by the mirror unit 202 of the wide light reflector $201_{Wide}$.

The middle light reflector $201_{Mid}$ forms a second light intensity distribution having light intensity higher than that of the first light intensity distribution, in the middle scan region $A_{Mid}$, by drawing a second two-dimensional image in the middle scan region $A_{Mid}$ (corresponding to the second scan region of the present invention) with the excitation light $Ray_{Mid}$ that is two-dimensionally scanned in the horizontal direction and vertical direction by the mirror unit 202 of the middle light reflector $201_{Mid}$, while the second two-dimensional image overlaps with a part of the first two-dimensional image.

As illustrated in FIG. 20, the middle scan region $A_{Mid}$ is smaller than the wide scan region $A_{Wide}$ in size, as well as overlaps with a part of the wide scan region $A_{Wide}$. As a result, a light intensity distribution formed in the overlapped middle scan region $A_{Mid}$ is relatively higher than the wide scan region $A_{Wide}$ in light intensity.

The hot light reflector $201_{Hot}$ forms a third light intensity distribution, higher than the second light intensity distribution in light intensity, in the hot scan region $A_{Hot}$ (corresponding to the third scan region of the present invention) by drawing a third two-dimensional image in the hot scan region $A_{Hot}$, while the third two-dimensional image overlaps with a part of the first and second two-dimensional images, with the excitation light $Ray_{Hot}$ that is two-dimensionally scanned in the horizontal direction and vertical direction by its mirror unit 202.

As illustrated in FIG. 20, the hot scan region $A_{Hot}$ is smaller than the middle scan region $A_{Mid}$ in size, as well as overlaps with the middle scan region $A_{Mid}$. As a result, a light intensity distribution formed in the overlapped hot scan region $A_{Hot}$ is relatively higher than the middle scan region $A_{Mid}$ in light intensity.

Each of the scan regions $A_{Wide}$, $A_{Mid}$, and $A_{Hot}$ is not limited to the region with a rectangular outline illustrated in FIG. 20, and may be, for example, a region with an outline in a circular shape, an elliptical shape, or one of other various shapes.

The wavelength converter 18 is fixed to the phosphor holding part 52, as with the second embodiment.

The present embodiment also enables a size (horizontal length and vertical length) of each of the scan regions $A_{Wide}$, $A_{Mid}$, and $A_{Hot}$ to be adjusted by the same method as that of the second embodiment.

According to the present embodiment, as with the second embodiment, it is possible to reduce a size of a vehicle lamp using a plurality of light reflectors each of which two-dimensionally scans excitation light, as well as the number of components to be a cause of an increase in cost.

In addition, according to the present embodiment, in a vehicle lamp using a plurality of light reflectors each of which two-dimensionally scans excitation light, it is possible to form a predetermined light distribution pattern in which light intensity in a part of the pattern is relatively high, and decreases toward a periphery like gradation, such as the predetermined light distribution pattern P (such as a high-beam light distribution pattern) illustrated in FIG. 25 that has light intensity decreasing from center light intensity ($P_{Hot}$), which is relatively high, toward the periphery ($P_{Hot} \rightarrow P_{Mid} \rightarrow P_{Wide}$) like gradation, and that is excellent in distant visibility and light distribution feeling.

The present embodiment increases reflection one more time as compared with the vehicle lamp 300 (lamp unit) to cause efficiency to be slightly deteriorated accordingly, but enables the vehicle lamp 400 (lamp unit) to be reduced in size in up-and-down and side-to-side directions (horizontal direction and vertical direction).

Next, variations will be described.

Although the first to third embodiments each describe an example using a semiconductor light emission element that emits excitation light, as the excitation light sources 12 ($12_{Wide}$, $12_{Mid}$, and $12_{Hot}$), the present invention is not limited to this.

Figure 35:
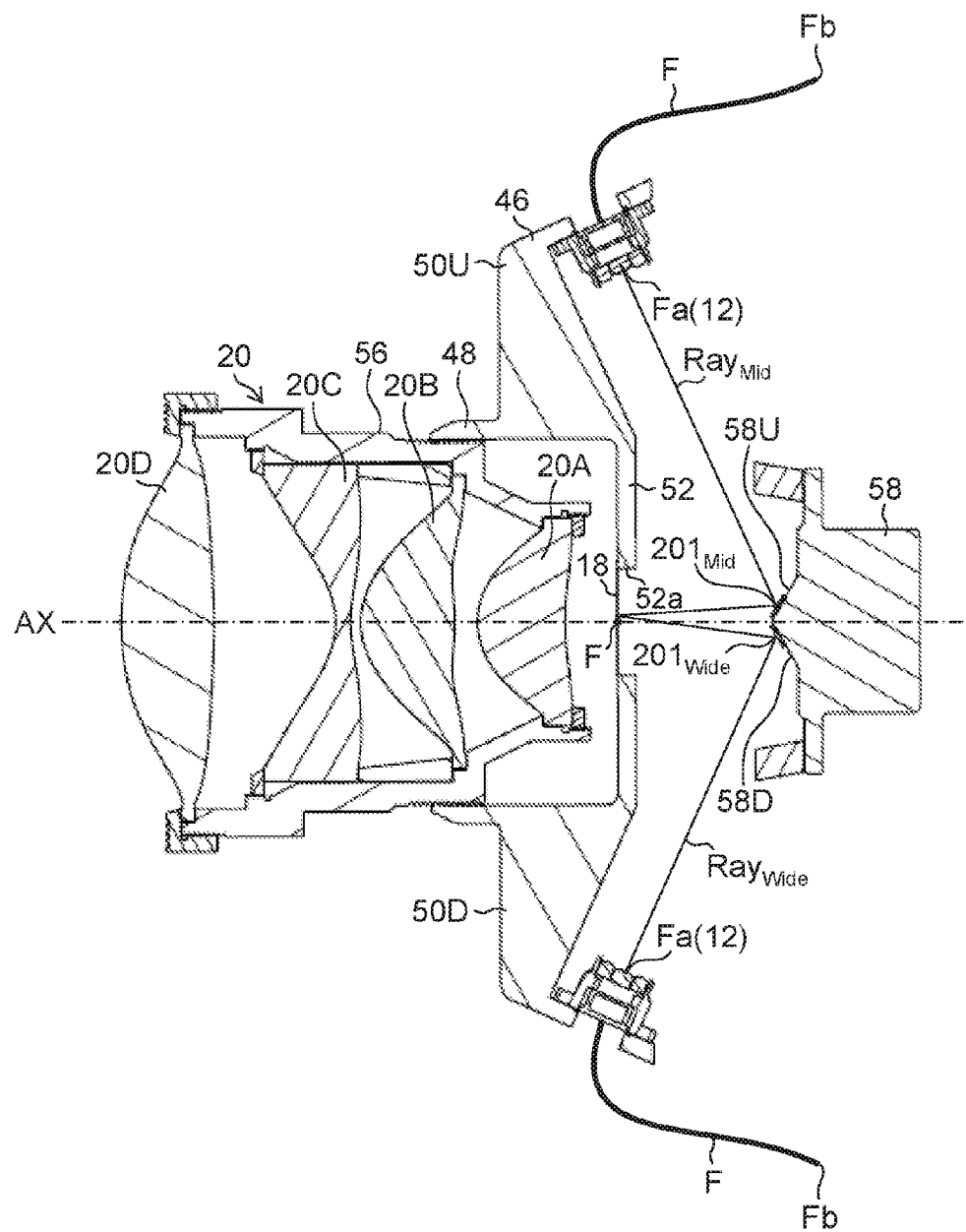
FIG. 35 is a longitudinal sectional view of another variation of the vehicle lamp 300.

For example, an emission end face Fa of an optical fiber F that emits excitation light may be used as the excitation light sources 12 ($12_{Wide}$, $12_{Mid}$, and $12_{Hot}$), as illustrated in FIGS. 30 and 35. In particular, using the emission end face Fa of the optical fiber F that emits excitation light excitation light as the excitation light sources 12 ($12_{Wide}$, $12_{Mid}$, and $12_{Hot}$) enables an excitation light source (not illustrated) that emits excitation light to be guided from an incident end face Fb of the optical fiber F to be arranged at a place away from the vehicle lamp 10 (vehicle lamp body). As a result, the vehicle lamp 10 can be further reduced in size and weight.

FIG. 35 illustrates an example of a combination of three excitation light sources (not illustrated) and three optical fibers F each including: a core provide with the incident edge face Fb on which a laser beam as excitation light from each of excitation light sources is incident, and with the emission end face Fa through which the laser beam guided from the incident edge face Fb is emitted; and a clad enclosing the periphery of the core. For convenience of description, a hot optical fiber F is omitted in FIG. 35.

FIG. 30 illustrates an example of a combination of one excitation light source 12, a light distributor 68 that divides a laser beam as excitation light from the excitation light source 12 into a plurality of laser beams (such as three beams), and an optical fiber F including: a core provided with the incident edge face Fb on which the laser beam divided by the light distributor 68, as excitation light, is incident, and with the emission end face Fa through which the laser beam guided from the incident edge face Fb is emitted; and a clad enclosing the periphery of the core, the optical fiber F comprises a plurality of optical fibers F corresponding to the number of the divided beams (such as three fibers).

Figure 36:
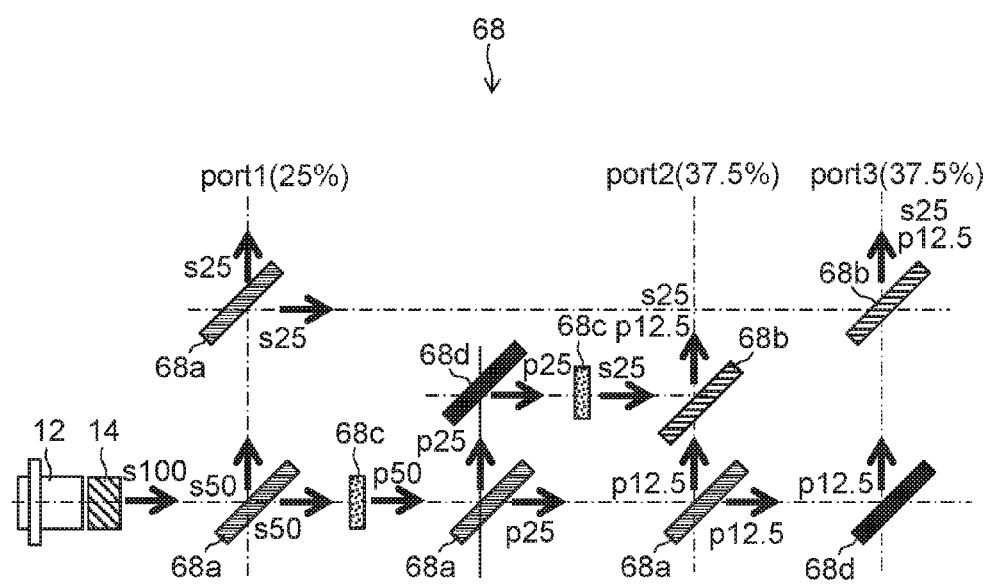
FIG. 36 illustrates an example of internal structure of a light distributor 68.

FIG. 36 illustrates an example of internal structure of the light distributor 68. The light distributor 68 is an example of a light distributor configured to divide a laser beam as excitation light from the excitation light source 12, condensed through the condenser lens 14, at a ratio of 25%, 37.5%, and 37.5% by arranging a plurality of non-deflection beam splitters 68a, a deflection beam splitter 68b, a ½λ plate 68c, and a mirror 68d, as illustrated in FIG. 36.

These variations also achieve the effects as with the above respective embodiments.

Next, as a fourth embodiment, there will be described a method of forming a light intensity distribution having relatively high light intensity in a partial region (and a predetermined light distribution pattern having relatively high light intensity in a partial region) by using the light reflector 201 of a uniaxial nonresonant/uniaxial resonant type (refer to FIG. 3) in the vehicle lamp 10 described in the first embodiment (refer to FIG. 1).

Figure 37A:
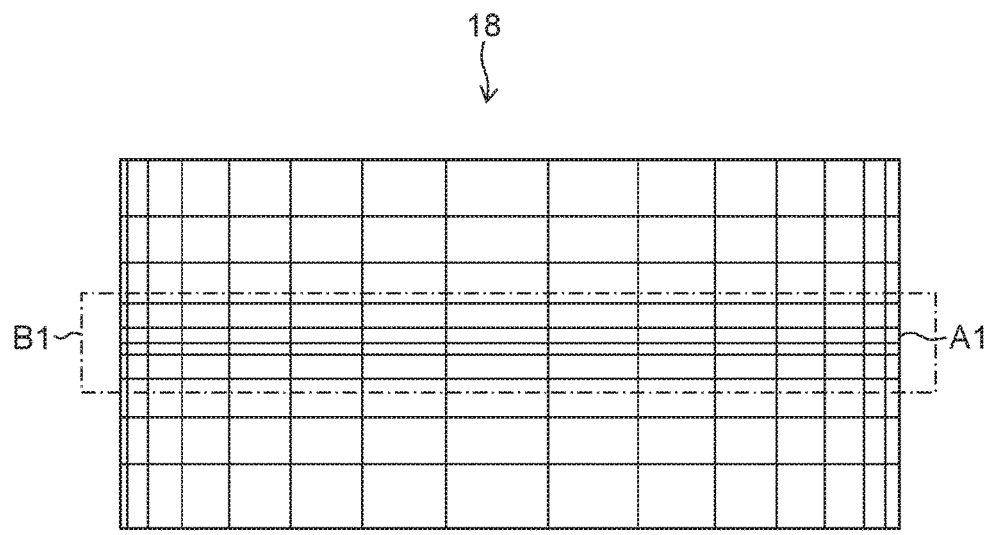
FIG. 37A illustrates an example of a light intensity distribution in which light intensity is relatively high in a region B1 near the center.

First, there will be described, as illustrated in FIG. 37A, a method of forming a light intensity distribution having relatively high light intensity in a region B1 near the center (refer to a region surrounded by a dashed line in FIG. 37A) (and a high-beam light distribution pattern having relatively high light intensity in a partial region near the center) as the light intensity distribution having relatively high light intensity in a partial region (and a predetermined light distribution pattern having relatively high light intensity in a region). This method is obviously available to not only the vehicle lamp 10 described in the first embodiment, but also the vehicle lamp 300 described in the second embodiment, the vehicle lamp 400 described in the third embodiment, and other various vehicle lamps.

In the description below, the vehicle lamp 10 includes a control unit (such as the control unit 24 illustrated in FIG. 10 and the MEMS power source circuit 26) that controls the first actuators 203 and 204 by resonant drive, as well as the second actuators 205 and 206 by nonresonant drive so that a two-dimensional image is formed in a scan region A1 of the wavelength converter 18 with excitation light that is two-dimensionally scanned by the mirror unit 202 of the light reflector 201 of a uniaxial nonresonant/uniaxial resonant type. In addition, an output (or a modulation rate) of the excitation light source 12 is constant, and the light reflector 201 of a uniaxial nonresonant/uniaxial resonant type is arranged while the first shaft X1 is included in a vertical plane as well as the second shaft X2 is included in a horizontal plane.

FIG. 37A illustrates an example of a light intensity distribution in which light intensity is relatively high in the region B1 near the center. The light intensity distribution is formed in the scan region A1 of the wavelength converter 18 by drawing a two-dimensional image with excitation light that is two-dimensionally scanned by the mirror unit 202. The scan region A1 is not limited to the region with a rectangular outline illustrated in FIG. 37A, and may be, for example, a region with an outline in a circular shape, an elliptical shape, or one of other various shapes.

The light intensity distribution illustrated in FIG. 37A includes a region near the center in a horizontal direction (a side-to-side direction in FIG. 37A), having relatively low light intensity, as well as regions near right and left ends, having relatively high light intensity. The light intensity distribution also includes the region B1 near the center in a vertical direction (an up-and-down direction in FIG. 37A), having relatively high light intensity, as well as regions near upper and lower ends, having relatively low light intensity. As a whole, the light intensity distribution illustrated in FIG. 37A is a light intensity distribution having relatively high light intensity in the region B1 near the center, which is required for a vehicle headlamp.

The light intensity distribution illustrated in FIG. 37A can be formed as follows. That is, the light intensity distribution can be formed by allowing the control unit to control the first actuators 203 and 204 by resonant drive based on a driving signal (sine wave) illustrated in FIG. 37B, as well as control the second actuators 205 and 206 by nonresonant drive base on a driving signal (sawtooth wave or rectangular wave) including a nonlinear region illustrated in FIG. 37C. Specifically, the light intensity distribution can be formed by allowing the control unit to apply driving voltage to the first piezoelectric actuators 203 and 204 in accordance with a driving signal (sine wave) illustrated in FIG. 37B, as well as apply driving voltage to the second piezoelectric actuators 205 and 206 in accordance with a driving signal (sawtooth wave or rectangular wave) including the nonlinear region illustrated in FIG. 37C. A reason for that will be described below.

Figure 37B:
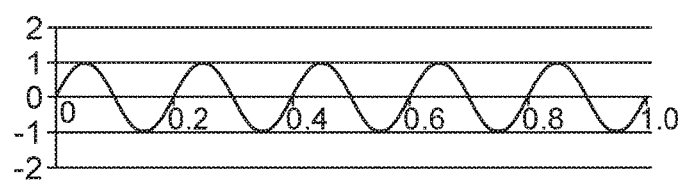
FIG. 37B illustrates an example of a driving signal (sine wave) to form the light intensity distribution illustrated in FIG. 37A.

In the light reflector 201 of a uniaxial nonresonant/uniaxial resonant type, when driving voltage is applied to the first piezoelectric actuators 203 and 204 in accordance with the driving signal (sine wave) illustrated in FIG. 37B, an oscillation rate (horizontal scan rate) around the first shaft X1 of the mirror unit 202 becomes maximum in a region near the center in the horizontal direction of the scan region A1 of the wavelength converter 18, as well as becomes minimum in regions near right and left ends in the horizontal direction. First, this is caused by a driving signal illustrated in FIG. 37C being a sine wave, and second, caused by allowing the control unit to control the first actuators 203 and 204 by using resonant drive based on the driving signal (sine wave).

In this case, an amount of irradiation of excitation light per unit area relatively decreases in the region near the center, having a relatively high oscillation rate around the first shaft X1 of the mirror unit 202. Conversely, the amount of irradiation of excitation light per unit area relatively increases in the regions near the right and left ends, having a relatively low oscillation rate around the first shaft X1 of the mirror unit 202. As a result, the light intensity distribution illustrated in FIG. 37A has light intensity that is relatively low in the region near the center in the horizontal direction, as well as that is relatively high in the regions near the right and left ends.

A distance between a plurality of lines extending vertically in FIG. 37A indicates a scan distance per unit time of excitation light from the excitation light source 12, being scanned horizontally by the mirror unit 202. That is, the distance between the plurality of lines extending vertically indicates an oscillation rate around the first shaft X1 of the mirror unit 202 (horizontal scan rate). The shorter distance indicates a lower oscillation rate around the first shaft X1 of the mirror unit 202 (horizontal scan rate).

With reference to FIG. 37A, it can be seen that a distance between the plurality of lines extending vertically is relatively wide in the region near the center, or an oscillation rate around the first shaft X1 of the mirror unit 202 is relatively high in the region near the center, as well as a distance between the plurality of lines extending vertically is relatively narrow in the regions near the right and left ends, or an oscillation rate around the first shaft X1 of the mirror unit 202 is relatively low in the regions near the right and left ends.

Figure 37C:
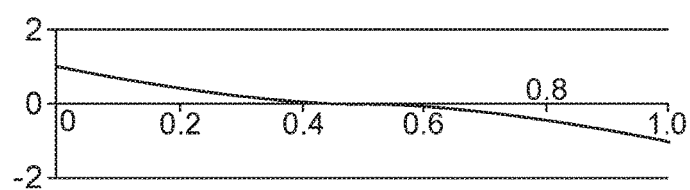
FIG. 37C illustrates an example of a driving signal (a sawtooth wave or a rectangular wave), including a nonlinear region, to form the light intensity distribution illustrated in FIG. 37A.

Meanwhile, in the light reflector 201 of a uniaxial nonresonant/uniaxial resonant type, when driving voltage is applied to the second piezoelectric actuators 205 and 206 in accordance with a driving signal (sawtooth wave or rectangular wave) including the nonlinear region illustrated in FIG. 37C, an oscillation rate (vertical scan rate) around the second shaft X2 of the mirror unit 202 relatively decreases in the region B1 near the center in the vertical direction of the scan region A1 of the wavelength converter 18. First, this is caused by the driving signal (sawtooth wave or rectangular wave) including the nonlinear region illustrated in FIG. 37C, the nonlinear region being adjusted so that an oscillation rate around the second shaft X2 of the mirror unit 202 relatively decreases while a two-dimensional image is drawn in the region B1 near the center of the scan region A1 of the wavelength converter 18 with excitation light that is two-dimensionally scanned by the mirror unit 202, and second, caused by allowing the control unit to control the second actuators 205 and 206 by using nonresonant drive based on the driving signal (sawtooth wave or rectangular wave) including the nonlinear region.

In this case, an amount of irradiation of excitation light per unit area relatively increases in the region B1 near the center, having a relatively low oscillation rate around the second shaft X2 of the mirror unit 202. In the region B1 near the center, pixel density as well as resolution is relatively high. Conversely, the amount of irradiation of excitation light per unit area relatively decreases in the regions near the upper and lower ends, having a relatively high oscillation rate around the second shaft X2 of the mirror unit 202. In the regions near the upper and lower ends, pixel density as well as resolution is relatively low. As a result, the light intensity distribution illustrated in FIG. 37A has relatively high light intensity in the region B1 near the center in the vertical direction, as well as relatively low light intensity in the regions near the upper and lower ends.

A distance between a plurality of lines extending horizontally in FIG. 37A indicates a scan distance per unit time of excitation light from the excitation light source 12, being scanned vertically by the mirror unit 202. That is, the distance between the plurality of lines extending horizontally indicates an oscillation rate around the second shaft X2 of the mirror unit 202 (vertical scan rate). The shorter distance indicates a lower oscillation rate around the second shaft X2 of the mirror unit 202 (vertical scan rate) as well as relatively higher pixel density and resolution.

With reference to FIG. 37A, it can be seen that a distance between the plurality of lines extending horizontally is relatively narrow in the region B1 near the center, or an oscillation rate around the second shaft X2 of the mirror unit 202 is relatively low in the region B1 near the center, as well as a distance between the plurality of lines extending horizontally is relatively wide in the regions near the upper and lower ends, or an oscillation rate around the second shaft X2 of the mirror unit 202 is relatively high in the regions near the upper and lower ends.

As described above, a light intensity distribution (refer to FIG. 37A) having relatively high light intensity in the region B1 near the center is formed in the scan region A1 of the wavelength converter 18. The light intensity distribution has relatively high pixel density and resolution in the region B1 near the center, where an oncoming vehicle or the like decreases in apparent size, and has relatively low pixel density and resolution in the regions near the right and left ends, where an oncoming vehicle or the like increases in apparent size. As a result, the light intensity distribution is particularly suitable for a high-beam light distribution pattern to achieve the ADB. The light intensity distribution having relatively high light intensity in the region B1 near the center, (refer to FIG. 37A), is projected forward through the projection lens 20 to form a high-beam light distribution pattern having relatively high light intensity in a region near the center, on a virtual vertical screen.

As a reference example, there will be described a light intensity distribution (refer to FIG. 38A) that is formed in the scan region A1 of the wavelength converter 18 by allowing the control unit to apply driving voltage to the first piezoelectric actuators 203 and 204 in accordance with a driving signal (identical with the driving signal illustrated in FIG. 37B) illustrated in FIG. 38B, as well as to apply driving voltage to the second piezoelectric actuators 205 and 206 in accordance with a driving signal (sawtooth wave or rectangular wave) including a linear region illustrated in FIG. 38C, instead of a driving signal including the nonlinear region illustrated in FIG. 37C.

Figure 38A:
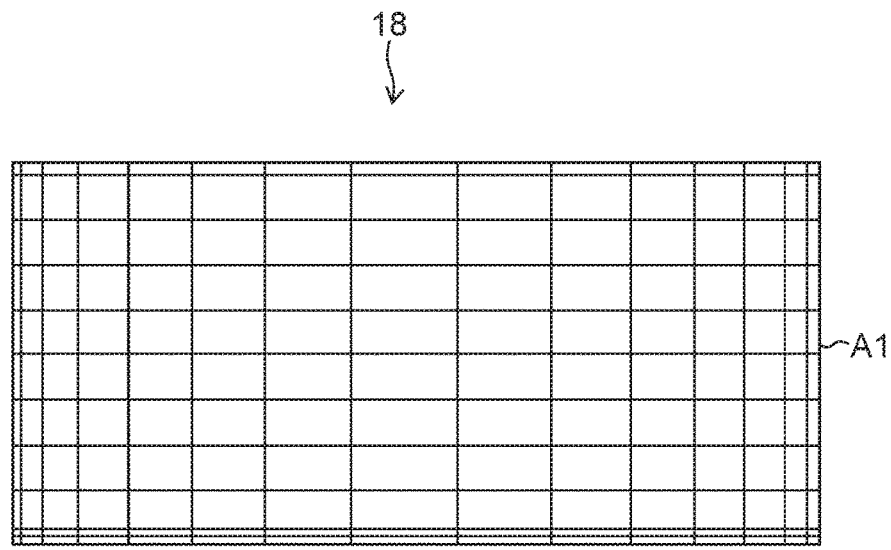
FIG. 38A illustrates an example of the light intensity distribution (reference example).
Figure 38B:
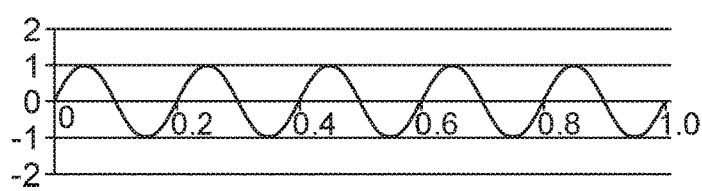
FIG. 38B illustrates an example of a driving signal (sine wave) to form the light intensity distribution illustrated in FIG. 38A.
Figure 38C:
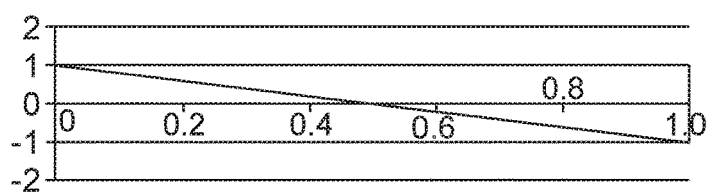
FIG. 38C illustrates an example of a driving signal (a sawtooth wave or a rectangular wave), including a linear region, to form the light intensity distribution illustrated in FIG. 38A.

The light intensity distribution illustrated in FIG. 38A includes a region near the center in a horizontal direction (a side-to-side direction in FIG. 38A), having relatively low light intensity, as well as regions near right and left ends, having relatively high light intensity. The light intensity distribution also has light intensity that is uniform or substantially uniform between upper and lower ends in a vertical direction (up-and-down direction in FIG. 38A). As a result, the light intensity distribution is unsuitable for a vehicle headlamp. A light intensity distribution having uniform or substantially uniform light intensity between the upper and lower ends in the vertical direction is achieved by using a driving signal illustrated in FIG. 38C that is not a driving signal including a nonlinear region such as illustrated in FIG. 37C but a driving signal including a linear region to allow a vertical scan rate to be constant.

As described above, the present embodiment enables forming a light intensity distribution (refer to FIG. 37A) that has relatively high light intensity in a partial region, such as the region B1 near the center, and that is required for a vehicle lamp, particularly a vehicle headlamp, in a vehicle lamp using the light reflector 201 of a uniaxial nonresonant/uniaxial resonant type (refer to FIG. 3) that two-dimensionally scans excitation light.

This is achieved by allowing the control unit to control the second actuators 205 and 206 so that an oscillation rate around the second shaft X2 of the mirror unit 202 relatively decreases while a two-dimensional image is drawn in a partial region, such as the region B1 near the center, in the scan region A1 of the wavelength converter 18 with excitation light that is two-dimensionally scanned by the mirror unit 202.

The present embodiment also enables forming a predetermined light distribution pattern (such as a high-beam light distribution pattern) having relatively high light intensity in a partial region, such as the region B1 near the center, in a vehicle lamp using the light reflector 201 of a uniaxial nonresonant/uniaxial resonant type (refer to FIG. 3) that two-dimensionally scans excitation light.

This is achieved, as described above, by enabling the light intensity distribution (refer to FIG. 37A) having relatively high light intensity in a partial region, such as the region B1 near the center, to be formed, as well as by projecting the light intensity distribution having relatively high light intensity in the partial region, such as the region B1 near the center, to form the predetermined light distribution pattern, such as a high-beam light distribution pattern.

According to the present embodiment, the light intensity distribution formed in the scan region A1 has relatively high pixel density and resolution in the region B1 near the center, where an oncoming vehicle or the like decreases in apparent size, and has relatively low pixel density and resolution in the regions near the right and left ends, where an oncoming vehicle or the like increases in apparent size. As a result, the light intensity distribution is particularly suitable for a high-beam light distribution pattern to achieve the ADB.

Adjusting a driving signal including a nonlinear region (refer to FIG. 37C, for example) that is a basis of controlling the second piezoelectric actuators 205 and 206 enables forming not only a light intensity distribution having relatively high light intensity in the region B1 near the center but also a light intensity distribution having relatively high light intensity in any region (and a predetermined light distribution pattern having relative high light intensity in any region).

Figure 39:
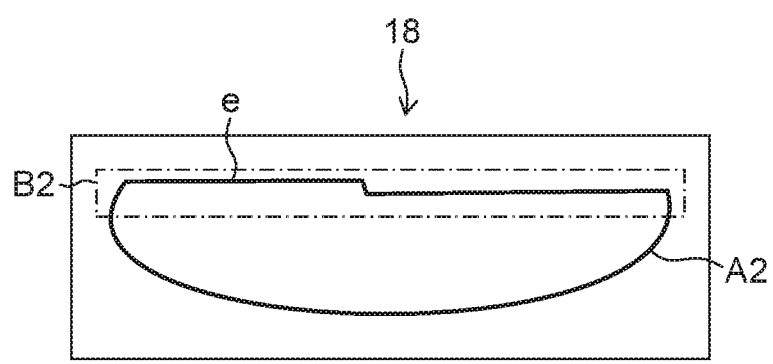
FIG. 39 illustrates an example of the light intensity distribution in which the light intensity is relatively high in a region B2 near a side "e" corresponding to a cutoff line.

As illustrated in FIG. 39, for example, it is possible to form a light intensity distribution having relatively high light intensity in a region B2 near a side "e" corresponding to a cutoff line (refer to a region surrounded by a dashed line in FIG. 39) and a low-beam light distribution pattern having relatively high light intensity in the region near the cutoff line. This can be easily achieved by using a driving signal including a nonlinear region that is adjusted so that an oscillation rate around the second shaft X2 of the mirror unit 202 relatively decreases while a two-dimensional image is drawn in the region B2 near the side "e" corresponding to the cutoff line in a scan region A2 of the wavelength converter 18, with excitation light that is two-dimensionally scanned by the mirror unit 202, as the driving signal (sawtooth wave or rectangular wave) including a nonlinear region that is a basis of controlling the second piezoelectric actuators 205 and 206.

Next, as a fifth embodiment, there will be described a method of forming a light intensity distribution having relatively high light intensity in a partial region (and a predetermined light distribution pattern having relatively high light intensity in a partial region) by using the light reflector 161 of a biaxial nonresonant type (refer to FIG. 15) instead of the light reflector 201 of a uniaxial nonresonant/uniaxial resonant type in the vehicle lamp 10 described in the first embodiment (refer to FIG. 1).

Figure 40A:
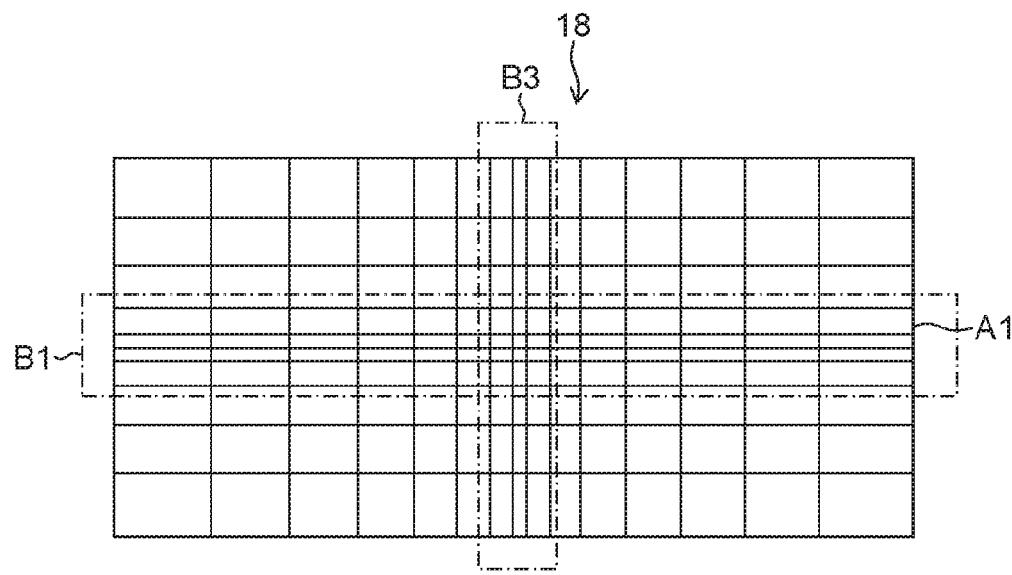
FIG. 40A illustrates an example of the light intensity distribution in which the light intensity is relatively high in regions B1 and B3 near the center.

First, there will be described, as illustrated in FIG. 40A, a method of forming a light intensity distribution having relatively high light intensity in regions B1 and B3 near the center (refer to regions each surrounded by a dashed line in FIG. 40A) and a high-beam light distribution pattern with a region near the center having relatively high light intensity as the light intensity distribution having relatively high light intensity in a partial region and a predetermined light distribution pattern having relatively high light intensity in a partial region. This method is obviously available to not only the vehicle lamp 10 described in the first embodiment, but also the vehicle lamp 300 described in the second embodiment, the vehicle lamp 400 described in the third embodiment, and other various vehicle lamps.

In the description below, the vehicle lamp 10 includes a control unit (such as the control unit 24 and the MEMS power source circuit 26 illustrated in FIG. 10) that controls the first actuators 163 and 164, as well as the second actuators 165 and 166, by nonresonant drive so that a two-dimensional image is formed in a scan region A1 of the wavelength converter 18 with excitation light that is two-dimensionally scanned by the mirror unit 162 of the light reflector 161 of a biaxial nonresonant type. In addition, an output (or a modulation rate) of the excitation light source 12 is constant, and the light reflector 161 of a biaxial nonresonant type is arranged while the third shaft X3 is included in a vertical plane as well as the fourth shaft X4 is included in a horizontal plane.

FIG. 40A illustrates an example of a light intensity distribution in which light intensity is relatively high in the regions B1 and B3 near the center. The light intensity distribution is formed in the scan region A1 of the wavelength converter 18 by drawing a two-dimensional image with excitation light that is two-dimensionally scanned by the mirror unit 162. The scan region A1 is not limited to the region with a rectangular outline illustrated in FIG. 40A, and may be, for example, a region with an outline in a circular shape, an elliptical shape, or one of other various shapes.

The light intensity distribution illustrated in FIG. 40A includes a region B3 near the center in a horizontal direction (a side-to-side direction in FIG. 40A), having relatively high light intensity, as well as regions near right and left ends, having relatively low light intensity. The light intensity distribution also includes the region B1 near the center in a vertical direction (an up-and-down direction in FIG. 40A), having relatively high light intensity, as well as regions near up-and-down ends, having relatively low light intensity. As a whole, the light intensity distribution has relatively high light intensity in the regions B1 and B3 near the center, which is required for a vehicle headlamp.

The light intensity distribution illustrated in FIG. 40A can be formed as follows. That is, the light intensity distribution can be formed by allowing the control unit to control the first actuators 163 and 164 by nonresonant drive based on a first driving signal (sawtooth wave or rectangular wave) including a first nonlinear region illustrated in FIG. 40B, as well as control the second actuators 165 and 166 by nonresonant drive based on a second driving signal (sawtooth wave or rectangular wave) including a second nonlinear region illustrated in FIG. 40C. Specifically, the light intensity distribution can be formed by allowing the control unit to apply driving voltage to the first piezoelectric actuators 163 and 164 in accordance with a first driving signal (sawtooth wave or rectangular wave) including a first nonlinear region illustrated in FIG. 40B, as well as apply driving voltage to the second piezoelectric actuators 165 and 166 in accordance with the second driving signal (sawtooth wave or rectangular wave) including the second nonlinear region illustrated in FIG. 40C. A reason for that will be described below.

Figure 40B:
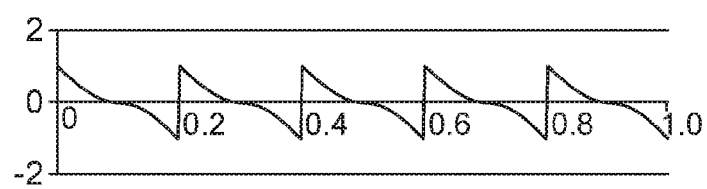
FIG. 40B illustrates an example of a driving signal (a sawtooth wave or a rectangular wave), including a nonlinear region, to form the light intensity distribution illustrated in FIG. 40A.

In the light reflector 161 of a biaxial nonresonant type, when driving voltage is applied to the first piezoelectric actuators 163 and 164 in accordance with the first driving signal (sawtooth wave or rectangular wave) including the first nonlinear region illustrated in FIG. 40B, an oscillation rate (horizontal scan rate) around the third shaft X3 of the mirror unit 162 relatively decreases in the region B3 near the center in the horizontal direction of the scan region A1 of the wavelength converter 18. First, this is caused by the driving signal (sawtooth wave or rectangular wave) including the first nonlinear region illustrated in FIG. 40B, the nonlinear region being adjusted so that an oscillation rate around the third shaft X3 of the mirror unit 162 relatively decreases while a two-dimensional image is drawn in the region B3 near the center of the scan region A1 of the wavelength converter 18 with excitation light that is two-dimensionally scanned by the mirror unit 162, and second, caused by allowing the control unit to control the first actuators 163 and 164 by using nonresonant drive based on the first driving signal (sawtooth wave or rectangular wave) including the first nonlinear region.

In this case, an amount of irradiation of excitation light per unit area relatively increases in the region B3 near the center, having a relatively low oscillation rate around the third shaft X3 of the mirror unit 162. In the region B3 near the center, pixel density as well as resolution is relatively high. Conversely, the amount of irradiation of excitation light per unit area relatively decreases in the regions near the right and left ends, having a relatively high oscillation rate around the third shaft X3 of the mirror unit 162. In the regions near the right and left ends, pixel density as well as resolution is relatively low. As a result, the light intensity distribution illustrated in FIG. 40A has relatively high light intensity in the region B3 near the center in the horizontal direction, as well as relatively low light intensity in the regions near the right and left ends.

A distance between a plurality of lines extending vertically in FIG. 40A indicates a scan distance per unit time of excitation light from the excitation light source 12, being scanned horizontally by the mirror unit 162. That is, the distance between the plurality of lines extending vertically indicates an oscillation rate around the third shaft X3 of the mirror unit 162 (horizontal scan rate). The shorter distance indicates a lower oscillation rate around the third shaft X3 of the mirror unit 162 (horizontal scan rate) as well as relatively higher pixel density and resolution.

With reference to FIG. 40A, it can be seen that a distance between the plurality of lines extending vertically is relatively narrow in the region B3 near the center, or an oscillation rate around the third shaft X3 of the mirror unit 162 is relatively low in the region B3 near the center, as well as a distance between the plurality of lines extending vertically is relatively wide in the regions near the right and left ends, or an oscillation rate around the third shaft X3 of the mirror unit 162 is relatively high in the regions near the right and left ends.

Figure 40C:
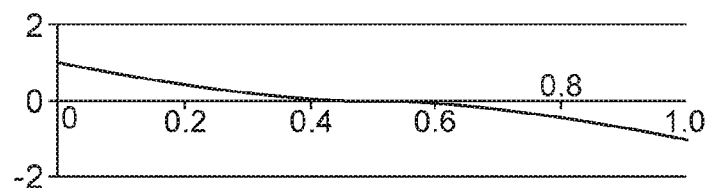
FIG. 40C illustrates another example of a driving signal (a sawtooth wave or a rectangular wave), including a nonlinear region, to form the light intensity distribution illustrated in FIG. 40A.

Meanwhile, in the light reflector 161 of a biaxial non-resonant type, when driving voltage is applied to the second piezoelectric actuators 165 and 166 in accordance with the second driving signal (sawtooth wave or rectangular wave) including the second nonlinear region illustrated in FIG. 40C, an oscillation rate (vertical scan rate) around a fourth shaft X4 of the mirror unit 162 relatively decreases in the region B1 near the center in the vertical direction of the scan region A1 of the wavelength converter 18.

First, this is caused by the second driving signal (sawtooth wave or rectangular wave) including the second nonlinear region shown in FIG. 40C, the second nonlinear region being adjusted so that an oscillation rate around the fourth shaft X4 of the mirror unit 162 relatively decreases while a two-dimensional image is drawn in the region B1 near the center of the scan region A1 of the wavelength converter 18 with excitation light that is two-dimensionally scanned by the mirror unit 162, and second, caused by allowing the control unit to control the second actuators 165 and 166 by using nonresonant drive based on the second driving signal (sawtooth wave or rectangular wave) including the second nonlinear region.

In this case, an amount of irradiation of excitation light per unit area relatively increases in the region B1 near the center, having a relatively low oscillation rate around the fourth shaft X4 of the mirror unit 162. In the region B1 near the center, pixel density as well as resolution is relatively high. Conversely, the amount of irradiation of excitation light per unit area relatively decreases in the regions near the upper and lower ends, having a relatively high oscillation rate around the fourth shaft X4 of the mirror unit 162. In the regions near the upper and lower ends, pixel density as well as resolution is relatively low. As a result, the light intensity distribution illustrated in FIG. 40A has relatively high light intensity in the region B1 near the center in the vertical direction, as well as relatively low light intensity in the regions near the upper and lower ends.

A distance between a plurality of lines extending horizontally in FIG. 40A indicates a scan distance per unit time of excitation light from the excitation light source 12, being scanned vertically by the mirror unit 162. That is, the distance between the plurality of lines extending horizontally indicates an oscillation rate around the fourth shaft X4 of the mirror unit 162 (vertical scan rate). The shorter distance indicates a lower oscillation rate around the fourth shaft X4 of the mirror unit 162 (vertical scan rate) as well as relatively higher pixel density and resolution.

With reference to FIG. 40A, it can be seen that a distance between the plurality of lines extending horizontally is relatively narrow in the region B1 near the center, or an oscillation rate around the fourth shaft X4 of the mirror unit 162 is relatively low in the region B1 near the center, as well as a distance between the plurality of lines extending horizontally is relatively wide in the regions near the upper and lower ends, or an oscillation rate around the fourth shaft X4 of the mirror unit 162 is relatively high in the regions near the upper and lower ends.

As described above, a light intensity distribution (refer to FIG. 40A) having relatively high light intensity in the regions B1 and B3 near the center is formed in the scan region A1 of the wavelength converter 18. The light intensity distribution has relatively high pixel density and resolution in the region B1 near the center, where an oncoming vehicle or the like decreases in apparent size, and has relatively low pixel density and resolution in the regions near the right and left ends, where an oncoming vehicle or the like increases in apparent size. As a result, the light intensity distribution is particularly suitable for a high-beam light distribution pattern to achieve the ADB. The light intensity distribution having relatively high light intensity in the regions B1 and B3 near the center, (refer to FIG. 40A), is projected forward through the projection lens 20 to form a high-beam light distribution pattern having relatively high light intensity in a region near the center, on a virtual vertical screen.

As a reference example, there will be described a light intensity distribution (refer to FIG. 41A) that is formed in the scan region A1 of the wavelength converter 18 by allowing the control unit to apply driving voltage to the first piezoelectric actuators 163 and 164 in accordance with a driving signal (sawtooth wave or rectangular wave) including a linear region illustrated in FIG. 41B driving voltage, instead of the first driving signal including the first nonlinear region illustrated in FIG. 40B, as well as to apply driving voltage to the second piezoelectric actuators 165 and 166 in accordance with a driving signal (sawtooth wave or rectangular wave) including a linear region illustrated in FIG. 41C, instead of the second driving signal including the second nonlinear region illustrated in FIG. 40C.

Figure 41A:
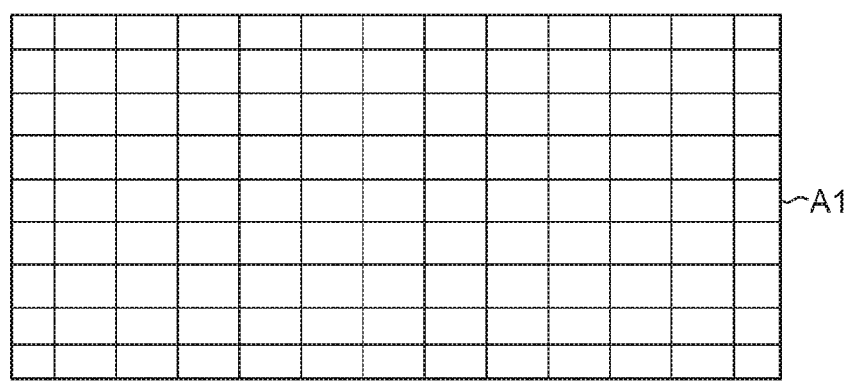
FIG. 41A illustrates an example of the light intensity distribution (reference example).
Figure 41B:
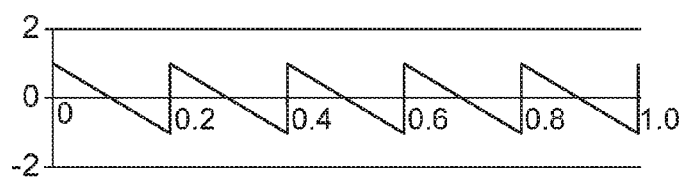
FIG. 41B illustrates an example of a driving signal (a sawtooth wave or a rectangular wave), including a linear region, to form the light intensity distribution illustrated in FIG. 41A.
Figure 41C:
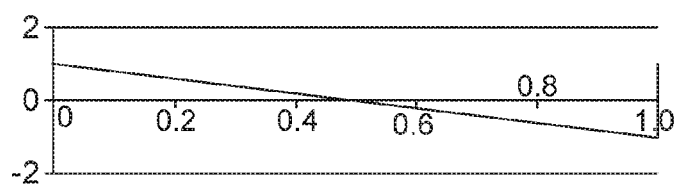
FIG. 41C illustrates another example of a driving signal (a sawtooth wave or a rectangular wave), including a linear region, to form the light intensity distribution illustrated in FIG. 41A.

The light intensity distribution has light intensity that is uniform or substantially uniform between the right and left ends in the horizontal direction (side-to-side direction in FIG. 41A), as well as between the upper and lower ends in the vertical direction (side-to-side direction in FIG. 41A). As a result, the light intensity distribution is unsuitable for a vehicle headlamp. A light intensity distribution having uniform or substantially uniform light intensity between the right and left ends in the horizontal direction is achieved by using a driving signal illustrated in FIG. 41B that is not a driving signal including a nonlinear region such as illustrated in FIG. 40B but a driving signal including a linear region to allow a horizontal scan rate to be constant. Likewise, a light intensity distribution having uniform or substantially uniform light intensity between the upper and lower ends in the vertical direction is achieved by using a driving signal illustrated in FIG. 41C that is not a driving signal including a nonlinear region such as illustrated in FIG. 40C but a driving signal including a linear region to allow a vertical scan rate to be constant.

As described above, the present embodiment enables forming a light intensity distribution (refer to FIG. 40A) having relatively high light intensity in a partial region, such as the regions B1 and B3 near the center, the light intensity distribution being required for a vehicle lamp, particularly a vehicle headlamp, in a vehicle lamp using the light reflector 161 of a biaxial nonresonant type (refer to FIG. 15) that two-dimensionally scans excitation light.

This is achieved by allowing the control unit to control the first actuators 163 and 164, as well as the second actuators 165 and 166 so that an oscillation rate around the third shaft X3 of the mirror unit 162 as well as around the fourth shaft X4 thereof relatively decreases while a two-dimensional image is drawn in a partial region, such as the regions B1 and B3 near the center, in the scan region A1 of the wavelength converter 18 with excitation light that is two-dimensionally scanned by the mirror unit 162.

The present embodiment also enables forming a predetermined light distribution pattern (such as a high-beam light distribution pattern) having relatively high light intensity in a partial region, such as the regions B1 and B3 near the center, in a vehicle lamp using the light reflector 161 of a biaxial nonresonant type (refer to FIG. 15) that two-dimensionally scans excitation light.

This is achieved, as described above, by enabling the light intensity distribution (refer to FIG. 40A) having relatively high light intensity in a partial region, such as the regions B1 and B3 near the center, to be formed, as well as by projecting the light intensity distribution (refer to FIG. 40A) having relatively high light intensity in the partial region, such as the regions B1 and B3 near the center, to form the predetermined light distribution pattern.

According to the present embodiment, the light intensity distribution formed in the scan region A1 has relatively high pixel density and resolution in the region B1 near the center, where an oncoming vehicle or the like decreases in apparent size, and has relatively low pixel density and resolution in the regions near the right and left ends, where an oncoming vehicle or the like increases in apparent size. As a result, the light intensity distribution is particularly suitable for a high-beam light distribution pattern to achieve the ADB.

Adjusting the first and second driving signals each including a nonlinear region that is a basis of controlling the first actuators 163 and 164, as well as the second actuators 165 and 166, enables forming not only a light intensity distribution having relatively high light intensity in the regions B1 and B3 near the center but also a light intensity distribution having relatively high light intensity in any region (and a predetermined light distribution pattern having relatively high light intensity in any region).

As illustrated in FIG. 39, for example, it is possible to form a light intensity distribution having relatively high light intensity in a region B2 near a side "e" corresponding to a cutoff line (refer to a region surrounded by a dashed line in FIG. 39) and a low-beam light distribution pattern having relatively high light intensity in the region near the cutoff line. This can be easily achieved by using a driving signal including a nonlinear region that is adjusted so that an oscillation rate around the fourth shaft X4 of the mirror unit 162 relatively decreases while a two-dimensional image is drawn in the region B2 near the side "e" corresponding to the cutoff line in the scan region A2 of the wavelength converter 18, with excitation light that is two-dimensionally scanned by the mirror unit 162, as the second driving signal (sawtooth wave or rectangular wave) including the second nonlinear region that is a basis of controlling the second piezoelectric actuators 165 and 166.

As a reference example, there will be described a light intensity distribution (refer to FIG. 42A) that is formed in the scan region A1 of the wavelength converter 18 in the vehicle lamp 10 described in the first embodiment (refer to FIG. 1) by allowing the control unit to apply driving voltage to first piezoelectric actuators 15Aa and 15Ab in accordance with a driving signal (sine wave) illustrated in FIG. 42B by using the light reflector 201A of a biaxial resonant type (refer to FIG. 17) instead of the light reflector 201 of a uniaxial nonresonant/uniaxial resonant type, as well as apply driving voltage to second piezoelectric actuators 17Aa and 17Ab in accordance with a driving signal (sine wave) illustrated in FIG. 42C.

In the description below, the vehicle lamp 10 includes a control unit (such as the control unit 24 and the MEMS power source circuit 26 illustrated in FIG. 10) that controls the first actuators 15Aa and 15Ab by resonant drive, as well as the second actuators 17Aa and 17Ab by resonant drive so that a two-dimensional image is formed in the scan region A with excitation light that is two-dimensionally scanned by the mirror unit 13A of the light reflector 201A of a biaxial resonant type. In addition, an output (or a modulation rate) of the excitation light source 12 is constant, and the light reflector 201A of a biaxial nonresonant type is arranged while the fifth shaft X5 is included in a vertical plane as well as the sixth shaft X6 is included in a horizontal plane.

Figure 42A:
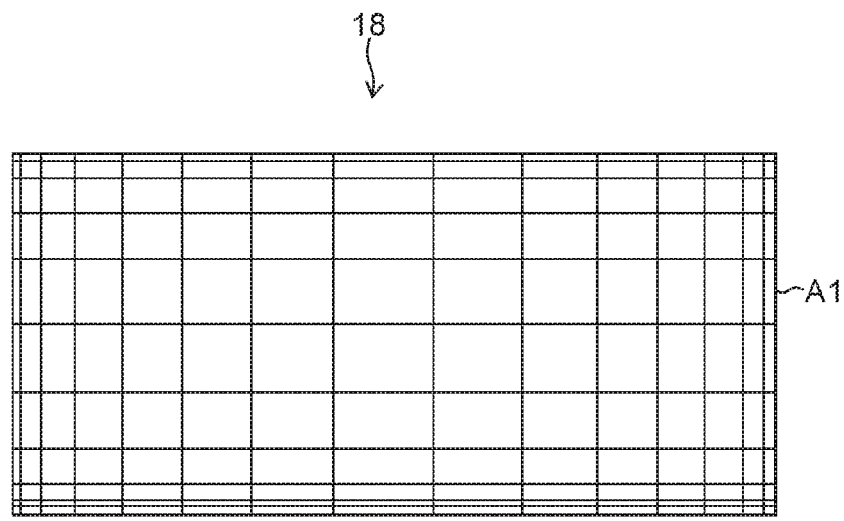
FIG. 42A illustrates an example of the light intensity distribution (reference example).
Figure 42B:
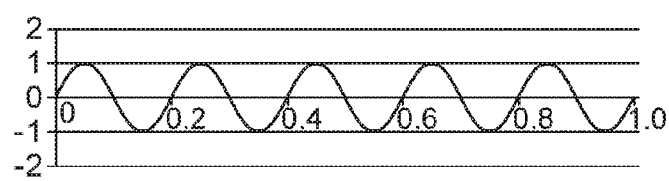
FIG. 42B illustrates an example of a driving signal (sine wave) to form the light intensity distribution illustrated in FIG. 42A.
Figure 42C:
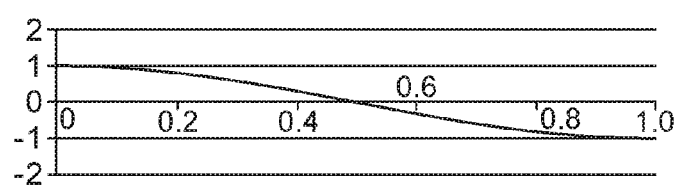
FIG. 42C illustrates another example of a driving signal (sine wave) to form the light intensity distribution illustrated in FIG. 42A.
Figure 43:
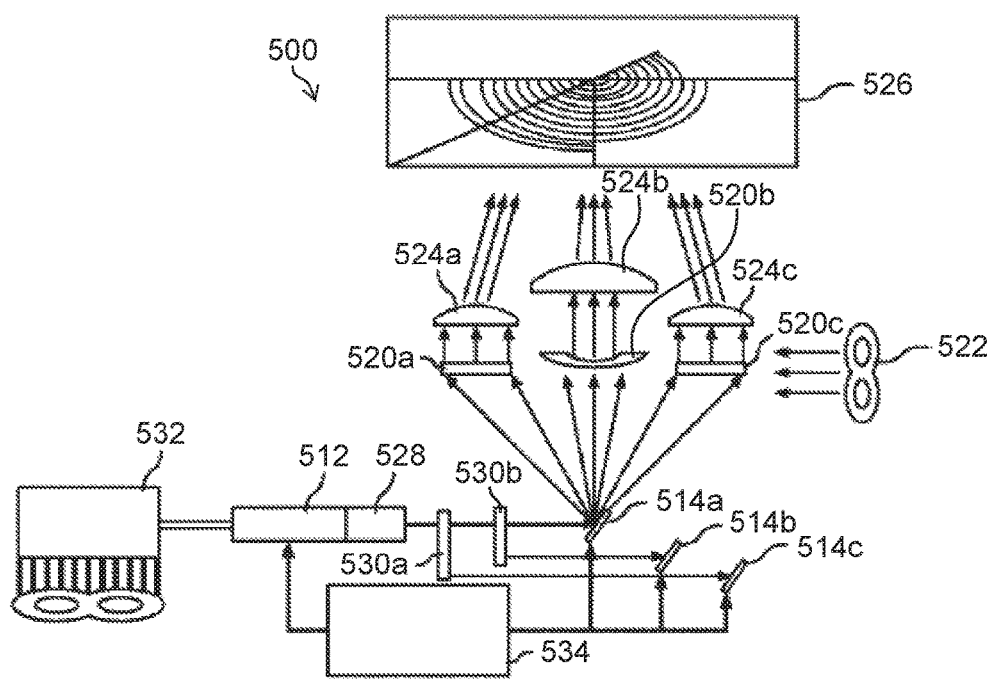
FIG. 43 is a schematic view of a conventional vehicle lamp 500.

In this case, the light intensity distribution illustrated in FIG. 42A includes a region near the center in a horizontal direction (a side-to-side direction in FIG. 42A), having relatively low light intensity, as well as regions near right and left ends, having relatively high light intensity. The light intensity distribution also includes a region near the center in a vertical direction (an up-and-down direction in FIG. 42A), having relatively low light intensity, as well as regions near upper and lower ends, having relatively high light intensity. As a result, the light intensity distribution is unsuitable for a vehicle headlamp.

All of the numeric values shown in the embodiments and the respective variations are shown as examples, and thus appropriate numeric values different from the numeric values are available.

The embodiments are only examples in all points. The present invention is not definitely interpreted by the description of the embodiments. The present invention can be practiced by other various forms without departing from its sprit or essential features.

REFERENCE SIGNS LIST

10 . . . vehicle lamp, 12 ($12_{Wide}$, $12_{Mid}$, $12_{Hot}$) . . . excitation light source, 14 . . . condenser lens, 18 . . . wavelength converter, 20 . . . projection lens, 22 . . . frame body, 24 . . . control unit, 26 . . . MEMS power source circuit, 28 . . . LD power source circuit, 30 . . . imaging apparatus, 32 . . . illuminance sensor, 34 . . . vehicle speed sensor, 36 . . . vehicle inclination sensor, 38 . . . distance sensor, 40 . . . accelerator/brake sensor, 42 . . . vibration sensor, 44 . . . storage device, 46, 46A . . . laser holding part, 48 . . . cylindrical portion, 52 . . . phosphor holding part, 52a . . . opening, 54 . . . heat radiation part, 56 . . . lens holder, 58 . . . light reflector holding part, 60 ($60_{Wide}$, $60_{Mid}$, $60_{Hot}$) . . . reflection surface, 62 . . . reflection surface holding part, 201 ($201_{Wide}$, $201_{Mid}$, $201_{Hot}$) . . . light reflector, 300 . . . vehicle lamp

The invention claimed is:
1. A vehicle lamp configured to form a predetermined light distribution pattern, the vehicle lamp comprising:

an excitation light source;
a light reflector that two-dimensionally scans excitation light, the light reflector including:
    a mirror unit that reflects excitation light incident from the excitation light source;
    a first actuator that oscillates the mirror unit around a first axis by using a resonant drive; and
    a second actuator that oscillates the mirror unit around a second axis orthogonal to the first axis by using a nonresonant drive,
the light reflector arranged such that the first axis is included in a vertical plane, and the second axis is included in a horizontal plane,
a wavelength converter having a scan region in which a light intensity distribution is formed by drawing a two-dimensional image with the excitation light that is two-dimensionally scanned by the light reflector;
a control unit that controls the first actuator by using the resonance drive as well as the second actuator by using the nonresonant drive so that the two-dimensional image is formed in the scan region with the excitation light that is two-dimensionally scanned by the light reflector; and
an optical system that projects the light intensity distribution formed in the scan region to form the prescribed light distribution pattern,
wherein the control unit controls the second actuator to reduce an oscillation rate around the second axis of the mirror unit while the two-dimensional image is drawn in a partial region of the scan region, to form the light intensity distribution with higher light intensity in the partial region of the scan region.

2. The vehicle lamp according to claim 1,
wherein the light reflector is configured as an uniaxial nonresonant/uniaxial resonant type, and the light reflector further includes:
    a movable frame arranged to surround and support the mirror unit so that the mirror unit can oscillate around the first axis;
    a base arranged to surround and support the movable frame so that the movable frame can oscillate around the second axis;
    a first piezoelectric actuator serving as the first actuator; and
    a second piezoelectric actuator serving as the second actuator.

3. The vehicle lamp according to claim 1,
wherein the control unit controls the second actuator based on a driving signal
including a nonlinear region adjusted to reduce an oscillation rate around the second axis of the mirror unit while a two-dimensional image is drawn in the partial region.

4. The vehicle lamp according to claim 1,
wherein the partial region is near the center of the light intensity distribution.

5. The vehicle lamp according to claim 1,
wherein the predetermined light distribution pattern has an upper edge including a cutoff line, and the partial region is near a side of the cutoff line.

6. A vehicle lamp configured to form a predetermined light distribution pattern, the vehicle lamp comprising:
an excitation light source;
a light reflector that two-dimensionally scans the excitation light, the light reflector including:
    a mirror unit that reflects excitation light incident from the excitation light source;
    a first actuator that oscillates the mirror unit around a first axis by using a nonresonant drive; and
    a second actuator that oscillates the mirror unit around a second axis orthogonal to the first axis by using the nonresonant drive,
the light reflector arranged such that the first axis is included in a vertical plane, and the second axis is included in a horizontal plane;
a wavelength converter having a scan region in which a light intensity distribution is formed by drawing a two-dimensional image with the excitation light that is two-dimensionally scanned by the light reflector;
a control unit that controls the first and second actuators by using the nonresonant drive so that the two-dimensional image is formed in the scan region with the excitation light that is two-dimensionally scanned by the light reflector; and
an optical system that projects the light intensity distribution formed in the scan region to form the prescribed light distribution pattern,
wherein the control unit controls the first and second actuators to reduce oscillation rates around the first and second axes of the mirror unit, while the two-dimensional image is drawn in a partial region of the scan region to form the light intensity distribution with high light intensity in the partial region of the scan region.

7. The vehicle lamp according to claim 6,
wherein the light reflector is configured as a biaxial nonresonant type, and the light reflector further includes:
    a movable frame arranged so as to surround and support the mirror unit so that the mirror unit can oscillate around the first axis;
    a base arranged to surround and support the movable frame so that the movable frame can oscillate around the second axis;
    a first piezoelectric actuator serving as the first actuator; and
    a second piezoelectric actuator serving as the second actuator.

8. The vehicle lamp according to claim 6,
wherein the control unit controls the first actuator based on a first driving signal, and the second actuator based on a second driving signal,
the first driving signal including
    a first nonlinear region adjusted to reduce an oscillation rate around the first axis of the mirror unit while a two-dimensional image is drawn in the partial region in the scan region,
the second driving signal including
    a second nonlinear region adjusted to reduce an oscillation rate around the second axis of the mirror unit while a two-dimensional image is drawn in the partial region of the scan region.

9. The vehicle lamp according to claim 6,
wherein the partial region is near the center of the light intensity distribution.

10. The vehicle lamp according to claim 6,
wherein the predetermined light distribution pattern has an upper edge including a cutoff line, and the partial region is near a side of the cutoff line.

* * * * *